(12) United States Patent
Nord et al.

(10) Patent No.: US 9,009,721 B2
(45) Date of Patent: *Apr. 14, 2015

(54) METHOD AND SYSTEM FOR COMMUNICATING BETWEEN ISOLATION ENVIRONMENTS

(75) Inventors: Joseph Nord, Lighthouse Point, FL (US); David Hoy, Coral Springs, FL (US); Madhav Chinta, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 293 days.

This patent is subject to a terminal disclaimer.

(21) Appl. No.: 13/619,207

(22) Filed: Sep. 14, 2012

(65) Prior Publication Data
US 2013/0014121 A1 Jan. 10, 2013

Related U.S. Application Data

(63) Continuation of application No. 13/434,645, filed on Mar. 29, 2012, which is a continuation of application No. 11/875,881, filed on Oct. 20, 2007, now Pat. No. 8,171,483.

(51) Int. Cl.
*G06F 9/44* (2006.01)
*G06F 9/46* (2006.01)
*G06F 9/445* (2006.01)

(52) U.S. Cl.
CPC ....................................... *G06F 8/60* (2013.01)

(58) Field of Classification Search
CPC ....... G06F 9/52; G06F 9/5016; G06F 9/5077; G06F 8/71; G06F 8/63
See application file for complete search history.

(56) References Cited

U.S. PATENT DOCUMENTS

| 4,253,145 A | 2/1981 | Goldberg |
| 4,779,189 A | 10/1988 | Legvold et al. |

(Continued)

FOREIGN PATENT DOCUMENTS

| AU | 2329797 A | 10/1997 |
| AU | 7564398 A | 11/1998 |

(Continued)

OTHER PUBLICATIONS

"Deploying Internet Information Services (IIS) 6.0", Microsoft Windows Server 2003 Development Kit, p. 69, line 25-p. 71, line 8.

(Continued)

*Primary Examiner* — Van Nguyen
(74) *Attorney, Agent, or Firm* — Foley and Lardner LLP; John D. Lanza

(57) ABSTRACT

A method and system for aggregating installation scopes within an isolation environment, where the method includes first defining an isolation environment for encompassing an aggregation of installation scopes. Associations are created between a first application and a first installation scope. When the first application requires the presence of a second application within the isolation environment for proper execution, an image of the required second application is mounted onto a second installation scope and an association between the second application and the second installation scope is created. Another association is created between the first installation scope and the second installation scope, an this third association is created within a third installation scope. Each of the first, second, and third installation scopes are stored and the first application is launched into the defined isolation environment.

12 Claims, 32 Drawing Sheets

(56) References Cited

U.S. PATENT DOCUMENTS

| | | |
|---|---|---|
| 5,057,996 A | 10/1991 | Cutler et al. |
| 5,067,072 A | 11/1991 | Talati et al. |
| 5,129,084 A | 7/1992 | Kelly et al. |
| 5,175,852 A | 12/1992 | Johnson et al. |
| 5,187,790 A | 2/1993 | East et al. |
| 5,201,049 A | 4/1993 | Shorter |
| 5,202,971 A | 4/1993 | Henson et al. |
| 5,249,290 A | 9/1993 | Heizer |
| 5,297,283 A | 3/1994 | Kelly et al. |
| 5,321,841 A | 6/1994 | East et al. |
| 5,341,478 A | 8/1994 | Travis et al. |
| 5,384,911 A | 1/1995 | Bloomfield |
| 5,418,964 A | 5/1995 | Conner et al. |
| 5,430,878 A | 7/1995 | Straub et al. |
| 5,437,025 A | 7/1995 | Bale et al. |
| 5,461,608 A | 10/1995 | Yoshiyama |
| 5,487,167 A | 1/1996 | Dinallo et al. |
| 5,499,343 A | 3/1996 | Pettus |
| 5,504,677 A | 4/1996 | Pollin |
| 5,515,495 A | 5/1996 | Ikemoto |
| 5,515,508 A | 5/1996 | Pettus et al. |
| 5,553,242 A | 9/1996 | Russell et al. |
| 5,557,346 A | 9/1996 | Lipner et al. |
| 5,557,748 A | 9/1996 | Norris |
| 5,557,765 A | 9/1996 | Lipner et al. |
| 5,561,769 A | 10/1996 | Kumar et al. |
| 5,586,312 A | 12/1996 | Johnson et al. |
| 5,596,745 A | 1/1997 | Lai et al. |
| 5,632,002 A | 5/1997 | Hashimoto et al. |
| 5,640,454 A | 6/1997 | Lipner et al. |
| 5,668,958 A | 9/1997 | Bendert et al. |
| 5,696,975 A | 12/1997 | Moore et al. |
| 5,701,484 A | 12/1997 | Artsy |
| 5,706,437 A | 1/1998 | Kirchner et al. |
| 5,727,249 A | 3/1998 | Pollin |
| 5,729,734 A | 3/1998 | Parker et al. |
| 5,734,865 A | 3/1998 | Yu |
| 5,737,622 A | 4/1998 | Rogers et al. |
| 5,745,573 A | 4/1998 | Lipner et al. |
| 5,761,431 A | 6/1998 | Gross et al. |
| 5,761,662 A | 6/1998 | Dasan |
| 5,764,915 A | 6/1998 | Heimsoth et al. |
| 5,765,192 A | 6/1998 | Berliner |
| 5,781,720 A | 7/1998 | Parker et al. |
| 5,784,057 A | 7/1998 | Alimpich et al. |
| 5,794,207 A | 8/1998 | Walker et al. |
| 5,802,306 A | 9/1998 | Hunt |
| 5,819,034 A | 10/1998 | Joseph et al. |
| 5,819,044 A | 10/1998 | Kawabe et al. |
| 5,828,840 A | 10/1998 | Cowan et al. |
| 5,838,910 A | 11/1998 | Domenikos et al. |
| 5,838,916 A | 11/1998 | Domenikos et al. |
| 5,844,553 A | 12/1998 | Hao et al. |
| 5,848,410 A | 12/1998 | Walls et al. |
| 5,856,826 A | 1/1999 | Craycroft |
| 5,860,068 A | 1/1999 | Cook |
| 5,884,046 A | 3/1999 | Antonov |
| 5,915,085 A | 6/1999 | Koved |
| 5,938,733 A | 8/1999 | Heimsoth et al. |
| 5,951,694 A | 9/1999 | Choquier et al. |
| 5,956,403 A | 9/1999 | Lipner et al. |
| 5,983,190 A | 11/1999 | Trower et al. |
| 5,983,268 A | 11/1999 | Freivald et al. |
| 5,991,406 A | 11/1999 | Lipner et al. |
| 5,999,179 A | 12/1999 | Kekic et al. |
| 6,023,721 A | 2/2000 | Cummings |
| 6,026,440 A | 2/2000 | Shrader et al. |
| 6,047,312 A | 4/2000 | Brooks et al. |
| 6,065,043 A | 5/2000 | Domenikos et al. |
| 6,073,076 A | 6/2000 | Crowley et al. |
| 6,088,515 A | 7/2000 | Muir et al. |
| 6,108,712 A | 8/2000 | Hayes, Jr. |
| 6,115,741 A | 9/2000 | Domenikos et al. |
| 6,144,377 A | 11/2000 | Oppermann et al. |
| 6,144,992 A | 11/2000 | Turpin et al. |
| 6,157,953 A | 12/2000 | Chang et al. |
| 6,158,007 A | 12/2000 | Moreh et al. |
| 6,161,126 A | 12/2000 | Wies et al. |
| 6,161,139 A | 12/2000 | Win et al. |
| 6,199,753 B1 | 3/2001 | Tracy et al. |
| 6,230,184 B1 | 5/2001 | White et al. |
| 6,233,585 B1 | 5/2001 | Gupta et al. |
| 6,240,442 B1 | 5/2001 | Domenikos et al. |
| 6,262,726 B1 | 7/2001 | Stedman et al. |
| 6,272,556 B1 | 8/2001 | Gish |
| 6,272,632 B1 | 8/2001 | Carman et al. |
| 6,275,942 B1 | 8/2001 | Bernhard et al. |
| 6,282,602 B1 | 8/2001 | Blumenau et al. |
| 6,292,827 B1 | 9/2001 | Raz |
| 6,304,893 B1 | 10/2001 | Gish |
| 6,311,221 B1 | 10/2001 | Raz et al. |
| 6,314,417 B1 | 11/2001 | Bennett et al. |
| 6,321,219 B1 | 11/2001 | Gainer et al. |
| 6,327,705 B1 | 12/2001 | Larsson et al. |
| 6,339,595 B1 | 1/2002 | Rekhter et al. |
| 6,370,687 B1 | 4/2002 | Shimura |
| 6,374,402 B1 | 4/2002 | Schmeidler et al. |
| 6,385,766 B1 | 5/2002 | Doran et al. |
| 6,385,768 B1 | 5/2002 | Ziebell |
| 6,389,084 B1 | 5/2002 | Rupp |
| 6,438,600 B1 | 8/2002 | Greenfield et al. |
| 6,453,334 B1 | 9/2002 | Vinson et al. |
| 6,487,665 B1 | 11/2002 | Andrews et al. |
| 6,490,601 B1 | 12/2002 | Markus et al. |
| 6,510,466 B1 | 1/2003 | Cox et al. |
| 6,516,315 B1 | 2/2003 | Gupta |
| 6,519,643 B1 | 2/2003 | Foulkes et al. |
| 6,526,056 B1 | 2/2003 | Rekhter et al. |
| 6,550,012 B1 | 4/2003 | Villa et al. |
| 6,553,377 B1 | 4/2003 | Eschelbeck et al. |
| 6,557,168 B1 | 4/2003 | Czajkowski |
| 6,567,974 B1 | 5/2003 | Czajkowski |
| 6,574,618 B2 | 6/2003 | Eylon et al. |
| 6,597,366 B1 | 7/2003 | Bennett et al. |
| 6,598,125 B2 | 7/2003 | Romm |
| 6,604,106 B1 | 8/2003 | Bodin et al. |
| 6,606,663 B1 | 8/2003 | Liao et al. |
| 6,684,259 B1 | 1/2004 | Discavage et al. |
| 6,691,157 B2 | 2/2004 | Muir et al. |
| 6,691,232 B1 | 2/2004 | Wood et al. |
| 6,711,557 B1 | 3/2004 | Palaniappan |
| 6,714,979 B1 | 3/2004 | Brandt et al. |
| 6,724,875 B1 | 4/2004 | Adams et al. |
| 6,735,601 B1 | 5/2004 | Subrahmanyam |
| 6,757,894 B2 | 6/2004 | Eylon et al. |
| 6,763,370 B1 | 7/2004 | Schmeidler et al. |
| 6,766,457 B1 | 7/2004 | Baisley |
| 6,772,350 B1 | 8/2004 | Belani et al. |
| 6,779,179 B1 | 8/2004 | Romm et al. |
| 6,826,624 B1 | 11/2004 | Fell, Jr. |
| 6,839,765 B1 | 1/2005 | Sato |
| 6,851,114 B1 | 2/2005 | Czajkowski |
| 6,854,009 B1 | 2/2005 | Hughes |
| 6,880,002 B2 | 4/2005 | Hirschfeld et al. |
| 6,889,222 B1 | 5/2005 | Zhao |
| 6,889,249 B2 | 5/2005 | Miloushev et al. |
| 6,901,586 B1 | 5/2005 | Czajkowski |
| 6,918,113 B2 | 7/2005 | Patel et al. |
| 6,928,464 B2 | 8/2005 | Appiah et al. |
| 6,928,469 B1 | 8/2005 | Duursma et al. |
| 6,938,096 B1 | 8/2005 | Greschler et al. |
| 6,938,247 B2 | 8/2005 | Czajkowski |
| 6,952,714 B2 | 10/2005 | Peart |
| 6,959,320 B2 | 10/2005 | Shah et al. |
| 6,966,060 B1 | 11/2005 | Young et al. |
| 7,017,188 B1 | 3/2006 | Schmeidler et al. |
| 7,027,051 B2 | 4/2006 | Alford et al. |
| 7,028,305 B2 | 4/2006 | Schaefer |
| 7,051,315 B2 | 5/2006 | Artzi et al. |
| 7,065,637 B1 | 6/2006 | Nanja |
| 7,085,755 B2 | 8/2006 | Bluhm et al. |
| 7,089,553 B1 | 8/2006 | Glaser et al. |
| 7,092,987 B2 | 8/2006 | Brittingham et al. |
| 7,103,625 B1 | 9/2006 | Hipp et al. |

(56) References Cited

U.S. PATENT DOCUMENTS

| | | | |
|---|---|---|---|
| 7,117,243 B2 | 10/2006 | Peart | |
| 7,162,724 B2 | 1/2007 | Blaser et al. | |
| 7,200,632 B1 | 4/2007 | Greschler et al. | |
| 7,203,696 B2 | 4/2007 | Atm | |
| 7,203,941 B2 | 4/2007 | Demsey et al. | |
| 7,206,819 B2 | 4/2007 | Schmidt | |
| 7,213,153 B2 | 5/2007 | Hollander | |
| 7,213,247 B1 | 5/2007 | Wilner et al. | |
| 7,293,267 B1 | 11/2007 | Fresko | |
| 7,300,865 B2 | 11/2007 | Hsieh et al. | |
| 7,305,658 B1 | 12/2007 | Hamilton et al. | |
| 7,330,872 B2 | 2/2008 | Peart et al. | |
| 7,380,039 B2 | 5/2008 | Miloushev et al. | |
| 7,383,328 B2 | 6/2008 | Iyoki | |
| 7,409,405 B1 | 8/2008 | Masinter et al. | |
| 7,426,565 B1 | 9/2008 | Tormasov et al. | |
| 7,454,458 B2 | 11/2008 | Islam et al. | |
| 7,454,498 B2 | 11/2008 | Shuster | |
| 7,461,144 B1 | 12/2008 | Beloussov et al. | |
| 7,484,245 B1 | 1/2009 | Friedman et al. | |
| 7,496,576 B2 | 2/2009 | Bernabeu-Auban et al. | |
| 7,526,774 B1 | 4/2009 | Beck et al. | |
| 7,577,722 B1 | 8/2009 | Khandekar et al. | |
| 7,624,397 B1 | 11/2009 | Washburn et al. | |
| 7,779,034 B2* | 8/2010 | Pedersen et al. | 707/781 |
| 8,090,797 B2* | 1/2012 | Chinta et al. | 709/217 |
| 8,131,825 B2* | 3/2012 | Nord et al. | 709/219 |
| 8,171,479 B2* | 5/2012 | Laborczfalvi et al. | 718/104 |
| 8,171,483 B2* | 5/2012 | Nord et al. | 718/104 |
| 8,326,943 B2* | 12/2012 | Chinta et al. | 709/217 |
| 2001/0011254 A1 | 8/2001 | Clark | |
| 2001/0014892 A1 | 8/2001 | Gaither et al. | |
| 2001/0034736 A1 | 10/2001 | Eylon et al. | |
| 2001/0037399 A1 | 11/2001 | Eylon et al. | |
| 2001/0037400 A1 | 11/2001 | Raz et al. | |
| 2001/0044850 A1 | 11/2001 | Raz et al. | |
| 2001/0047386 A1 | 11/2001 | Domenikos et al. | |
| 2001/0047406 A1 | 11/2001 | Araujo et al. | |
| 2002/0010808 A1 | 1/2002 | Wiggins et al. | |
| 2002/0019972 A1 | 2/2002 | Grier et al. | |
| 2002/0035451 A1 | 3/2002 | Rothermel | |
| 2002/0042833 A1 | 4/2002 | Hendler et al. | |
| 2002/0049608 A1 | 4/2002 | Hartsell et al. | |
| 2002/0049841 A1 | 4/2002 | Johnson et al. | |
| 2002/0059274 A1 | 5/2002 | Hartsell et al. | |
| 2002/0059425 A1 | 5/2002 | Belfiore et al. | |
| 2002/0065864 A1 | 5/2002 | Hartsell et al. | |
| 2002/0065919 A1 | 5/2002 | Taylor et al. | |
| 2002/0078168 A1 | 6/2002 | Christfort et al. | |
| 2002/0078203 A1 | 6/2002 | Greschler et al. | |
| 2002/0080170 A1 | 6/2002 | Goldberg et al. | |
| 2002/0083183 A1 | 6/2002 | Pujare et al. | |
| 2002/0087717 A1 | 7/2002 | Artzi et al. | |
| 2002/0087883 A1 | 7/2002 | Wohlgemuth et al. | |
| 2002/0091763 A1 | 7/2002 | Shah et al. | |
| 2002/0095400 A1 | 7/2002 | Johnson et al. | |
| 2002/0095479 A1 | 7/2002 | Schmidt | |
| 2002/0105972 A1 | 8/2002 | Richter et al. | |
| 2002/0107903 A1 | 8/2002 | Richter et al. | |
| 2002/0107962 A1 | 8/2002 | Richter et al. | |
| 2002/0107971 A1 | 8/2002 | Bailey et al. | |
| 2002/0107989 A1 | 8/2002 | Johnson et al. | |
| 2002/0107990 A1 | 8/2002 | Johnson et al. | |
| 2002/0108059 A1 | 8/2002 | Canion et al. | |
| 2002/0112058 A1 | 8/2002 | Weisman et al. | |
| 2002/0116452 A1 | 8/2002 | Johnson et al. | |
| 2002/0133593 A1 | 9/2002 | Johnson et al. | |
| 2002/0138640 A1 | 9/2002 | Raz et al. | |
| 2002/0156831 A1 | 10/2002 | Suorsa et al. | |
| 2002/0156911 A1 | 10/2002 | Croman et al. | |
| 2002/0161908 A1 | 10/2002 | Benitez et al. | |
| 2002/0169887 A1 | 11/2002 | Melampy et al. | |
| 2002/0174215 A1 | 11/2002 | Schaefer | |
| 2002/0174227 A1 | 11/2002 | Hartsell et al. | |
| 2002/0174255 A1 | 11/2002 | Hayter et al. | |
| 2002/0184618 A1 | 12/2002 | Bala et al. | |
| 2002/0193985 A1 | 12/2002 | Park | |
| 2002/0194010 A1 | 12/2002 | Bergler et al. | |
| 2002/0199180 A1 | 12/2002 | Donaldson et al. | |
| 2003/0004882 A1 | 1/2003 | Holler et al. | |
| 2003/0009538 A1 | 1/2003 | Shah et al. | |
| 2003/0009685 A1 | 1/2003 | Choo et al. | |
| 2003/0051130 A1 | 3/2003 | Melampy et al. | |
| 2003/0056112 A1 | 3/2003 | Vinson et al. | |
| 2003/0065676 A1 | 4/2003 | Gbadegesin et al. | |
| 2003/0069923 A1 | 4/2003 | Peart | |
| 2003/0069924 A1 | 4/2003 | Peart et al. | |
| 2003/0088586 A1 | 5/2003 | Fitzpatrick et al. | |
| 2003/0088866 A1 | 5/2003 | Boldon et al. | |
| 2003/0101292 A1 | 5/2003 | Fisher et al. | |
| 2003/0105604 A1 | 6/2003 | Ash et al. | |
| 2003/0115458 A1 | 6/2003 | Song | |
| 2003/0140160 A1 | 7/2003 | Raz et al. | |
| 2003/0145222 A1 | 7/2003 | Gittler et al. | |
| 2003/0149685 A1 | 8/2003 | Trossman et al. | |
| 2003/0167463 A1 | 9/2003 | Munsil et al. | |
| 2003/0172138 A1 | 9/2003 | McCormack et al. | |
| 2003/0177178 A1 | 9/2003 | Jones et al. | |
| 2003/0191867 A1 | 10/2003 | Czajkowski | |
| 2003/0191971 A1 | 10/2003 | Klensin et al. | |
| 2003/0217105 A1 | 11/2003 | Zircher et al. | |
| 2003/0233489 A1 | 12/2003 | Blaser et al. | |
| 2003/0233490 A1 | 12/2003 | Blaser et al. | |
| 2003/0233541 A1 | 12/2003 | Fowler et al. | |
| 2003/0233544 A1 | 12/2003 | Erlingsson | |
| 2003/0233647 A1 | 12/2003 | Blaser et al. | |
| 2003/0236837 A1 | 12/2003 | Johnson et al. | |
| 2003/0236861 A1 | 12/2003 | Johnson et al. | |
| 2003/0236919 A1 | 12/2003 | Johnson et al. | |
| 2004/0031058 A1 | 2/2004 | Reisman | |
| 2004/0039594 A1 | 2/2004 | Narasimhan et al. | |
| 2004/0044643 A1 | 3/2004 | Devries et al. | |
| 2004/0045016 A1 | 3/2004 | Romm et al. | |
| 2004/0064488 A1 | 4/2004 | Sinha | |
| 2004/0068734 A1 | 4/2004 | Bond et al. | |
| 2004/0078591 A1 | 4/2004 | Teixeira et al. | |
| 2004/0098724 A1 | 5/2004 | Demsey et al. | |
| 2004/0117759 A1 | 6/2004 | Rippert et al. | |
| 2004/0128250 A1 | 7/2004 | Fox et al. | |
| 2004/0128346 A1 | 7/2004 | Melamed et al. | |
| 2004/0131042 A1 | 7/2004 | Lillie et al. | |
| 2004/0133650 A1 | 7/2004 | Miloushev et al. | |
| 2004/0153606 A1 | 8/2004 | Schott | |
| 2004/0186860 A1 | 9/2004 | Lee et al. | |
| 2004/0204073 A1 | 10/2004 | Yanosy | |
| 2004/0230971 A1 | 11/2004 | Rachman et al. | |
| 2004/0236777 A1 | 11/2004 | Pardikar et al. | |
| 2004/0249937 A1 | 12/2004 | Tachihara et al. | |
| 2004/0255048 A1 | 12/2004 | Lev Ran et al. | |
| 2004/0268361 A1 | 12/2004 | Schaefer | |
| 2005/0004942 A1 | 1/2005 | Madsen et al. | |
| 2005/0010670 A1 | 1/2005 | Greschler et al. | |
| 2005/0010924 A1 | 1/2005 | Hipp et al. | |
| 2005/0010927 A1 | 1/2005 | Stern et al. | |
| 2005/0015775 A1 | 1/2005 | Russell et al. | |
| 2005/0021613 A1 | 1/2005 | Schmeidler et al. | |
| 2005/0039190 A1 | 2/2005 | Rees et al. | |
| 2005/0044089 A1 | 2/2005 | Wu et al. | |
| 2005/0044108 A1 | 2/2005 | Shah et al. | |
| 2005/0050053 A1 | 3/2005 | Thompson | |
| 2005/0050084 A1 | 3/2005 | Atm | |
| 2005/0060725 A1 | 3/2005 | D'Souza et al. | |
| 2005/0063083 A1 | 3/2005 | Dart et al. | |
| 2005/0065937 A1 | 3/2005 | Degenaro et al. | |
| 2005/0080906 A1 | 4/2005 | Pedersen | |
| 2005/0091214 A1 | 4/2005 | Probert et al. | |
| 2005/0091511 A1 | 4/2005 | Nave et al. | |
| 2005/0091534 A1 | 4/2005 | Nave et al. | |
| 2005/0091535 A1 | 4/2005 | Kavalam et al. | |
| 2005/0091655 A1 | 4/2005 | Probert et al. | |
| 2005/0091658 A1 | 4/2005 | Kavalam et al. | |
| 2005/0114296 A1 | 5/2005 | Farber et al. | |
| 2005/0114870 A1 | 5/2005 | Song et al. | |
| 2005/0125663 A1 | 6/2005 | Funk | |

(56) References Cited

U.S. PATENT DOCUMENTS

| | | |
|---|---|---|
| 2005/0149726 A1 | 7/2005 | Joshi et al. |
| 2005/0165853 A1 | 7/2005 | Turpin et al. |
| 2005/0165928 A1 | 7/2005 | Shu et al. |
| 2005/0169073 A1 | 8/2005 | Cook et al. |
| 2005/0172279 A1 | 8/2005 | Cook et al. |
| 2005/0192921 A1 | 9/2005 | Chaudhuri et al. |
| 2005/0193139 A1 | 9/2005 | Vinson et al. |
| 2005/0193396 A1 | 9/2005 | Stafford-Fraser et al. |
| 2005/0195835 A1 | 9/2005 | Savage et al. |
| 2005/0198239 A1 | 9/2005 | Hughes |
| 2005/0229154 A1 | 10/2005 | Hiew et al. |
| 2005/0246444 A1 | 11/2005 | Koehane et al. |
| 2005/0246704 A1 | 11/2005 | Romm et al. |
| 2005/0257265 A1 | 11/2005 | Cook et al. |
| 2005/0257266 A1 | 11/2005 | Cook et al. |
| 2005/0262181 A1 | 11/2005 | Schmidt et al. |
| 2006/0010433 A1 | 1/2006 | Neil |
| 2006/0020858 A1 | 1/2006 | Schaefer |
| 2006/0020937 A1 | 1/2006 | Schaefer |
| 2006/0026602 A1 | 2/2006 | Duplichan |
| 2006/0031165 A1 | 2/2006 | Nave et al. |
| 2006/0036570 A1 | 2/2006 | Schaefer et al. |
| 2006/0037004 A1 | 2/2006 | Long et al. |
| 2006/0041761 A1 | 2/2006 | Neumann et al. |
| 2006/0048145 A1 | 3/2006 | Celli et al. |
| 2006/0053228 A1 | 3/2006 | Rachman et al. |
| 2006/0064697 A1 | 3/2006 | Kagi et al. |
| 2006/0089992 A1 | 4/2006 | Blaho |
| 2006/0090171 A1 | 4/2006 | Laborczfalvi et al. |
| 2006/0136389 A1 | 6/2006 | Cover et al. |
| 2006/0174223 A1 | 8/2006 | Muir et al. |
| 2006/0184935 A1 | 8/2006 | Abels et al. |
| 2006/0206931 A1 | 9/2006 | Dillaway et al. |
| 2006/0248527 A1 | 11/2006 | Jaeckel et al. |
| 2006/0257266 A1 | 11/2006 | LeDoux et al. |
| 2006/0265714 A1 | 11/2006 | Bissett et al. |
| 2007/0006226 A1 | 1/2007 | Hendel |
| 2007/0011672 A1 | 1/2007 | Bhide et al. |
| 2007/0067366 A1 | 3/2007 | Landis |
| 2007/0094667 A1 | 4/2007 | Bissett et al. |
| 2007/0168466 A1 | 7/2007 | Tooley et al. |
| 2007/0171921 A1 | 7/2007 | Wookey et al. |
| 2007/0179955 A1 | 8/2007 | Croft et al. |
| 2007/0192444 A1 | 8/2007 | Ackaouy et al. |
| 2007/0245409 A1 | 10/2007 | Harris et al. |
| 2008/0016233 A1 | 1/2008 | Schneider |
| 2008/0082639 A1 | 4/2008 | Hochmuth et al. |
| 2008/0100892 A1 | 5/2008 | Hendriks et al. |
| 2008/0117909 A1 | 5/2008 | Johnson |
| 2008/0133486 A1 | 6/2008 | Fitzgerald et al. |
| 2008/0134176 A1 | 6/2008 | Fitzgerald et al. |
| 2008/0163210 A1 | 7/2008 | Bowman et al. |
| 2008/0222160 A1 | 9/2008 | MacDonald et al. |
| 2009/0024997 A1 | 1/2009 | Kobayashi |
| 2009/0157697 A1 | 6/2009 | Conway et al. |
| 2009/0241108 A1 | 9/2009 | Edwards et al. |
| 2009/0254927 A1 | 10/2009 | Shlomai et al. |
| 2010/0100892 A1 | 4/2010 | Fought et al. |
| 2011/0029968 A1 | 2/2011 | Sanders et al. |

FOREIGN PATENT DOCUMENTS

| | | | |
|---|---|---|---|
| AU | 711280 B2 | | 10/1999 |
| AU | 5104699 A | | 2/2000 |
| AU | 1727200 A | | 6/2000 |
| AU | 2463700 A | | 8/2000 |
| AU | 2862500 A | | 8/2000 |
| AU | 4236100 A | | 11/2000 |
| AU | 2957501 A | | 7/2001 |
| AU | 2973701 A | | 7/2001 |
| AU | 3282501 A | | 7/2001 |
| AU | 3857201 A | | 8/2001 |
| AU | 4350201 A | | 9/2001 |
| AU | 4555401 A | | 9/2001 |
| AU | 6498901 A | | 12/2001 |
| AU | 7865401 A | | 1/2002 |
| AU | 9079601 A | | 3/2002 |
| AU | 9308701 A | | 4/2002 |
| AU | 9308801 A | | 4/2002 |
| AU | 3403602 | | 5/2002 |
| AU | 2002309834 A2 | | 11/2002 |
| AU | 2003243543 A1 | | 12/2003 |
| AU | 2003251504 A1 | | 12/2003 |
| AU | 2003251505 A1 | | 12/2003 |
| CA | 2248086 A1 | | 9/1997 |
| CA | 2361342 A1 | | 2/2000 |
| CA | 2354078 A1 | | 7/2000 |
| CA | 2307008 | | 10/2000 |
| CA | 2421609 | | 3/2002 |
| CA | 2427847 A1 | | 4/2002 |
| CA | 2427848 A1 | | 4/2002 |
| CA | 2465880 A1 | | 11/2002 |
| CN | 1185591 A | | 6/1998 |
| CN | 1354857 A | | 6/2002 |
| CN | 1599901 | | 3/2005 |
| EP | 0 863 453 A1 | | 9/1998 |
| EP | 0 901 655 A1 | | 3/1999 |
| EP | 0 927 921 A2 | | 7/1999 |
| EP | 0 990 327 A1 | | 4/2000 |
| EP | 1 021 782 A2 | | 7/2000 |
| EP | 1 037 147 | | 9/2000 |
| EP | 1 047 239 | | 10/2000 |
| EP | 1 049 306 | | 11/2000 |
| EP | 1 097 416 A2 | | 5/2001 |
| EP | 1 131 934 A2 | | 9/2001 |
| EP | 1 163 599 A1 | | 12/2001 |
| EP | 1 241 575 A2 | | 9/2002 |
| EP | 1 289 225 | | 3/2003 |
| EP | 1 311 957 A2 | | 5/2003 |
| EP | 1 330 705 | | 7/2003 |
| EP | 1 330 738 A1 | | 7/2003 |
| EP | 1 332 432 A1 | | 8/2003 |
| EP | 1 364 296 | | 11/2003 |
| EP | 1 388 812 | | 2/2004 |
| EP | 1 410 219 A2 | | 4/2004 |
| JP | 06-332782 | | 12/1994 |
| JP | 2000-307650 | | 11/2000 |
| JP | 2001-502821 | T | 2/2001 |
| JP | 2002-508907 | T | 3/2002 |
| JP | 2002-521745 | T | 7/2002 |
| JP | 2003-527645 | T | 9/2003 |
| JP | 2003-532166 | T | 10/2003 |
| JP | 2004-504681 | T | 2/2004 |
| JP | 2004-509539 | | 3/2004 |
| JP | 2004-533054 | T | 10/2004 |
| KR | 990003481 | | 9/2000 |
| KR | 990068380 | | 9/2000 |
| KR | 2000057127 | | 9/2000 |
| WO | WO-97/34225 A1 | | 9/1997 |
| WO | WO-98/47074 | | 10/1998 |
| WO | WO-98/50874 A2 | | 11/1998 |
| WO | WO-98/59460 A1 | | 12/1998 |
| WO | WO-99/60462 A1 | | 11/1999 |
| WO | WO-00/05637 A2 | | 2/2000 |
| WO | WO-00/30323 A2 | | 5/2000 |
| WO | WO-00/43919 A1 | | 7/2000 |
| WO | WO-00/45262 A2 | | 8/2000 |
| WO | WO-00/51290 A2 | | 8/2000 |
| WO | WO-00/46685 A1 | | 10/2000 |
| WO | WO-00/62161 A2 | | 10/2000 |
| WO | WO-00/62507 A1 | | 10/2000 |
| WO | WO-01/00651 A1 | | 1/2001 |
| WO | WO-01/25894 A1 | | 4/2001 |
| WO | WO-01/35717 A2 | | 5/2001 |
| WO | WO-01/53938 A1 | | 7/2001 |
| WO | WO-01/53940 A2 | | 7/2001 |
| WO | WO-01/54375 A2 | | 7/2001 |
| WO | WO-01/55813 A2 | | 8/2001 |
| WO | WO-01/61967 A2 | | 8/2001 |
| WO | WO-01/67379 A2 | | 9/2001 |
| WO | WO-01/69448 A1 | | 9/2001 |
| WO | WO-01/75632 A1 | | 10/2001 |
| WO | WO-01/90901 A2 | | 11/2001 |

(56) References Cited

FOREIGN PATENT DOCUMENTS

| | | |
|---|---|---|
| WO | WO-01/95094 A2 | 12/2001 |
| WO | WO-02/07364 A2 | 1/2002 |
| WO | WO-02/23362 A1 | 3/2002 |
| WO | WO-02/23363 A1 | 3/2002 |
| WO | WO-02/27492 A1 | 4/2002 |
| WO | WO-02/27556 A1 | 4/2002 |
| WO | WO-02/37267 A2 | 5/2002 |
| WO | WO-02/39221 A2 | 5/2002 |
| WO | WO-02/39260 A2 | 5/2002 |
| WO | WO-02/39261 A2 | 5/2002 |
| WO | WO-02/39262 A2 | 5/2002 |
| WO | WO-02/39263 A2 | 5/2002 |
| WO | WO-02/39264 A2 | 5/2002 |
| WO | WO-02/39275 A2 | 5/2002 |
| WO | WO-02/39276 A2 | 5/2002 |
| WO | WO-02/39301 A2 | 5/2002 |
| WO | WO-02/39666 A2 | 5/2002 |
| WO | WO-02/39693 A2 | 5/2002 |
| WO | WO-02/39695 A2 | 5/2002 |
| WO | WO-02/41575 A2 | 5/2002 |
| WO | WO-02/42922 A2 | 5/2002 |
| WO | WO-02/43320 A2 | 5/2002 |
| WO | WO-02/43364 A2 | 5/2002 |
| WO | WO-02/46925 A2 | 6/2002 |
| WO | WO-02/46944 A2 | 6/2002 |
| WO | WO-02/46945 A2 | 6/2002 |
| WO | WO-02/058349 A1 | 7/2002 |
| WO | WO-02/069604 A2 | 9/2002 |
| WO | WO-02/093369 A1 | 11/2002 |
| WO | WO-02/103521 A1 | 12/2002 |
| WO | WO-03/012578 | 2/2003 |
| WO | WO-03/029977 A2 | 4/2003 |
| WO | WO-03/107183 A1 | 12/2003 |
| WO | WO-03/107220 A1 | 12/2003 |
| WO | WO-03/107221 A1 | 12/2003 |
| WO | WO-2004/003879 | 1/2004 |
| WO | WO-2004/006041 A2 | 1/2004 |
| WO | WO-2004/017601 A2 | 2/2004 |
| WO | WO-2004/049672 A2 | 6/2004 |
| WO | WO-2004/051964 A2 | 6/2004 |
| WO | WO-2004/066278 A2 | 8/2004 |
| WO | WO-2005/024550 A2 | 3/2005 |
| WO | WO-2005/024567 A2 | 3/2005 |
| WO | WO-2005/024665 A1 | 3/2005 |
| WO | WO-2005/029313 A1 | 3/2005 |
| WO | WO-2005/029363 A1 | 3/2005 |
| WO | WO-2005/045616 A2 | 5/2005 |
| WO | WO-2005/052762 A2 | 6/2005 |
| WO | WO-2005/059726 A2 | 6/2005 |
| WO | WO-2005/074232 A1 | 8/2005 |
| WO | WO-2005/084232 A2 | 9/2005 |
| WO | WO-2006/012533 A2 | 2/2006 |
| WO | WO-2006/017388 A1 | 2/2006 |
| WO | WO-2006/020094 A2 | 2/2006 |
| WO | WO-2006/039239 | 4/2006 |
| WO | WO-2009/052346 | 4/2009 |

OTHER PUBLICATIONS

Adaballa et al., "From Virtualized Resources to Virtualized Computing Grids: The In-VIGO System," J. Future-Generation Computing System, (2004) to appear.

Allison, Bridget et al., "File System Security: Secure Network Data Sharing for NT and UNIX," in Network Appliance, Inc. Tech Library pp. 16 pgs. Jan 1, 1998.

Anonymous, "Health Canada Takes Its Network Pulse," Communications News, 48, Oct. 2001, available at http://www.findarticles.com/p/articles/mi_m0DUD/is_5_23/ai_86039142/.

Anonymous, "Multiple Platforms Bring Multiple Challenges," Communications News, 56, Oct. 2001, available at http://www.findarticles.com/p/articles/mi_m0CMN/is_10_38/ai_79370488.

Anonymous, "Remote Access," Secure Computing, 47-60, Oct. 1997.

Antonoff, M., "Writing in a Spreadsheet," Personal Computing, 51-54, 1987.

Ao et al., "A Hierarchical Policy Specification Language, and Enforcement Mechanism, for Governing Digital Enterprises", 3rd IEEE International Workshop on Policies for Distributed Systems and Networks (Policy 2002), 38-49, IEEE CS Press, 2002, available at http://www.cs.rutgers.edu/~tdnguyen/pubs/ao-policy-2002.pdf.

Bach M J: "The Design of the UNIX Operating System, Passage 15-16", Jan. 1, 1986, Englewood Cliffs, Prentice Hall, US, ISBN: 978-0-13-201799-2.

Back et al., "Contracts, Games and Refinement," TUCS Technical Report No. 138, Turku Centre for Computer Science, 1-15, Nov. 1997.

Bala et al., "Dynamo: A Transparent Dynamic Optimization System," Proc ACM SIGPLAN2000 Conf. Programming Language Design and Implementation, ACM Press, 2000, pp. 1-12.

Baraz et al., IA-32 Execution Layer: A Two-Phase Dynamic Translator Designed to Support IA-32 Applications on Itanium-Based Systems, Proc. 36th Ann. IEEE/ACM Intl Symp. Microarchitecture, IEEE CS Press, 2003, pp. 191-204.

Barham et al., "Xen and the Art of Virtualization," Proc. 19th ACM Symp. Operating Systems Principles, ACM Press, 2003, pp. 164-177.

Beers, C., "McAfee Shores Up Your Defenses," Network Computing, 38, Jun. 2003, available at http://www.networkcomputing.com/1412/1412sp3.html.

Biggins, "Sychron Rises from the Ashes to Try its Hand at Desktop Virtualization", Jan. 17, 2006 (available at http://www.the451group.com/mis/451 mis.php?sector focus=10).

Bird, T., "Reduce the Threat from Computers," Communications News, 36, 38-39, Mar. 2005, available at http://www.comnews.com/stories/articles/0305/0305reduce_threat.htm.

Borden et al, "Multiple Operating Systems on One Processor Complex," IBM Systems J., Jan. 1989, pp. 104-123.

Bouras, et al., "Application on Demand System over the Internet", Journal of Network and Computer Applications, Academic Press, New York, NY, US, 28(3):209-232, 2005.

Box, Essential .NET, vol. 1: The Common Language Runtime, Addison-Wesley, 2002.

Boyd et al., "Preemptive module replacement using the virtualizing operating system realizing multi-dimensional software adaptation," Proceedings of the ACM Workshop on Self-Healing, Adaptive and self-MANaged Systems (SHAMAN), in conjunction with the 16th Annual ACM International Conference on Supercomputing, (New York, NY), Jun. 2002.

Boyd et al., "Virtualizing Operating Systems for Seamless Distributed Environments," in Proceedings of the IASTED International Conference on Parallel and Distributed Computing and Systems, vol. 2, Nov. 2000, pp. 735-740.

Boyd, et al., "Process Migration: A Generalized Approach Using a Virtualizing Operating System," Proceedings of the 22nd International Conference on Distributed Computing Systems, ICDS 2002, Vienna Austria, Jul. 2-5, 2002, International Conference on Distributed Computing Systems, Los Alamitos, CA: IEEE Comp. Soc, US, vol. Conf. 22, Jul. 2, 2002, pp. 348-355.

Brekne, T., "Mobile Agents and (In-)Security," Telektronikk, 34-46, 2000.

Bressoud and Schneider, "Hypervisor-based Fault-tolerance," Proc. 15th ACM Symp. Operating Systems Principles, ACM Press, 1995, pp. 1-11.

Bugnion et al., "Disco: Running Commodity Operating Systems on Scalable Multiprocessors," Computer Systems, vol. 15, No. 4, 1997, pp. 412-447.

Burnett et al., "SLN116 Using a Virtual Infrastructure to Implement Hosted Desktop Solutions", VM World 2005, pp. 1-30, 2005.

Canadian Office Action on 2581311 dated Jul. 2, 2013.

Canadian Office Action on 2581345 dated Jul. 4, 2013.

Carvalho et al., "Supporting Flexible Data Feeds in Dynamic Sensor Grids Through Mobile Agents," Lecture Notes in Computer Science vol. 2535, Proc. 6th International Conference on Mobile Agents (MA 2002), 171-185, Springer-Verlag, Germany, 2002.

Chandra et al., "The Collective: A Cache-Based System Management Architecture," Proc. Symp. Network Systems Design and Implementation, USENIX, 2005, to appear.

(56) References Cited

OTHER PUBLICATIONS

Cheng et al., "Adjusting the Autonomy of Collections of Agents in Multiagent Systems," Lecture Notes in Computer Science vol. 3501, 33-37, Advances in Artificial Intelligence: Proc. 18th Conference of the Canadian Society for Computational Studies of Intelligence (Canadian AI 2005), Springer-Verlag, Germany, 2005.
Chinese First Office Action on 200880112352.9 dated Jun. 24, 2013.
Chinese First Office Action on 200880112352.9 dated Sep. 26, 2012.
Chinese Notification to Grant Patent Right on 200910009933.6 dated Nov. 28, 2013.
Chinese Office Action on 200580041055.6 dated Oct. 9, 2012.
Chinese Office Action on 200680045934.0 dated Dec. 19, 2011.
Chinese Office Action on 200810131669.9 dated Dec. 23, 2011.
Chinese Office Action on 200810131669.9 dated Jun. 5, 2013.
Chinese Office Action on 200810131669.9 dated Aug. 30, 2012.
Chinese Office Action on 200880112352.9 dated Dec. 26, 2013.
Chinese Office Action on 200910009933.6 dated Nov. 15, 2012.
Chinese Office Action on 200910009933.6 dated Jun. 13, 2013.
Chinese Office Action on 201080029718.3 dated Oct. 18, 2013.
Chinese Office Action on 201080029718.3 dated Mar. 10, 2014.
Chinese Office Action on 201210375059.X dated Feb. 25, 2014.
Chinese Office Action, dated May 16, 2008, in Chinese Patent Application No. 200580041055.6.
Chinese Office Action, dated May 23, 2008, in Chinese Patent Application No. 200580041022.1.
Chinese Reexamination Notice on 200580041055.6 dated May 3, 2012.
Chinese Third Office Action on 200680045934.0 dated Jul. 24, 2012.
Citrix XenApp Application Streaming; http://www.citrix.com/English/ps2/products/subfeature.asp?contentID=163987; printed Nov. 17, 2008.
CN Office Action regarding CN 200580041015.1 mailed Jul. 4, 2011.
Corradi et al., "Policy-Driven Management of Agent Systems," Lecture Notes in Computer Science vol. 1995, Policies for Distributed Systems and Networks: Proc. International Workshop (Policy 2001), 214-229, Springer-Verlag, Germany, 2001.
Cowan, et al., "Subdomain: Parsimonious Server Security", Proceeding of the 14th Usenix Systems Administration Conference, pp. 1-20, 2000. URL: http://coblitz.codeen.org:3125/citeseer.ist.psu.edu/cache/papers/cs/20700/http:zSzzSzwww.cse.ogi.eduzSz~crispinzSzsubdomain.pdf/cowan00subdomain.pdf.
Creasy, "The Origin of the VM/370 Time-Sharing System," IBM J. Research and Development, Sep. 1981, pp. 483-490.
Czajkowski et al., "A Multi-User Virtual Machine", Proc. of the USENIX 2003 Annual Technical Conference, 2003, pp. 85-98.
Declaration of Non-Establishment of International Search Report, PCT/US2007/060963, mailed May 30, 2007. 2 pages.
Declaration of Non-Establishment of International Search Report, PCT/2005/034178, mailed on Jan. 2, 2006.
Declaration of Non-Establishment of International Search Report, PCT/US2007/060895, mailed Sep. 21, 2007. 2 pages.
Dulay et al., "A Policy Deployment Model for the Ponder Language," Proc. IEEE/IFIP—International Symposium on Integrated network Management (IM 2001) 529-543 Seattle.
Dunlap et al., "ReVirt: Enabling Intrusion Analysis through Virtual-Machine Logging and Replay," Proc. 5th Symp. Operating Systems Design and Implementation, USENIX, 2002, pp. 211-224.
England et al., "A Trusted Open Platform," Computer, Jul. 2003, pp. 55-62.
Enterprise Hosted Desktop, VM World 2005, pp. 1-41, 2005.
Epema et al., "A Worldwide Flock of Condors: Load sharing among Workstation Clusters," J. Future Generation Computer Systems, vol. 12, No. 1, 1996, pp. 53-65.
EPO Communication on 10715388.4 dated Dec. 12, 2011.
Esposito, A. et al., "Integrating Concurrency Control and Distributed Data into Workflow Frameworks: An Actor Model Perspective," 2000 IEEE International Conference on Systems, Man, and Cybernetics, vol. 3, 2110-2114, IEEE Press, 2000.
European Examination Report on 05803735.9 dated Nov. 4, 2013.
European Exam Report for 07113091.8 dated Jun. 16, 2011.
European Exam Report on 07113105.6 dated Jun. 24, 2011.
European Examination Report on 05800850.9 dated Jan. 14, 2013.
European Examination Report on 05800952.3 dated Feb. 23, 2012.
European Examination Report on 05801143.8 dated Jul. 3, 2013.
European Examination Report on 07112169.3 dated Jan. 16, 2013.
European Examination Report on 07112979.5 dated Oct. 11, 2012.
European Examination Report on 07113105.6 dated Jan. 16, 2012.
European Search Report, 4324MNMms, dated Jan. 10, 2008 in Application No. 07113091.8-2211.
European Search Report, 4325MNMms, dated on Jan. 15, 2008 in Application No. 07113105.6-2211.
European Search Report, dated Jan. 8, 2008 in Application No. 05800952.3-2211.
European Search Report, dated Jul. 20, 2007 in Application No. 05800952.3-2211.
European Search Report, dated May 23, 2008 in Application No. 07112164.4-2211.
European Search Report, dated May 6, 2008 in Application No. 07112979.5-2211.
European Search Report, dated May 8, 2008, in Application No. 07112596.7-2211.
European Search Report, dated Sep. 25, 2007 in Application No. 07112164.4-2211.
Examination Report regarding EP 05800804.6 mailed Feb. 1, 2011.
Examination Report regarding EP 05800850.9 mailed Jan. 28, 2011.
Examination Report regarding EP 08839239.3 mailed Sep. 28, 2010.
Extended European Search Report on 12176425.2 dated Jan. 3, 2013.
Extended European Search Report on 12176490.6 dated Dec. 10, 2012.
Extended European Search Report on 12186531.5 dated Dec. 4, 2012.
Extended European Search Report on 12186533.1 dated Dec. 3, 2012.
Extended European Search Report on 12186541.4 dated Dec. 3, 2012.
Extended European Search Report on 12186858.2 dated Dec. 3, 2012.
Feldman, M., "Enterprise Wrappers for Information Assurance," Proc. DARPA Information Survivability Conference and Exposition (DISCEX '03), IEEE Press, 2003.
Fellows, "Parallels prices virtualization at 50% less than VMware, Microsoft", Oct. 24, 2005 (available at http://www.the451group.com/about/bio_detail.php?eid=113).
Figueiredo et al, "A Case for Grid Computing on Virtual Machines," Proc. Int'l Conf. Distributed Computing Systems (ICDCS 03), IEEE CS Press, 2003, pp. 550-559.
Figueiredo et al, "Resource Virtualization Renaissance," Computer, May 2005 pp. 28-31.
First Indian Examination Report on 1372/KOLNP/2007 dated Feb. 22, 2013.
First Indian Examination Report on 1376/KOLNP/2007 dated Mar. 4, 2013.
Foster and Kesselman, The Grid: Blueprint for a New Computing Infrastructure, "Globus: A Toolkit-Based Grid Architecture," Morgan Kaufmann, 1999, pp. 259-278.
Foster et al., "The Physiology of the Grid: An Open Grid Services Architecture for Distributed Systems Integration," Open Grid Service Infrastructure WG, Global Grid Forum, Jun. 2002 (available at http://www.olobus.oro/research/papers/oosa.odt).
Fourth European Examination Report on 07113105.6 dated Jun. 15, 2012.
Fourth Examination Report on 05800952.3 dated Jul. 19, 2012.
Fratto, M., "Hammering Out a Secure Framework," Network Computing, 79-80, 82, 84-87, 2000, available at http://www.networkcomputing.com/1101/1101f3.html.
Friedlander and Yates, "Desktop Virtualization Is the Future of the Corporate PC", pp. 1-11, 2006 (available at www.forrester.com).
Funk Software, "Funk Software's Endpoint Assurance Solution. The Secure Product Foundation for Endpoint Integrity," 2005, available at: http://www.juniper.net/welcome_funk.html.
Garfinkel and Rosenblum, "A Virtual Machine Introspection Based Architecture for Intrusion Detection," Proc. Network and Distributed Systems Security Symp., The Internet Society, 2003, pp. 191-206.

(56) References Cited

OTHER PUBLICATIONS

Garfinkel et al., "Terra: A Virtual Machine-Based Platform for Trusted Computing," Proc. 19th ACM Symp. Operating Systems Principles, ACM Press, 2003, pp. 193-206.

Goldberg, "Survey of Virtual Machine Research," Computer, Jun. 1974, pp. 34-45.

Graniero, P.A. et al. "Investigating the Role of Fuzzy Sets in a Spatial Modeling Framework," Proc. 9th IFSA World Congress and 20th NAFIPS International Conference, 2370-2375, IEEE Press 2001.

Guy III, E.T., "An Introduction to the CAD Framework Initiative," Electro 1992 Conference Record, 78-83, Massachusetts, May 1992.

Indian Examination Report on 1369/KOLNP/2007 dated Feb. 6, 2014.

Indian Examination Report on 1454/KOLNP/2007 dated Jan. 30, 2014.

Intel Corp., "Intel Virtualization Technology Specification for the IA-32 Intel Architecture," (available at http://www.cs.utah.edu/Classes/cs7940-010-raieev/spr06/Daperslvm.

Intel Corp., "Intel Virtualization Technology Specification for the Intel Itanium Architecture (VT-i);" (available at www.intel.com/cd/00/00/21/421214273_214273.pdf).

International Preliminary Report on Patentability on PCT/US2010/030515 dated Nov. 17, 2011.

International Preliminary Report on patentability, PCT/US05/028606, issued Apr. 3, 2007.

International Preliminary Report on Patentability, PCT/US2007/060895, mailed Aug. 7, 2008, Issued Jul. 29, 2008, 5 pgs.

International Preliminary Report on Patentability, PCT/US2007/060963, mailed Aug. 7, 2008, Issued Jul. 29, 2008, 5 pgs.

International Search Report, PCT/ US05/028605, mailed on Jan. 18, 2005.

International Search Report, PCT/US2005/028607, mailed Mar. 31, 2006.

International Search Report, PCT/US2005/033994, mailed on Feb. 15, 2006.

International Search Report, PCT/US2005/034177, mailed on Feb. 21, 2006.

International Search Report, PCT/US2005/034302, mailed on May 8, 2006.

International Search Report, PCT/US2005/034449, mailed on Mar. 3, 2006.

International Search Report, PCT/US2006/037602, mailed May 31, 2007.

International Search Report, PCT/US2007/060963, mailed Jul. 24, 2008, 2 pgs.

Jiang and Xu, "VIOLIN: Virtual Internetworking on Overlay Infrastructure," Proc. 2nd Int'l Symp. Parallel and Distributed Processing and Applications, LNCS 3358, Springer-Verlag, 2004, pp. 937-946.

Jiang and Xu, "SODA: A Service-On-Demand Architecture for Application Service Hosting Utility Platforms," Proc. 12th IEEE Int'l Symp. High-Performance Distributed Computing (HPDC-12), IEEE CS Press, 2003, pp. 174-183.

Jin, H. et al., "A Distributed Dynamic μFirewall Architecture With Mobile Agents and KeyNote Trust Management System," Lecture Notes in Computer Science, vol. 2513, Proc. 4th International Conference on Information and Communications Security, (ICICS 2002), 13-24, Springer-Verlag, Germany, 2002.

Jun, M. et al., "Application of Mobile Scanning Agent in the Network Security," J. of Systems Engineering and Electronics, 15(3): 371-376, 2004.

Juniper Networks NetScreen-SA 5000 Series. Spec Sheet, Secure Access Appliances. Juniper Networks, Sunnyvale, CA, 4 pages.

Juniper Networks, "Juniper Networks Infranet Controllers Provide Unified Access Control for all Users throughout Your Network," (Oct. 2005), available at: http://www.juniper.nel/products/ua/dsheet/100137.pdf.

Keromytis, A.D. et al., "Transparent Network Security Policy Enforcement," Proc. USENIX Technical Conference, 215-225, San Diego, CA, USA, 2000.

Kim, S.C. et al., "Study of Security Management System Based on Client/Server Model," 1403-1408, IEEE Press, 1999.

Klaiber, "The Technology Behind Crusoe Processors: Low-Power x86-Compatible Processors Implemented with Code Morphing Software," tech. brief, Transmeta Corp., 2000.

Klein, D., "Developing Applications with a UIMS," Proc. USENIX Applications Development Symposium, 37-56, 1994.

Kosar, T. et al., "A Framework for Reliable and Efficient Data Placement in Distributed Computing Systems," Journal of Parallel and Distributed Computing, vol. 65 (10), 1146-1157, Academic Press, Inc., Orlando, FL, USA, 2005.

Kozuch and Satyanarayanan, "Internet Suspend/Resume," Proc. IEEE Workshop Mobile Computing Systems and Applications, IEEE Press, 2002, pp. 40-46.

Krief, F. et al., "An Intelligent Policy-Based Networking Environment for Dynamic Negotiation, Provisioning and Control of QoS," IFIP TC6/WG6.2 & WG6.7 Conference on Network Control and Engineering for QoS, Security and Mobility, (Net-Con 2002), 285-290, Kluwer Academic Publishers, 2002.

Krsul et al., "VMPlants: Providing and Managing Virtual Machine Execution Environments for Grid Computing," Proc. IEEE/A CM Supercomputing, IEEE CS Press, 2004, p. 7.

Law, K.L.E. et al., "Policy-Based Management With Active Networks," IFIP TC6/WG6.2 &WG6.7 Conference on Network Control and Engineering for QoS, Security and Mobility, (Net-Con 2002), 129-140, Kluwer Academic Publishers 2002.

Law, K.L.E. et al., "UPM: Unified Policy-Based Network Management," Proc. SPIE, (ITCom 2001), vol. 4523, 326-337, Denver, CO, USA, 2001.

Law, K.L.E. et al., "Performance of a Multi-Tiered Policy-Based Management System," IFIP TC6/WG6.2 & WG6.7 Conference on Network Control and Engineering for QoS, Security and Mobility, (Net-Con 2002), 203-214, Kluwer Academic Publishers, 2002.

Lee, D.W. et al., "Managing Fault Tolerance Information in Multi-Agents Based Distributed Systems," Lecture Notes in Computer Science, vol. 2690, Intelligent Data Engineering and Automated Learning, (IDEAL 2003), 104-108, Springer-Verlag, Germany, 2003.

Liang, Z., et al., "Isolated Program Execution: An Application Transparent Approach for Executing Untrusted Programs," Computer Security App. Conf. 182-191, 2003.

Lindholm and Yellin, The Java Virtual Machine Specification, 2nd ed., Addison-Wesley, 1999.

Madden, "Providing Desktops to Users: Centralized Virtual Machines or Terminal Server Desktops?", Oct. 24, 2005.

Maes, S. et al., "Identifiability of Causal Effects in a Multi-Agent Causal Model," IEEE/WIC International Conference on Intelligent Agent Technology, (IAT'03), 605, IEEE Press, 2003.

Magnusson, "The Virtual Test Lab," Embedded Computing, May 2005, pp. 95-97.

Mahler, R.P. et al. "Technologies for Unified Collection and Control of UCAVs," Proc. of SPIE vol. 4729, 90-101, 2002.

Matsuura, S. et al., "An Extension of ECA Architecture and its Application to HTML Document Browsing," IEEE International Conference on Systems, Man, and Cybernetics, vol. 1, 738-743, IEEE Press 1999.

Maxim, M. and Venugopal, A., "Securing Agent Based Architectures," Lecture Notes in Computer Science vol. 2480, Proc. First International Conference on Engineering and Deployment of Cooperative Information Systems, 220-231, Springer-Verlag, Germany, 2002.

McAfee System Protection Solutions, "Enforcing Endpoint Policies for Network Access with Policy Enforcer: Selecting the Right Solution for your Environment," 2005, available at http:/mcafee.com/us/local content/white papers/wp_mpe securingyounetwork.pdf.

McAfee System Protection Solutions, "McAfee Policy Enforcer," 2005, available at: http://www.mcafee.com/us/local content/datasheets/ds policy enforcer.pdf.

Meyer, B. et al., "Towards Implementing Policy-Based Systems Management," Distrib. Syst. Engng vol. 3, 78-85, The Institution of Electrical Engineers and IOP Publishing, Ltd., 1996, available at http://www.mobile.ifi.lmu.de/common/Literatur/MNMPub/Publikationen/map96/PDF-Version/map96.pdf.

(56) References Cited

OTHER PUBLICATIONS

Microsoft Corp., "Microscoft Virtual Server 2005 R2 Technical Overview," 2004, (available at http://downloadmicrosoft.com/download/5/5/3/55321426-cb-43-4572-9123-74ca3af6911d/VS2005Tech WP.doc ).
Molta, D., "Odyssey Makes Wireless LANs a Safe Trip," Networking Computing, 24, 26, 2002, available at <http://www.networkcomoutina.com/1311/1311so2.html>.
Montananri R. et al, "Context-Based Security Management for Multi-Agent Systems," Proc. Second IEEE Symposium on Multi-Agent Security and Survivability (MAS&S 2005), IEEE Press, 2005.
Moving Toward the On Demand Enterprise, How Sychron Solutions Can Make it a Reality pp. 1-5, 2005 (available at www.sychron.com).
Neuman et al., The Kerberos Network Authentication Service (V5), Internet draft, work in progress, Sep. 2004.
Notice of Allowance for U.S. Appl. No. 11/231,370 dated Sep. 7, 2011.
Notice of Allowance on U.S. Appl. No. 10/711,736 dated Feb. 29, 2012.
Notice of Allowance on U.S. Appl. No. 10/956,723 dated Jul. 14, 2011.
Notice of Allowance on U.S. Appl. No. 11/231,284 dated Jun. 21, 2012.
Notice of Allowance on U.S. Appl. No. 11/231,317 dated Nov. 18, 2011.
Notice of Allowance on U.S. Appl. No. 11/246,921 dated Nov. 18, 2011.
Notice of Allowance on U.S. Appl. No. 11/875,881 dated Jan. 23, 2012.
Notice of Allowance on U.S. Appl. No. 12/434,629 dated Oct. 27, 2011.
Notice of Allowance on U.S. Appl. No. 13/052,931 dated Sep. 11, 2012.
Notice of Allowance on U.S. Appl. No. 13/290,621 dated Aug. 8, 2012.
Notice of Allowance on U.S. Appl. No. 10/711,733 dated Sep. 7, 2011.
Notice of Allowance on U.S. Appl. No. 10/711,736 dated May 16, 2011.
Notice of Allowance regarding U.S. Appl. No. 11/231,370 dated Apr. 11, 2011.
Office Action dated Jan. 22, 2009, pertaining to U.S. Appl. No. 11/552,315, 22 pages.
Office Action dated Jan. 5, 2009, pertaining to U.S. Appl. No. 11/624,394, 41 pages.
Office Action dated Mar. 25, 2009, pertaining to U.S. Appl. No. 11/277,296, 30 pages.
Office Action dated Oct. 29, 2008, pertaining to U.S. Appl. No. 11/624,402, 19 pages.
Office Action dated Oct. 7, 2008, pertaining to U.S. Appl. No. 11/272,598, 13 pages.
Office Action on U.S. Appl. No. 10/711,733 dated Mar. 17, 2011.
Office Action on U.S. Appl. No. 10/711,734 dated Jan. 9, 2013.
Office Action on U.S. Appl. No. 10/711,734 dated Mar. 12, 2012.
Office Action on U.S. Appl. No. 10/711,736 dated Aug. 31, 2010.
Office Action on U.S. Appl. No. 11/231,316 dated Dec. 9, 2013.
Office Action on U.S. Appl. No. 11/231,316 dated Apr. 25, 2012.
Office Action on U.S. Appl. No. 11/231,316 dated Jul. 17, 2013.
Office Action on U.S. Appl. No. 11/231,316 dated Nov. 9, 2011.
Office Action on U.S. Appl. No. 11/231,370 dated Sep. 1, 2010.
Office Action on U.S. Appl. No. 11/246,018 dated May 7, 2012.
Office Action on U.S. Appl. No. 11/246,018 dated Jun. 22, 2011.
Office Action on U.S. Appl. No. 11/246,018 dated Jun. 5, 2013.
Office Action on U.S. Appl. No. 11/246,018 dated Aug. 18, 2010.
Office Action on U.S. Appl. No. 11/246,021 dated Oct. 4, 2010.
Office Action on U.S. Appl. No. 11/246,921 dated May 24, 2011.
Office Action on U.S. Appl. No. 11/277,296 dated Apr. 24, 2012.
Office Action on U.S. Appl. No. 11/277,296 dated May 24, 2011.
Office Action on U.S. Appl. No. 11/277,296 dated Jan. 6, 2012.
Office Action on U.S. Appl. No. 11/277,296 dated Sep. 27, 2011.
Office Action on U.S. Appl. No. 12/434,629 dated Apr. 27, 2011.
Office Action on U.S. Appl. No. 13/052,931 dated Apr. 9, 2012.
Office Action on U.S. Appl. No. 13/290,621 dated Feb. 2, 2012.
Office Action regarding U.S. Appl. No. 11/231,317 mailed on Mar. 25, 2011.
Office Action regarding U.S. Appl. No. 11/246,018 mailed on Jan. 6, 2011.
Office Action, dated Apr. 1, 2009, in U.S. Appl. No. 10/711,732.
Office Action, dated Apr. 1, 2009, in U.S. Appl. No. 10/711,733.
Office Action, dated Apr. 12, 2010, in U.S. Appl. No. 11/231,317.
Office Action, dated Apr. 16, 2010, in U.S. Appl. No. 11/231,316.
Office Action, dated Apr. 24, 2009, in U.S. Appl. No. 10/956,723.
Office Action, dated Apr. 7, 2009, in U.S. Appl. No. 11/231,315.
Office Action, dated Aug. 22, 2007, in U.S. Appl. No. 10/711,737.
Office Action, dated Aug. 12, 2008, in U.S. Appl. No. 10/711,734.
Office Action, dated Aug. 17, 2009, in U.S. Appl. No. 10/711,734.
Office Action, dated Aug. 19, 2009, in U.S. Appl. No. 10/711,736.
Office Action, dated Aug. 31, 2009, in U.S. Appl. No. 10/956,723.
Office Action, dated Dec. 14, 2009, in U.S. Appl. No. 11/231,284.
Office Action, dated Dec. 17, 2009, in U.S. Appl. No. 11/231,316.
Office Action, dated Dec. 19, 2008, in U.S. Appl. No. 10/711,735.
Office Action, dated Dec. 23, 2008 in U.S. Appl. No. 10/711,737.
Office Action, dated Dec. 6, 2007, in U.S. Appl. No. 11/246,019.
Office Action, dated Feb. 26, 2009, in U.S. Appl. No. 10/711,734.
Office Action, dated Feb. 4, 2009, in U.S. Appl. No. 10/711,736.
Office Action, dated Jan. 11, 2007, in U.S. Appl. No. 10/711,737.
Office Action, dated Jul. 21, 2009, in U.S. Appl. No. 10/711,735.
Office Action, dated Jul. 22, 2009, in U.S. Appl. No. 10/711,737.
Office Action, dated Jun. 10, 2010, in U.S. Appl. No. 11/231,284.
Office Action, dated Mar. 10, 2010, in U.S. Appl. No. 10/956,723.
Office Action, dated Mar. 16, 2010, in U.S. Appl. No. 10/711,736.
Office Action, dated May 14, 2010, in U.S. Appl. No. 10/711,733.
Office Action, dated May 28, 2008, in U.S. Appl. No. 10/711,737.
Office Action, dated Nov. 12, 2008, in U.S. Appl. No. 10/956,723.
Office Action, dated Nov. 12, 2009, in U.S. Appl. No. 10/711,733.
Office Action, dated Nov. 14, 2007, in U.S. App. No. 10/711,734.
Office Action, dated Oct. 6, 2009, in U.S. Appl. No. 11/231,370.
Official Notification on 190628 dated Oct. 6, 2011.
Page, S.E., "Self Organization and Coordination," Computational Economics, vol. 18, 25-48, Kluwer Academic Publishers, 2001.
Palmer, D. et al., "Decentralized Cooperative Auction for Multiple Agent Task Allocation Using Synchronized Random Number Generators," Proc. IEEE/RSJ International Conference on Intelligent Robots and Systems, 1963-1968, IEEE Press, 2003.
Partial International Annexed to Invitation to Pay fees, PCT Application No. PCT/US05/028607, mailed on Dec. 14, 2005, 7 pgs.
Patwardhan, A. et al., "Enforcing Policies in Pervasive Environments," First Annual International Conference on Mobile and Ubiquitous Systems: Networking and Services, (MobiQuitous '04), 299-308, IEEE Press, 2004.
Perkins et al., "Route Optimization in Mobile IP," Internet draft, work in progress, Sep. 2001.
Peterson et al., "A Blueprint for Introducing Disruptive Technology into the Internet," Proc. ACM Workshop on Hot Topics in Networking (HotNets-I), ACM Press, 2003, pp. 59-64.
Pietrek, "Intercepting API Functions in Win32", PC Magazine—US Edition, Ziff-Davis, New York, NY, US, 13(19):307-312, Aug. 11 1994.
Pohl, Stephan, 2002, "System/Windows Info 0.5", http://wareseeker.com/Utilities/system-windows-info-0.5.zip/611583.
Popek and Goldberg, "Formal Requirements for Virtualizable Third Generation Architectures," Comm. ACM, Jul. 1974, pp. 412-421.
Potter et al., "Secure Isolation and Migration of Untrusted Legacy Applications" Computer Science Department, Columbia University, Columbia Technical Report CUCS-005-04, Jan. 2004.
Randic, M. et al., "Object by Value Transfer Mechanisms for Obligation Policy Enforcement Object Loading," Proc. 12th IEEE Mediterranean Electrotechnical Conference, (Melecon 2004), IEEE Press, 2004.
Rosenblum and Garfinkel, "Virtual Machine Monitors: Current Technology and Future Trends," Computer, May 2005, pp. 39-47.
Ruth et al., "Virtual Distributed Environments in a Shared Infrastructure," Computer, May 2005, pp. 63-69.

(56) References Cited

OTHER PUBLICATIONS

Sampemane, et al., "Access control for active spaces", Computer Security Applications Conference, 2002. Proceedings. 18th Annual Dec. 9-13, 2002, Piscataway, NJ, USA, IEEE, pp. 343-352.

Second European Examination Report on 07112164.4 dated Jan. 11, 2013.

Simon et al., "A Cryptographic Protocol to Obtain Secure Communications in Extended Ethernet Environment," Proc. 17th Conf. on Local Computer Networks, 254-261, IEEE CS Press, 1992.

Sirbu, et al., "Distributed Authentication in Kerberos Using Public Key Cryptograph," Proc. 1997 Symposium on Network and Distributed Systems Security (SNDSS'97), 134-141, IEEE CS Press, 1997.

Sites et al., "Binary Translation," Comm. ACM, Feb. 1993, pp. 69-81.

Smith and Nair, "The Architecture of Virtual Machines," Computer, May 2005, pp. 32-38.

Soltis, "Inside the AS/400," Duke Press, 1996.

Souder, et al., "A tool for securely integrating legacy systems into a distributed environment", Reverse Engineering, 1999, Proceedings. Sixth Working Conference on Atlanta, GA, USA Oct. 6-8, 1999, Los Alamitos, CA, USA, IEEE Comput. Soc., US, pp. 47-55.

Sugerman et al., "Virtualizing I/O Devices on VMware Workstation's Hosted Virtual Machine Monitor," Proc. USENIX Ann. Technical Conf, USENIX, 2001, pp. 1-14.

Sun Microsystems, "Sun Enterprise 10000 Server: Dynamic System Domains," tech. whitepaper, 1999 available at www.sun.com/datacenter/docs/domainswp.pdf).

Sun Mircrosystems White Paper, "Sun Ray Interoperability Brief," sun.com./sunray, Aug. 2003.

Sundararaj and Dinda, "Towards Virtual Networks for Virtual Machine Grid Computing," Proc. 3rd USENIX Virtual Machine Technology Symp., USENIX, 2004, pp. 177-190.

Sundararaj et al., "Dynamic Topology Adaptation of Virtual Networks of Virtual Machines," Proc. 7th Workshop Languages, Compilers, and Runtime Support for Scalable Systems, 2004 (available at http://www.tlc2.uh.edu/lcr2004/Final_Proceedings/ Sundararaj.pdf.).

Suri, N. et al., "DAML-based Policy Enforcement for Semantic Data Transformation and Filtering in Multi-agent Systems," Lecture Notes in Computer Science, vol. 2691, Proc. 2nd International Joint Conference on Autonomous Agents and Multi-Agent Systems, (AAMAS 2003), 1132-1133, ACM Press, New York, USA, 2003.

Suri, N. et al., "Enforcement of Communications Policies in Software Agent Systems through Mobile Code," Proc. 4th International Workshop on Policies for Distributed Systems and Networks, (Policy '03), 247, IEEE Press, 2003.

Sychron "On Demand Desktop Synopsis," Product Synopsis, p. 1 (available at www.sychron.com).

Sychron "On Demand Policy Manager, A Look Inside," A Technical White Paper, pp. 1-17, 2005 (available at www.sychron.com).

Sychron "Sychron Architecture," Technology White Paper, pp. 1-15, 2005 (available at www.sychron.com).

Sychron "Optimizing your Server and Desktop Architecture: The Role of Blade Servers, Thin Clients, and Virtualization," pp. 1-3, 2005 (available at www.sychron.com).

Takahashi, K. et al., "Integrating Heterogeneous and Distributed Information by Linking it to Structured Information as an 'Information Integration Directory'," J81-D-I(5): 443-450, 1998.

Taking Command of Windows XP, http://media.wiley.com/product_data/excerpt/34/07645582/0764558234.pdf, 1-11, May 3, 2004.

TCG Published, "TCG Trusted Network Connect TNC Architecture for Interoperability," 2005, available at: https://www.trustedcomputinggroup.org/groups/network/TNC_Architecture_v1_0_r4.pdf.

TCG Published, "TCG Trusted Network Connect TNC IF-IMC," 2005, available at: https://www.trustedcomputinggroup.org/groups/network/TNC_IFIMC_v1_0_r3.pdf.

Thinstall and Citrix Partner to Deliver Virtualize Citrix Presentation Server C USB Drives, http://finanzen.net/news/news_detail.asp?NewsNr=378407.

Third European Examination Report on 07113091.8 dated Jul. 5, 2012.

Traut, "Building the Virtual PC," Byte, Nov. 1997, pp. 51-52 (available at http://www.byte.com/art/9711/sec4/art4.htm).

Trusted Computing Group, "Trusted Network Connect: Open Standards for Integrity-Based Network Access Control," 2005, available at: Network Access Control, 2005, available at https://www.trustedcomputinggroup.org/groups/network/Open_Standards_for_IntegrityBased_AccessControl.pdf Standardsfor IntegrityBased_AccessControl.

Trusted Computing Group, "Trusted Network Connect to Ensure Endpoint Integrity," 2005, available at: https://www.trustedcomputinggroup.org/groups/network/TNC_NI-collateral_10_may_(2).pdf.

Turner, "Sychron On Demand Desktop Reduces Cost and Risk of Desktop Application Software Services", pp. 1-4 (available at www.summitstrat.com).

U.S. Appl. No. 09/527,188, Greschler.

Uhlig, et al., "Intel Virtualization Technology," Computer, May 2005 pp. 48-56.

Uszok, A. et al., "KAoS Policy and Domain Services: Toward a Description—Logic Approach to Policy Representation, Deconfliction, and Enforcement," Proc. 4th International Workshop on Policies for Distributed Systems and Networks, (Policy '03), 93, IEEE Press, 2003.

VMware Inc., "VMware Infrastructure Architecture Overview," 14 pages, white paper V00014-20001205, 2004(available at www.vmware.com/pdf/vi wp.pdf).

VMware Inc., "VMware Insures Improved Customer Service for Prudential", VMWARE, pp. 1-2 (available at www.vmware.com).

Waldspurger, "Memory Resource Management in VMware ESX Server," Proc. 5th Symp. Operating Systems Design and Implementation, Usenix, 2002, pp. 181-194.

Wang, D. et al., "Study on SOAP-Based Mobile Agent Techniques," Lecture Notes in Computer Science, vol. 2480, Proc. First International Conference on Engineering and Deployment of Cooperative Information Systems, 208-219, Springer-Verlag, Germany, 2002.

Whitaker et al., "Scale and Performance in the Denali Isolation Kernel," Proc. 5th Symp. Operating Systems Design and Implementation, USENIX, 2002, pp. 195-210.

Willeford, "IBM Announces Virtualized Hosted Client Infrastructure with VMware", pp. 1-2, Oct. 19, 2005.

Wittner, O., and Helvik, B.E., "Distributed Soft Policy Enforcement by Swarm Intelligence; Application to Loadsharing and Protection," Ann. Telecommun., vol. 59, No. 1-2, 10-24, 2004.

Written Opinion from PCT/US05/028607, mailed Mar. 31, 2006.

Written Opinion of International Searching Authority, PCT/US02006/037602, mailed Sep. 28, 2006.

Written Opinion of International Searching Authority, PCT/US2005/034177, mailed on Feb. 21, 2006.

Written Opinion of International Searching Authority, PCT/US2005/034178, mailed Jan. 2, 2006.

Written Opinion, PCT Application No. PCT/ US05/028605, mailed on Jan. 18, 2006.

Written Opinion, PCT Application No. PCT/US07/060895, mailed Sep. 21, 2007.

Written Opinion, PCT Application No. PCT/US07/060963, mailed Jul. 24, 2008.

Written Opinion, PCT Application No. PCT/US07/060963, mailed May 30, 2007.

Written Opinion, PCT Application No. PCT/US2005/033994, mailed on Feb. 15, 2006.

Written Opinion, PCT Application No. PCT/US2005/034302, mailed on May 8, 2006.

Written Opinion, PCT Application No. PCT/US2005/034449, mailed on Mar. 3, 2006.

Xia, H. et al., "Using Secure Coprocessors to Protect Access to Enterprise Networks," Lecture Notes in Computer Science, vol. 3462, Proc. International IFIP-TC6 Networking Conference, (Networking 2005), Springer-Verlag, Germany, 2005, available at http://www.cs.pittedu/-jcb/papers/net2005.pdf.

(56) References Cited

OTHER PUBLICATIONS

Xu, Y. et al., "An Agent-Based Data Collection Architecture for Distributed Simulations," Intl J. of Modeling and Simulation, 24(2), 55-64, 2004.

Yang, K. et al, "Service and Network Management Middleware for Cooperative Information Systems through Policies and Mobile Agents," Lecture Notes in Computer Science, vol. 2480,Proc. First International Conference on Engineering and Deployment of CooperativeInformation Systems, 232-246, Springer-Verlag, Germany, 2002.

Yang, S., "Setting up a Secure Public Workstation," Rider University Library, 153-162.

Yocom, B., et al., "A First Look at Wireless Security Products," Business Comm. Review, 36-48, Oct. 2003.

Yu, Y. et al., "Quality of Service Policy Control in Virtual Private Networks," Proc. of SPIE, vol. 5282, 1055-1060, 2003.

Zhang, Y. and You, J., "An RBAC Based Policy Enforcement Coordination Model in Internet Environment," Lecture Notes in Computer Science, vol. 2480, Proc. First International Conference on Engineering and Deployment of Cooperative Information Systems, 466-477, Springer-Verlag, Germany, 2002.

Zhenkai, et al., "Isolated Program Execution: An Application Transparent Approach for Executing Untrusted Programs", Computer Security Applications Conference, 2003. Proceedings. 19th Annual Dec. 8-12, 2003, Piscataway, NJ, USA, IEEE, Dec. 8, 2003, pp. 182-191.

Chinese Office Action on 200880112352.9 dated Jul. 10, 2014.

Chinese Office Action on 201210370505.8 dated Jun. 13, 2014.

European Examination Report on 10182667.5 dated Jul. 4, 2013.

Microsoft DOS ipconfig command, 1998-2009, http://www.computerhope.com/ipconfig.htm.

Indian Examination Report on 1842/KOLNP/2008 dated Jun. 10, 2014.

Office Action on U.S. Appl. No. 13/434,645 dated Sep. 8, 2014.

Office Action on U.S. Appl. No. 13/619,294 dated Oct. 2, 2014.

\* cited by examiner

METHOD AND SYSTEM FOR COMMUNICATING BETWEEN ISOLATION ENVIRONMENTS

The present application is a continuation of, and claims priority to, U.S. patent application Ser. No. 13/434,645 titled "Method and System For Communicating Between Isolation Environments" filed Mar. 29, 2012, which is a continuation of U.S. Pat. Ser. No. 11/875,881, now U.S. Pat. No. 8,171,483, titled "Method and System For Communicating Between Isolation Environments," filed Oct. 20, 2007, and issued May 1, 2012, each of which is incorporated herein by reference in their entirety.

FIELD OF THE INVENTION

This application relates generally to communication between applications. In particular, the application relates to communication between applications isolated from each other and located within an isolation environment.

BACKGROUND OF THE INVENTION

Solutions for alleviating problems with application sociability and compatibility include those that isolate the execution of applications such that the applications have access to a unique set of native resources specific to both the user executing the application and to the application. In some solutions, applications that require the presence of additional applications during isolation are isolated within isolation environments that include both an application executed by the user and additional supporting applications that execute when the user-executed application runs. Each time a main application requires the assistance of a supporting application, a new isolation environment is created that includes both the main application and the supporting application. Resources used by supporting applications are re-generated each time an isolation environment that includes an instance of the supporting application executes. Changes made to the resources by the supporting applications are confined to the isolation environment within which the change is made, and when a supporting application executes in a different isolation environment, the changes made are not preserved. Changes made to user-specified and application-specific resources by the supporting applications are retained within the isolation environment where the change is made, and when a supporting application executes in a different isolation environment, the changes made are not preserved. Rather changes are specific to the isolation environment within which the change is made, and application settings are not shared amongst multiple instances of an application executing within the same user session.

SUMMARY OF THE INVENTION

In one aspect, a system for aggregating installation scopes within an isolation environment, is shown and described. The system includes a means for defining an isolation environment that is used to encompass an aggregation of installation scopes. The system also includes a means for creates a first association between a first application and a first installation scope. Prior to creation of the first association, a request is made to execute the first application. The system further includes a means for determining a requirement associated with the first application, where this requirement identifies a requirement for the presence of a second application within the isolation environment. In response to this requirement, an image of the required second application is mounted onto a second installation scope to create a second association between the second application and the second installation scope. The system includes a means for associating the first installation scope with the second installation scope, and creating a third association between the aggregation of the first installation scope and the second installation scope within a third installation scope. Each of the first association, the second association, and the third association are stored by the system, and the requested first application is launched, by the system, into the isolation environment.

In one aspect, a system for retrieving native resources from a first isolation environment is shown and described. The system includes a means for intercepting a request for a native resource. Requests for the native resource are generated by a first application associated with a first installation scope that is included within the first isolation environment. A search is performed, using means provided by the system, within the first installation scope for a native resource that corresponds to the requested native resource. When there is a failure to locate a corresponding native resource within the first installation scope, a determination is made, using means provided by the system, as to whether or not there is an association between the first installation scope and a second installation scope. The second installation scope can be a representation of an image of a second application, where the second application is located within a second isolation environment. The system includes a means for searching within the second installation scope, for a native resource that corresponds to the requested native resource. The system further retrieves an instance of the requested native resource, located within the second isolation scope, and responds to the request for the native resource that includes the retrieved instance of the native resource.

In one aspect, a system for associating installation scopes to facilitate updating instances of native resources, is shown and described. The system includes a means for executing a first application within a first isolation environment, and a third application within a second isolation environment. The system includes a means for intercepting a request for a native resource, where the native resource can be used in a third application that is associated with a third installation scope located within the second isolation environment. A failure to locate the native resource within the third installation scope leads to determining, using a means provided by the system, an association between the third installation scope and a second installation scope that represents an image of a second application. The system further includes a means for retrieving an instance of the request native resource that is located within the second installation scope. The retrieved instance of the requested native resource is updated and returned to the second installation scope. Another request to retrieve the native resource is intercepted by the system. This request is sent by the first application associated with a first installation scope located within the first isolation environment. A failure to locate, within the first installation scope, a native resource that corresponds to the requested native resource causes a determination to be made, using a means provided by the system, as to whether or not an association between the first installation scope and the second installation scope exists. If such an association exists, then the system retrieves an instance of the updated native resource located within the second installation scope and returns the retrieved instance to the first application.

In one aspect, an isolation environment for facilitating the transfer of resource information between installation scopes is shown and described. The isolation environment includes a first installation scope that represents a first application, where the first application executes according to an executable component within the first installation scope. Also included within the isolation environment is a second installation scope that represents a second application. The second installation scope is also associated with the first installation scope via an aggregation of the first installation scope within the second installation scope. A virtual scope is included within the isolation environment. The virtual scope represents an aggregation of the first installation scope and the second installation scope. The virtual scope also provides access to resource information located in the first installation scope and resource information located in the second installation scope.

In one aspect a method for retrieving user setting information from a user scope that contains an application profile, is shown and described. The method shown includes initializing a first isolation environment that includes a first installation scope associated with a first application. The first isolation environment includes a user scope that contains a first application profile that further corresponds to the first application. User setting information associated with the configuration of the first application, is retrieved from the first application profile. The first application executes within the first isolation environment according to this retrieved user setting information. The method further includes initializing a second isolation environment with a second installation scope that is associated with the first application. The second isolation environment further includes a user scope that contains the first application profile. User setting information is retrieved from the first application profile and used to configure the first application. The first application is further executed within the second isolation environment according to the retrieved user setting information.

BRIEF DESCRIPTION OF THE DRAWINGS

The following figures depict illustrative embodiments of the method and system described herein. These figures are intended to illustrate and not limit the method and system described herein.

DETAILED DESCRIPTION

Computing Environment Providing Application Isolation

Figure 1A:
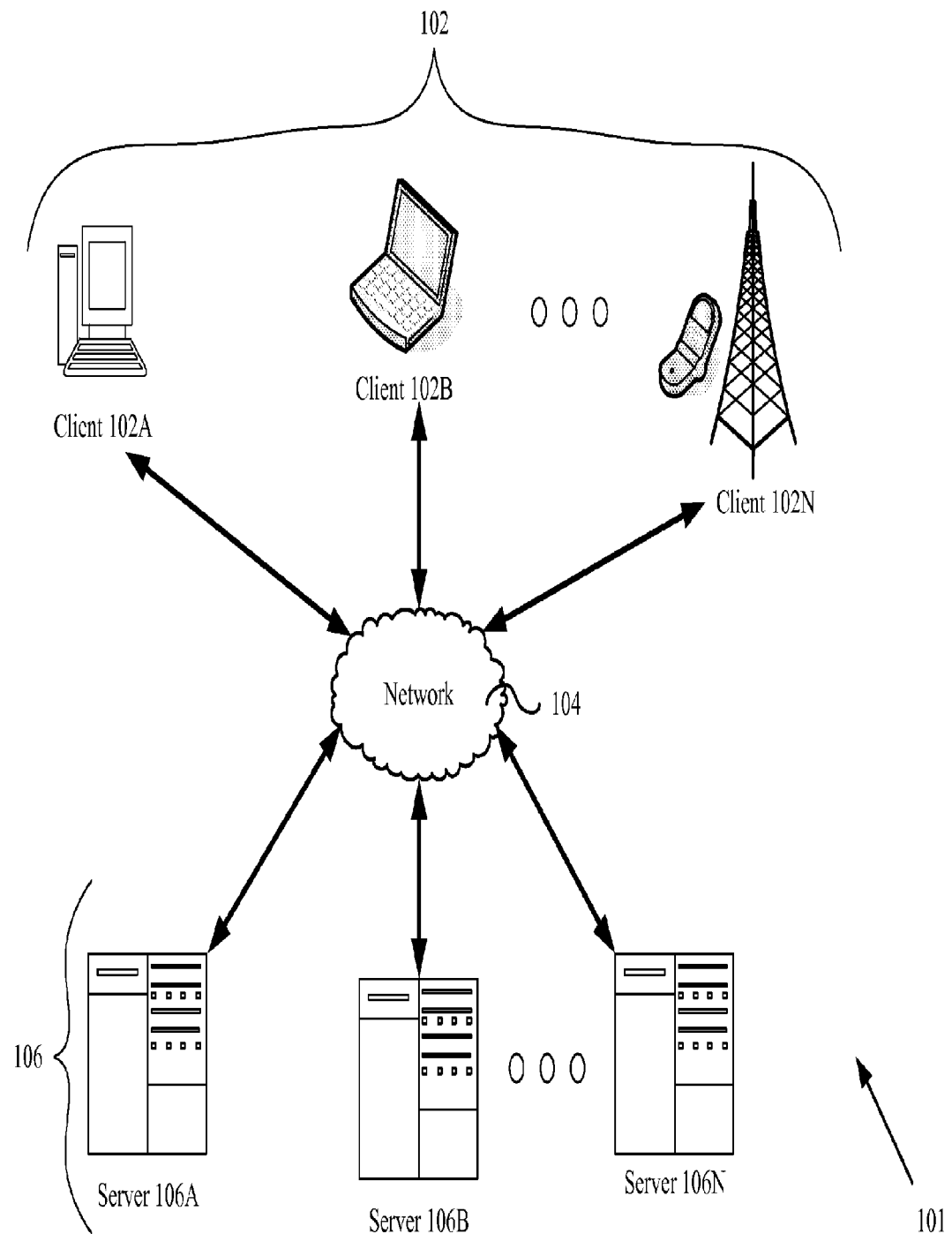
FIG. 1A is a block diagram that illustrates an embodiment of a remote-access, networked environment with a client machine that communicates with a server.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-102N may be referred to as a single client machine 102 or a single group of client machines 102, while servers 106 may be referred to as a single server 106 or a single group of servers 106. Another embodiment includes a single client machine 102 communicating with more than one server 106; another embodiment includes a single server 106 communicating with more than one client machine 102. Yet another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); client node(s); endpoint(s); endpoint node(s); second machine; or any other naming convention that denotes a second device connected to a first device such that operation of the second device is dependent in part on operations performed by the first device. The server 106 in some embodiments may be referenced by any one of the following terms: server(s), server farm(s), host computing device(s), first machine(s), or any other naming convention that denotes a first device connected to a second device, where the first device can manage, at least in part, the operation of the second device.

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106a-106n in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
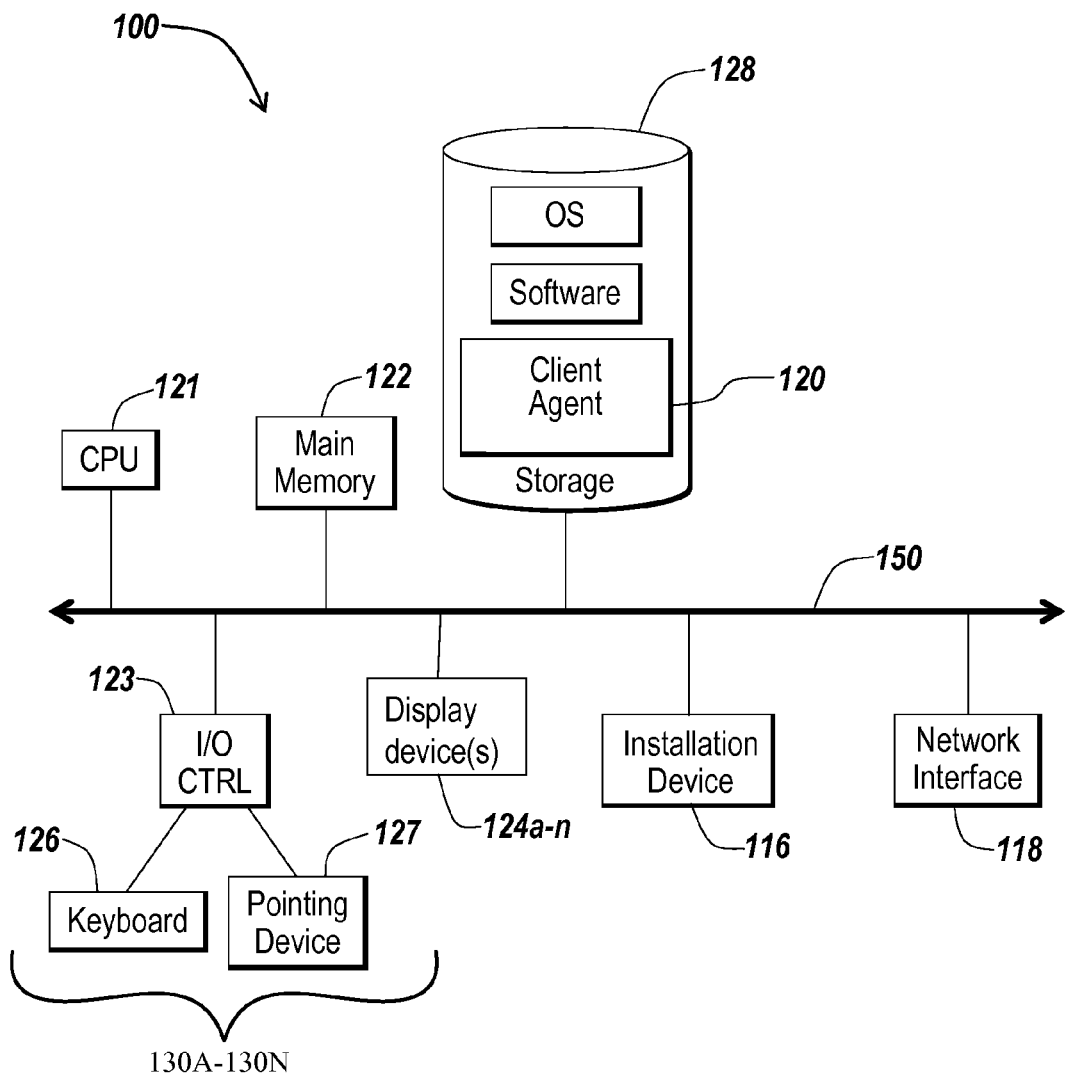
FIGS. 1B and 1C are block diagrams that illustrate an embodiment of computing machines for practicing the methods and system described herein.

Illustrated in FIG. 1B is an embodiment of a computing device 100 that can function as a client machine 102 and a server 106 illustrated in FIG. 1A. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
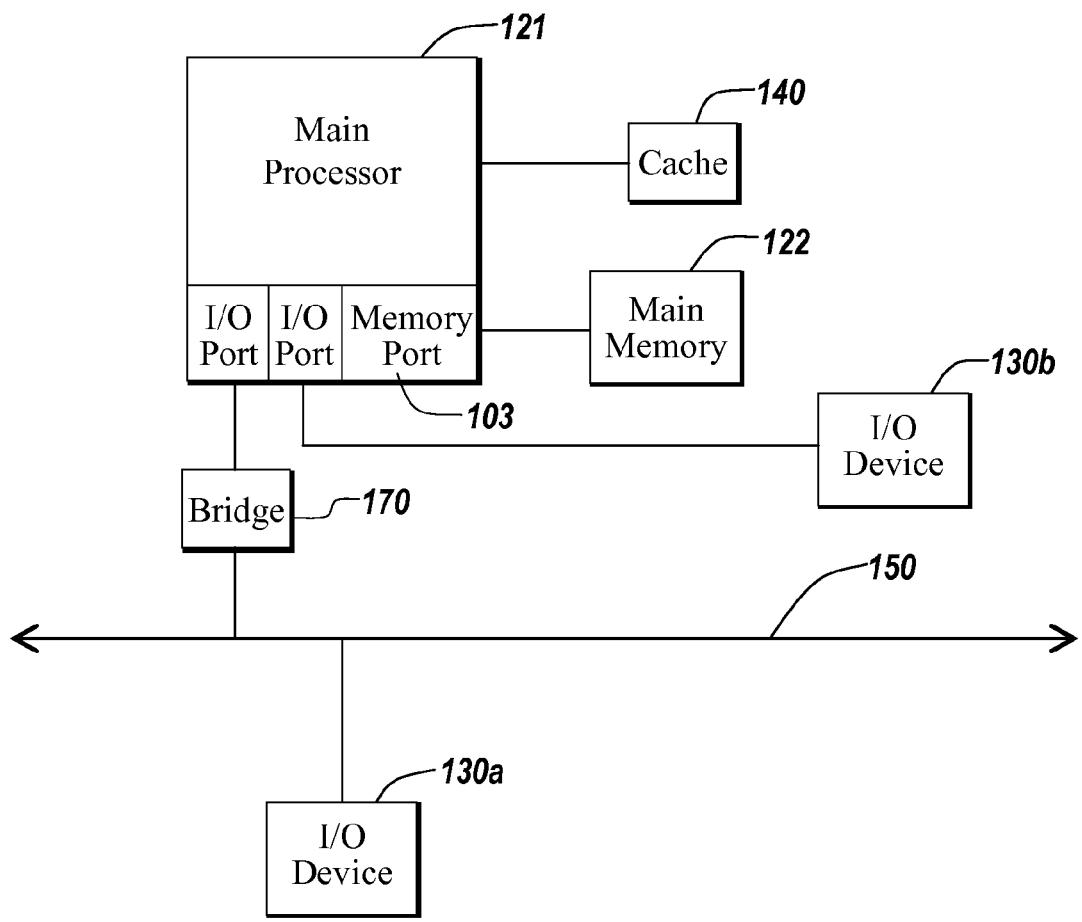

FIG. 1C illustrates an embodiment of a computing device 100, that can function as a client machine 102 and a server 106. Included within the computing device 100 is a system bus 150 that communicates with: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 can, in some embodiments, be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a harddrive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to mulitple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following form factors: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

As referred to herein, a scope can be any one of an installation scope, a system scope, a user scope, an application-specific user scope, an isolation scope, or a scope. A system scope, in one embodiment, refers to a scope located in the system root within the operating system. The system scope, in this embodiment, can include the native resources associated with the computing machine 200. An installation scope, in one embodiment, refers to a scope that includes the native resources associated with an application. Other embodiments include installation scopes that can include any of the following: instances of native resources used by an application associated with the installation scope; an instance of the application associated with the installation scope; a set of native resources used by an application associated with the installation scope; more than one set of native resources or set of native resource instances associated with the one or more applications, application associations, or application instances included in the installation scope; or a set of application-specific settings and configurations. The user scope can, in some embodiments, be a scope that includes an instance of native resources that correspond to user-specific settings and configurations. An application-specific user scope includes native resources specific to a type of application, where the settings are determined by user input. One example of native resource instances within an application-specific user scope includes user-settings for the Microsoft Word application. An isolation scope can be any scope included within an isolation environment, or any scope that aids in isolating an application within an environment. Examples of isolation scopes include an installation scope, a user scope, and an application specific scope. In certain embodiments, the system scope may also be an isolation scope. A scope is, in some embodiments, a grouping of native resources, settings, and configurations that are used by one or more applications to execute. Other embodiments include a scope with instances of native resources, while still other embodiments include scopes with instances of native resources, and instances of one or more applications associated with the scope. In some embodiments, scopes can further include sub-scopes, and scope can further encompass more than one individual scope.

Figure 2A:
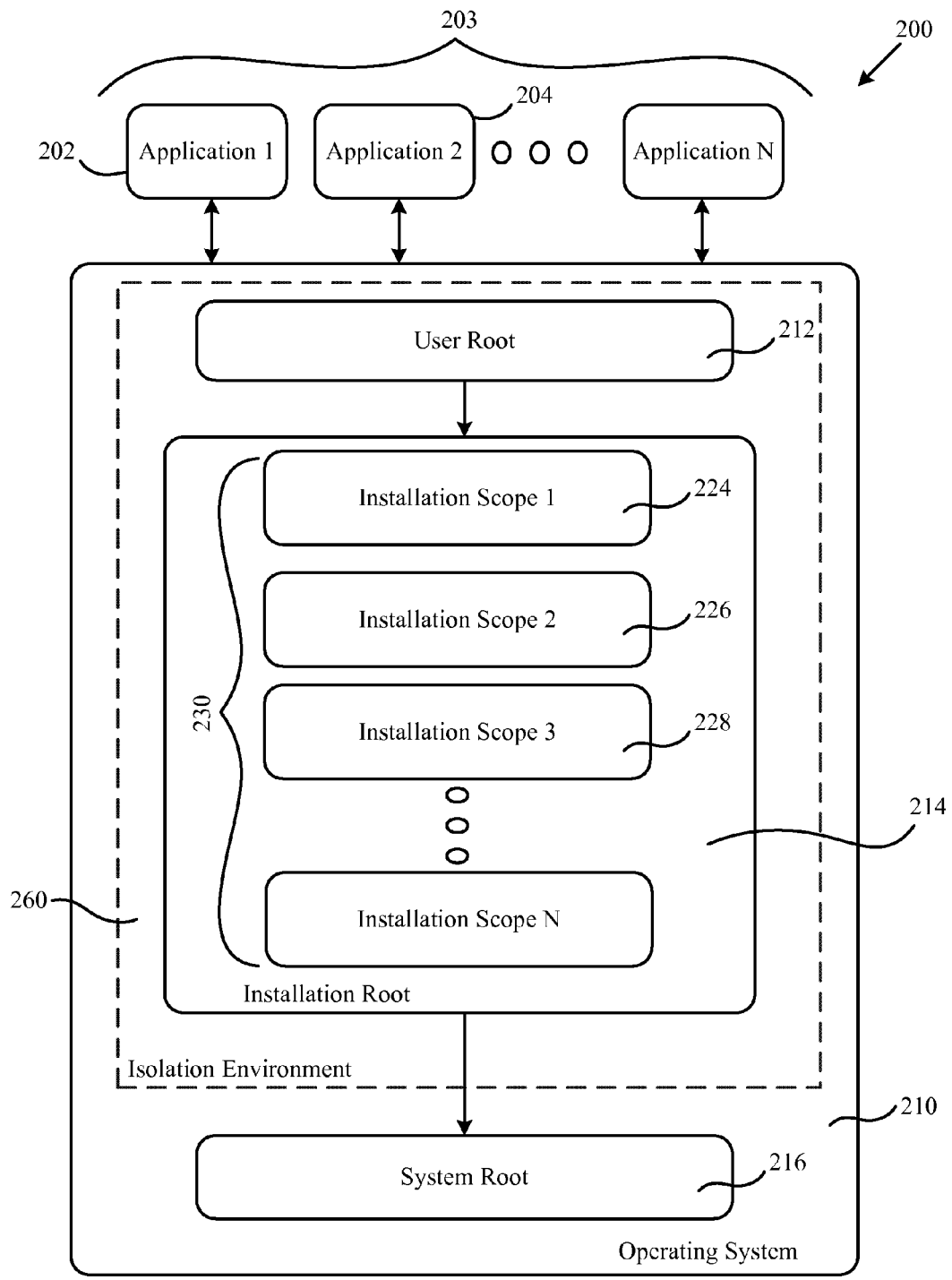
FIG. 2A is a block diagram of an embodiment of a computing machine with an isolation environment.

Illustrated in FIG. 2A is one embodiment of a computing machine 200 within a computing environment, where the computing machine 200 operates with reduced application compatibility and application sociability. Installed on the computing machine 200 is an operating system 210 which is in further communication with one or more applications 203, "Application 1" 202 and "Application 2" 204. Within the operating system 210 is a system root 216, an installation root 214, and a user root 212. Together, the installation root 214 and the user root 212 reside in an isolation environment 260 also located in the operating system 210. Within the installation root 214 are individual installation scopes 230 such as: "Installation Scope 1" 224; "Installation Scope 2" 226; and "Installation Scope 3" 228.

Further referring to FIG. 2A and in more detail, embodiments can include a computing machine 200 that provides an isolation environment 260 to mitigate application compatibility and application sociability. Application compatibility problems arise when more than one application or instance of a similar application, are executed on a computing machine 200 by one or more users. These applications often utilize similar native resources stored on the computing machine 200 within the system root 216. When one application manipulates or otherwise alters a native resource, the execution of a second application or second instance of the first application can be compromised when the second application or application instance utilizes the same native resource that was just altered. Proper execution of this second application/application instance may require the native resource to be in a particular form or to have a particular value. Application sociability is a similar concept in that when more than one application or instance of an application is executed on a computing machine 200, proper execution of each application and application instance requires access to particular native resources. When these required native resources are common amongst applications and application instances, problems can arise regarding the ability of an application to have access to a native resource with the proper value and form.

In one embodiment, the computing machine 200 is a client computing machine 102 configured to communicate with a server 106 via a network 104. Another embodiment includes a computing machine 200 that is a server 106 able to communicate with a client machine 102 via a network. Still other embodiments include a computing machine 200 that can be any one of the above configurations of a computing machine.

The operating system 210, in one embodiment, is a program application installed on the computing machine 200 to control the operation of components included within the computing machine 200. In other embodiments, the operating system 210 can be any combination of the above described operating systems.

Applications 203 on the computing machine 200 can, in one embodiment, communicate with the operating system 210. In other embodiments, applications 203 can communicate directly with components included in the computing machine 200, or the applications 203 do not communicate with the operating system 210. One embodiment includes a single application 202 can communicate with the operating system 210, or multiple applications 203 can communicate with the operating system 210. Still other embodiments include applications 203 that can be any program, routine, set of commands, or other software application.

In one embodiment, a system root 216 is included. The system root 216 provides a set of native resources that are specific to the computing machine 200. Another embodiment includes a system root 216 with native resources that are substantially similar to those native resources present on the computing machine 200 when only the operation system 210 is installed on the computing machine 200.

One embodiment includes an installation root 214 that groups together individual installation scopes 230. In one embodiment, the installation root 214 groups together individual installation scopes 230 that are associated according to the requirements of applications isolated in each of the installation scopes 230. In another embodiment, the installation root 214 groups together individual installation scopes 230 according to any one of the following: application policies, application settings, installation root 214 settings, installation scope 230 settings, or any other criteria that may be used to identify installation scope 230 that are be grouped together in a single installation root 214. The installation root 214 provides, in one embodiment, application isolation, where the isolation provided mitigates the problems associated with application sociability and compatibility. Still another embodiment includes an installation root 214 with a main base installation scope and additional installation scopes configured to act like sub-scopes of the main base installation scope. In this embodiment, an installation scope contains modifications to the main base installation scope, where the modifications can be a change in the patch level of the application, or the installation or removal of additional application features.

Many embodiments include installation scopes 230 within the installation root 214. Each installation scope 230 includes an instance of the native resources associated with a particular application. For example, a first application may be installed within a first installation scope 224. Included in this first installation scope 224 would be instances of the native resources specific to the first application installed within the first installation scope 224. In one embodiment, the installation scopes 230 each include a view of native resources specific to an application 203. For example, the native resources specific to a first application 202 may be represented in a first installation scope 224, while the native resources specific to a second application 204 may be represented in a second installation scope 226. Other embodiments may include a third installation scope 228 associated with the first installation scope 224 and the second installation scope 226, such that both the first application 202 and the second application 204 may access and manipulate the view of native resources included in the third installation scope 228. Still other embodiments include applications 203 that are grouped together such that a single installation scope 230 would provide a specific view of the native resources for each group of applications 203. In this embodiment, conflicting applications 203 can be separated into different groups to enhance the compatibility and sociability of applications. In still further embodiments, the applications belonging to an application group, may be configured by an administrator. In some embodiments, a "pass through" installation scope can be defined which corresponds exactly to instances of native resources included in the system root 216. In other words, applications executing within a pass through installation scope operate directly on those native resources included in the system root 216. In some embodiments, installation scopes are made visible to an instance of the executing application such that the visible installation scopes may be configured by the executing application. In other embodiments, a set of visible installation scopes includes a set of native resource instances that is common to all instances of the executing application regardless of the user on behalf of which the application is executing. Still other embodiments include a set of visible installation scopes with variable sets of native resource instances, that vary based on the user executing the application. One embodiment includes installation scopes 230, where additional installation scopes 230 may execute within the installation root 214 based on user-defined parameters. These parameters can include instructions as to which installation scope should execute, or operating instructions that have the effect of executing some installation scopes 230 but not others. In some embodiments, installation scopes may be discarded when no longer needed, while in other embodiments, installation scopes 230 may be merged into a single installation scope 230 that includes an instance of the native resources that is representative of the individual native resource instances included in each individual installation scope.

Still referring to FIG. 2A, in one embodiment, a user root 212 is included to store and present instances of native resources representative of user-defined setting and configuration information. In some embodiments the user root 212 can include instances of native resources that are utilized by applications 203 to initialize based on user-defined settings. One embodiment includes an isolation environment 260 that does not include a user root 212, while another embodiment includes an installation root 214 that includes a scope substantially similar to the scope included in the user root 212. Still other embodiments include a user root 212 with an instance of native resources that combines both the application-specific settings and configurations included in the installation root 214 with user-defined settings and configurations.

An isolation environment 260 is included, in one embodiment that further includes a user root 212 and an installation root 214. Other embodiments can include an isolation environment 260 with any one of the following characteristics: an isolation environment 260 with more than one user root 212; an isolation environment 260 with more than one installation root 214; an isolation environment 260 that includes a user root 212, an installation root 214, and a system root 216; an isolation environment 260 that includes an installation root 214 and a system root 216; an isolation environment 260 that includes a user root 212 and a system root 216; an isolation environment 260 that includes a user root 212; an isolation environment 260 that includes a system root 216; an isolation environment 260 that includes an installation root 214; an isolation environment 260 that includes an additional scope or root (not illustrated); or an isolation environment 260 that includes multiple installation scopes and user roots grouped together based on either user profiles or application profiles. In one embodiment, the isolation environment 260 provides isolation to an executing application by isolating the native resources specific to that application and to the user executing the application. Isolation of the native resources specific to the application includes presenting those instances of the native resources included within the installation root 214 and the user root 212, to the executing application, rather than allowing the application to access and manipulate the native resources in the system root 216. Native resources may differ between applications, so presenting an executing application with its own set of unique native resources mitigates application un-compatibility and non-sociability.

Figure 2B:
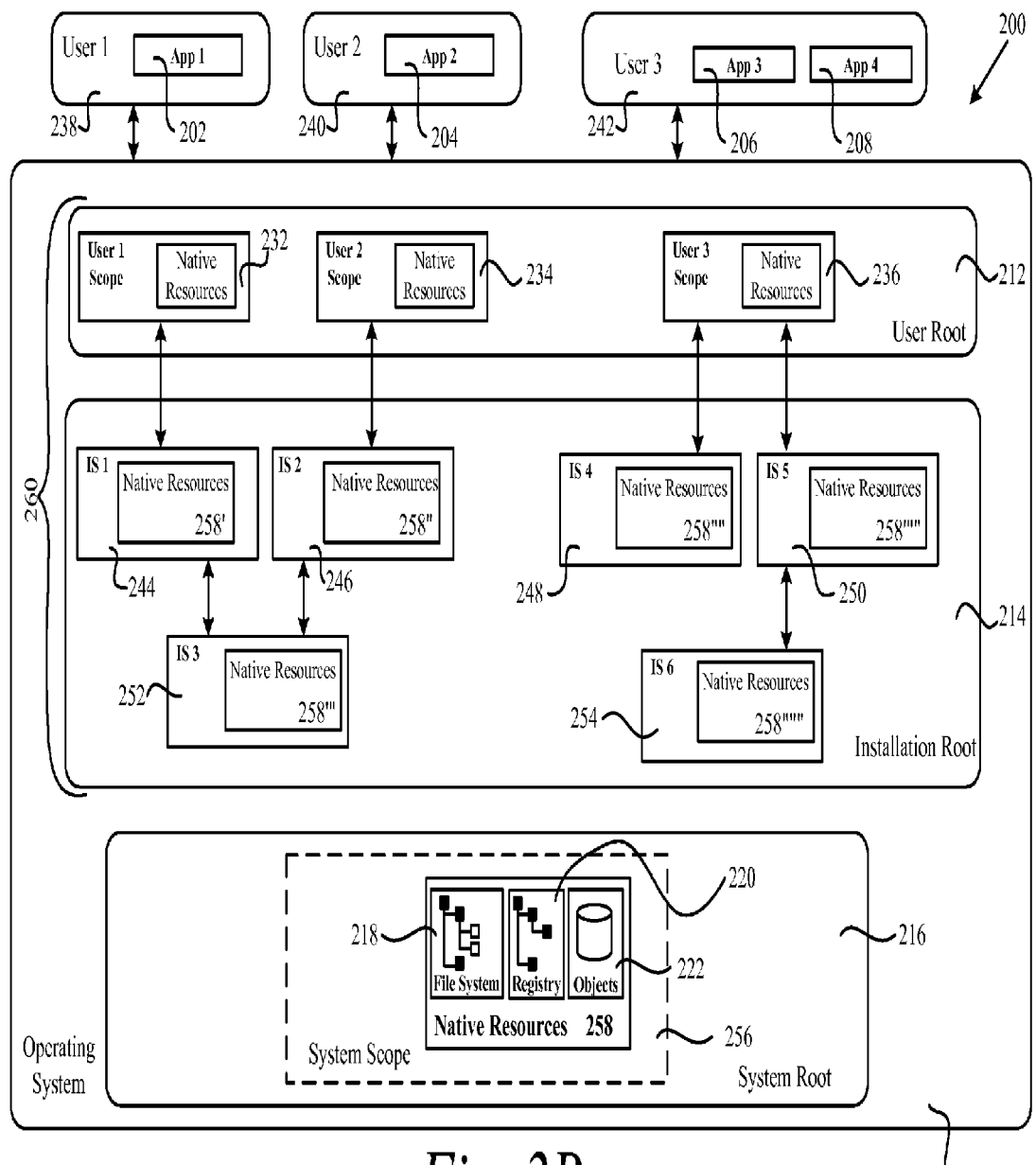
FIG. 2B is a block diagram of an embodiment of a multi-user computing machine with an isolation environment.

Illustrated in FIG. 2B is an embodiment configured to provide access to more than one user 238, 240, 242 and having reduced application compatibility and application sociability problems. The illustrated computing machine 200 has the following: an operating system 210 installed thereon; user sessions 238, 240, 242 indicative of user actions; and applications 202, 204, 206, 208 executing within the user sessions 238, 240, 242. The operating system 210 has a system root 216, an installation root 214, and a user root 211. Included within the system root 216 is a system scope 256 that further includes native resources 258 such as: a file system 218; a registry 220; and objects 222. The installation root 214 includes more than one installation scope 244, 246, 252, 248, 250, 254, where each installation scope is connected to another scope. Included within each installation scope are instances of native resources 258', 258'', 258''', 258'''', 258 ''''', 258'''''''. The user root 212 includes more than one user scope 232, 234, 236, where each scope is associated with a user session 238, 240, 242 and each scope includes an instance of native resources. An isolation environment 260 is included within the operating system 210 that groups together the user root 212 and the installation root 214.

Further referring to FIG. 2B and in more detail, in one embodiment, the computing machine 200 can be any combination of the above described computing machine 100. In another embodiment, the operating system 210 installed thereon can be any combination of the above described operating system. Still other embodiments can include applications 202, 204, 206, 208, where an application can be any one of the following: a software program installed on the computing machine 200; an application accessed remotely by the computing machine 200; a set of software commands sent to the operating system 210; a software routine; an operating system; or any other application that can be executed on the computing machine 200. In one embodiment, the computing machine 200 can function as a client machine 102 or as a server 106.

Embodiments can include an operating system 210 that further includes a system root 216. The system root 216, in one embodiment, further includes a system scope 256 within which native resources 258 are grouped. Other embodiments may include a system root 216 with native resources 258 that are grouped together within the system root 216. Still other embodiments may include an operating system 210 without a system root 216, and with a grouping of system native resources 258 located within the operating system 210. Native resources 258 may not be grouped together, but may be dispersed throughout any one of the system root 216, the system scope 256, or the operating system 210. One embodiment includes a system root 216 with multiple system scopes (not illustrated), where each system scope would have a unique set of native resource instances.

In one embodiment, the group of native resources 258 and the instances of native resources are any of the following resource types: a file system 218; a registry 220; system objects 222; window names; or any other native resource useful to the proper execution of an application. Native resources 258 are requested by applications 202, 204, 206, 208 when the application requires a particular resource to execute properly. For example, an application may require a particular setting stored in a registry key to execute a portion of the application. Execution of the portion of the application dictates that the application request from the registry 220, the key containing the required setting. Some embodiments include groups of native resources 258 where the group can contain one or more than one native resource, or groups of native resources 258 with differing native resource types. Other embodiments can include any one of the following combinations: a system scope with native resources 258, user scopes with instances of native resources 258, and installation scopes with instances of native resources 258; a system scope with native resources 258, and installation scopes with instances of native resources 258; a system scope with native resources 258, and user scopes with instances of native resources 258; a system scope with instances of native resources 258, user scopes with instances of native resources 258, and installation scopes with instances of native resources 258; or any combination isolation scopes and native resources 258.

The installation root 214 can, in many embodiments, provide a modified view of the native resources 258. This modified view aggregates individual installation scopes 230 included within the installation root 214 to provide a requesting application with instances of the native resources specific to the application. The installation root 214 can, in some embodiments, communicate directly with the user root 212 and the system root 216; while in other embodiments the installation root 214 can communicate with other roots via installation scopes 230 within the installation root 214. Other embodiments include any of the above described installation root 214 configurations.

Installation scopes 230 are, in one embodiment, included in the installation root 214 and further configured to communicate with user scopes included in the user root 212. Other embodiments include installation scopes that communicate with one system scope 256, more than one system scope 256, or may not communicate with other scopes. Installation scopes 230 can, in one embodiment, create associations with an application 203, another installation scope 230, or both an application 203 and an installation scope. In one embodiment, installation scopes 230 are configured to present requesting applications with instances of native resources 258 that are particular to a requesting application. In this embodiment, installation scopes 230 are configured to represent a single application or in other embodiments represent multiple applications, such that the representative installation scope contains the native resources required by a corresponding application. One embodiment includes a first application 202 represented by and associated with a first installation scope 244 such that the first application 202 may access and manipulate the view of native resources 258 included in the first installation scope 244; and a second application 204 represented by and associated with a second installation scope 246 such that the second application 204 may access and manipulate the view of native resources 258'' included in the second installation scope 246. In this embodiment, the first installation scope 244 and the second installation scope 246 may be further associated with a third installation scope 252 such that either or both of the first installation scope 244 and the second installation scope 246 may access and manipulate the view of native resources 258''' included in the third installation scope 252. Another embodiment includes a third application represented by and associated with a fourth installation scope 248, such that the third application 206 may access and manipulate the view of native resources 258 included in the fourth installation scope 248. Still another exemplary embodiment could include a fourth application 208 represented by and associated with a fifth installation scope 250 such that the fourth application 208 may access and manipulate the view of native resources 258 included in the fifth installation scope 250. In this embodiment, the fifth installation scope 250 may be further associated with a sixth installation scope 254 such that the fourth application 208 may access and manipulate the view of native resources 258 included in the sixth installation scope 254.

In one embodiment, a user root 212 is included. The user root 212 further includes user scopes 232, 234, 236 where each user scope communicates with an installation scope in the installation root 214. Embodiments of the computing machine 200 include a user root 212 with user profiles, where the user profiles store user-specific setting and configuration information that can be accessed by applications executing within a user session. Still other embodiments include a computing machine 200 with more than one user root 212, where each included user root 212 contains user-specific setting and configuration information and where each user root 212 corresponds to a particular user. Other embodiments do not include a user root 212, but rather include an installation root 214 that includes an installation scope dedicated to storing instances of native resources that correspond to user-specified settings and configurations. One embodiment includes a user root 212 with multiple user scopes. In this embodiment, one user scope (not illustrated) can be dedicated to storing user-specified setting and configuration information that is specific to a particular application. For example, the user scope would be configured to store instances of the native resources that correspond to the user-specified settings for Microsoft Word®. In this example, each time the Microsoft Word® application executes within that particular user session, the Microsoft Word® configurations and settings specified by that user, can be available to the Microsoft Word® application.

User scopes, in one embodiment, are included within the user root 212. In one embodiment, the user scopes 232, 234, 236 each correspond to a user session 238, 240, 242. The user scopes 232, 234, 236 include instances of native resources 258 where each instance is representative of the settings and configurations specific to a particular user session 238, 240, 242. Other embodiments include user scopes 232, 234, 236 that include sub-scopes. In this embodiment, the native resource view presented to an application executing in that scope is the aggregate of the modifications contained within each user-scope sub-scope. Sub-scopes are, in one embodiment, layered on top of each other, and in the aggregate view modifications to a resource in a higher sub-scope override modifications to the same resource in lower layers. Other embodiments may include user scopes 232, 234, 236 that contain native resource instances specific to a set of users. Still other embodiments may include user scopes 232, 234, 236 where the native resources instances are defined by a system administrator, or by a pre-determined group of users defined within the operating system 210. Another embodiment may include user scopes, where some user scopes include an instance of the native resources that is specific to a particular user session. In this embodiment, the user scope may persist and remain available for future login session, while other embodiments include a user scope that is destroyed when the user session ends. Native resources included within the user scopes can, in some embodiments, be altered by applications executing within a corresponding user session; while in other embodiments, the native resource instances can be altered by user input. One example of the use of user scopes within the computing machine 200, includes one with a first application 202 executing within a first user session 238 that has a first user profile outlining user-specific settings, configurations, and compositions specific to the first application 202. In this example, a first user scope 232 modifies a view of native resources according to the first user profile, and provides the first application 202 with access to these user-specified native resources during a first user session 238. Another example of the use of user scopes within the computing machine 200, includes one with a third application 206 and a fourth application 208 executing within a third user session 242 that has a third user profile outlining user-specific settings, configurations, and compositions specific to the third application 206. In this example, a third user scope 236 modifies a view of native resources according to the third user profile and provides the third application 206 and the fourth application 208 with access to these user-specified native resources during the third user session 242. Put another way, the user root 212 alters the view of native resources for each individual user by "layering" a user-specific, modified view modification that is provided by a user isolation scope 232, 234, 236 "on top of" an application-specific, modified view that is provided by an installation root 214, which is in turn "layered on top of" the system-wide view of native resources provided by the system root 216.

Still referring to FIG. 2B, user sessions 238, 240, 242 and applications 202, 204, 206, 208 are included, in one embodiment, within the computing machine 200. A user session 238, 240, 242 corresponds to a user such that when a user utilizes the computing machine 200, a user session is created and any user-input or user-output generated by the user is confined to the user session. When, in this embodiment, applications are executed by a user, the application is executed within the user session. In some embodiments of the computing machine 200, multiple users may be able to access multiple user sessions. Still other embodiments may provide applications 202, 204, 206, 208 accessible by more than one user-session at a time.

One embodiment of the computing machine 200 includes an isolation environment 260. The isolation environment 260 includes both a user root 212 and an installation root 214. Other embodiments may include an isolation environment 260 such as any of the above described isolation environments. In one embodiment of the computing machine 200, the isolation environment 260, although described in relation to multi-user computers supporting concurrent execution of application programs by various users, may also be used on single-user computers to address application compatibility and sociability problems resulting from sequential execution of application programs on the same computer system by different users, and those problems resulting from installation and execution of incompatible programs by the same user. In some embodiments, an installation scope or installation sub-scope may be associated with an individual thread instead of an entire process, allowing isolation to be performed on a per-thread basis. In some embodiments, per-thread isolation may be used for Services and COM+ servers.

Isolating applications within an installation scope requires, in one embodiment, that an application is installed into a particular installation scope (described below in more detail,) and the application is launched into that particular installation scope. In embodiments where applications are installed into an installation scope, the installed applications continue to be associated with their respective installation scopes until settings associated with the installation scopes are altered. Other embodiments include applications that are launched into a particular installation scope, or more than one installation scope, and as a result become associated with the one or more installation scopes. Installation scopes, in many embodiments, provide associated applications with a unique view of native resources when the associated applications are launched into a corresponding installation scope. In these embodiments, this unique view is specific to the operating requirements of each application. Applications may also be launched into the system scope 256, that is, they may be associated with no isolation scope. This allows for the selective execution of operating system 210 applications such as Internet Explorer, as well as third party applications, within an isolation environment 260.

This ability to launch applications within an isolation scope regardless of where the application is installed mitigates application compatibility and sociability issues without requiring a separate installation of the application within the isolation scope. The ability to selectively launch installed applications in different isolation scopes provides the ability to have applications which require helper applications (such as Microsoft Word®, Notepad, etc.) to have those helper applications launched with the same rule sets. Further, the ability to launch an application within multiple isolated environments allows for better integration between isolated applications and common applications.

Figure 2C:
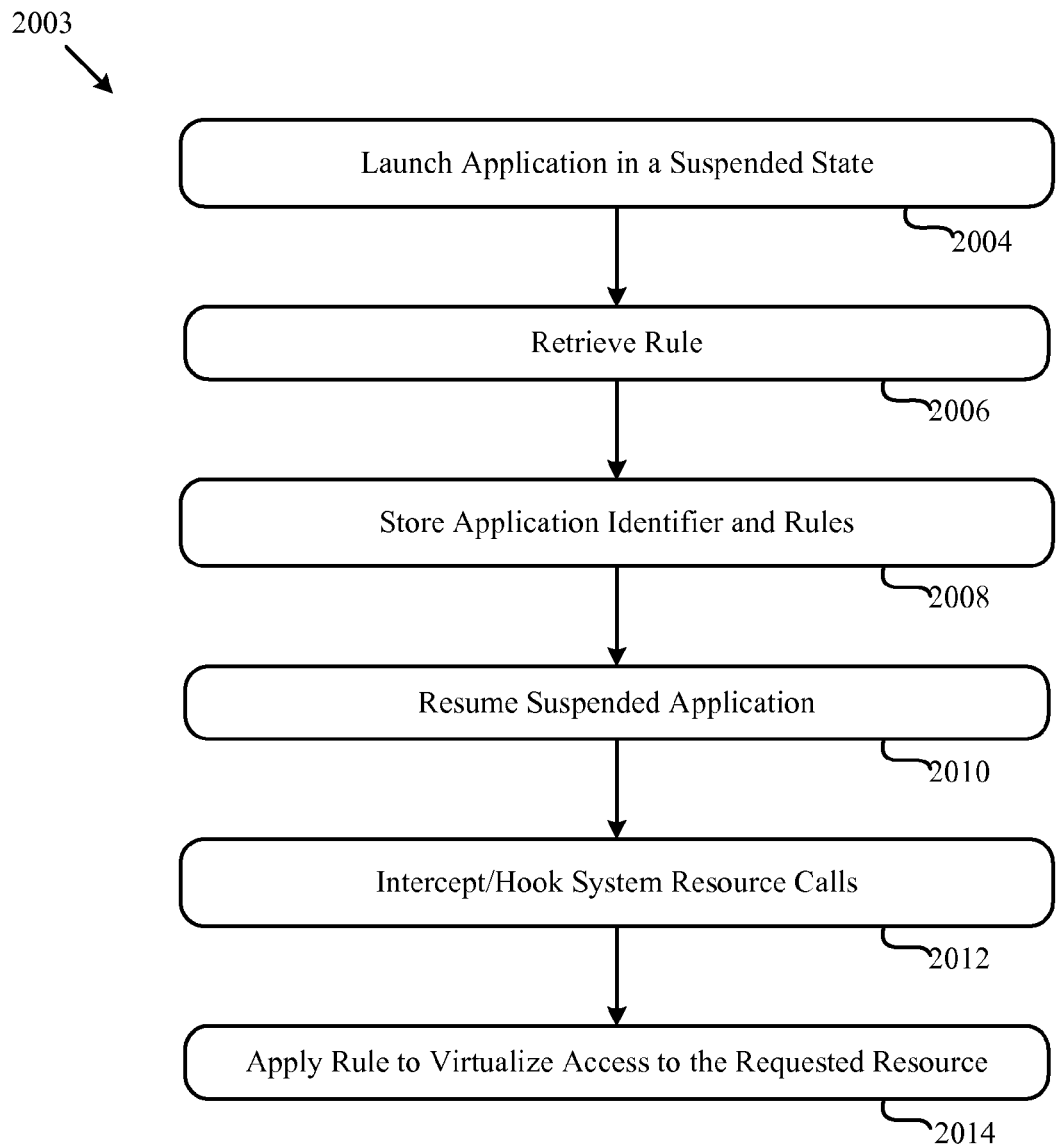
FIG. 2C is a flowchart of an embodiment of a method of launching an application into an isolation environment.

Illustrated in FIG. 2C is a method 2003 for associating an application with an installation scope. The method 2003 includes launching the process in a suspended state (step 2004), and retrieving the rules associated with the desired installation scope (step 2006). An identifier for the application and the retrieved application rules are stored in a memory element (step 2008) and the suspended application is resumed (step 2010). Subsequent calls to access native resources made by the application are intercepted or hooked (step 2012) and the rules associated with the process identifier, if any, are used to virtualize access to the requested resource (step 2014).

Still referring to FIG. 2C, and in more detail, an application is launched in a suspended state (step 2004). In some embodiments, a custom launcher program is used to accomplish the task of launching the application in a suspended state. These embodiments may include a launcher specifically designed to launch an application into a selected installation scope. Other embodiments of the method 2003 include a launcher that accepts as input a specification of the desired installation scope, for example, by a command line option. In one embodiment of the method 2003 the application launched into a suspended state is a software application, while in others the application can be: a process; software commands; a routine; or an executable program.

In one embodiment of the method 2003, the rules associated with the desired installation scope are retrieved (step 2006). Some embodiments retrieve the rules from a persistent storage element, such as a hard disk drive or other solid state memory element. Other embodiments retrieve the rules from any one of the following locations: a relational database; a flat file database; a tree-structured database; a binary tree structure; a custom configured data structure; a temporary memory location; or any other type of persistent data structure. Still other embodiments do not retrieve rules, but rather retrieve user-specified commands from a temporary memory storage (not illustrated).

An application identifier and the retrieved rules are, in one embodiment, stored in a memory element (step 2008). In one embodiment, where the application is a process, the retrieved rules and a process id (PID) are stored in memory. When a kernel mode driver is provided that receives operating system 210 messages concerning new process creation, another embodiment of the method 2003 can store the application identifier and the rules in the context of the kernel mode driver. In other embodiments, a file system filter driver, or mini-filter, is provided to intercept native resource requests. In these embodiments, the PID and the retrieved rules may be stored in the filter. In other embodiments still, all interception is performed by user-mode hooking and no application identifier is stored. In this embodiment, the rules are loaded by the user-mode hooking apparatus during the application initialization, and no other component needs to know the rules that apply to the application identifier because rule association is performed entirely within the application.

In one embodiment of the method 2003, the suspended process resumes (step 2010) and any subsequent calls made by the application to access native resources, are intercepted or hooked (step 2012). Embodiments that include rules use those rules associated with the application identifier to virtualize access to the requested resources (step 2014). In some embodiments, a file system filter driver, or mini-filter, intercepts requests to access native resources and determines if the application identifier associated with the intercepted request has been associated with a set of rules. When, in one embodiment, the application identifier is associated with a set of rules, those associated rules are used to virtualize the request made by the application to access native resources. When no rules are associated with the application identifier, the request to access native resources is passed through unmodified. In other embodiments, a dynamically-linked library is loaded into the newly-created application and the library loads the isolation rules. In still other embodiments, both kernel mode techniques (hooking, filter driver, mini-filter) and user-mode techniques are used to intercept calls to access native resources. For embodiments in which a file system filter driver stores the rules, the library may load the rules from the file system filter driver.

Embodiments of the method 2003 include applications that are "children" of applications associated with installation scopes that are further associated with the installation scopes of their "parent" application. In these embodiments, this method 2003 is accomplished by a kernel mode driver notifying the file system filter driver when a child application is created. In these embodiments, the file system filter driver determines if the application identifier of the parent process is associated with an installation scope. If so, the file system filter driver stores an association between the application identifier for the newly-created child application and the installation scope of the parent application. In other embodiments, the file system filter driver can be called directly from the system without use of a kernel mode driver. In other embodiments, in applications that are associated with installation scopes, operating system 210 functions that create new applications are hooked or intercepted. When a request to create a new process is received from such an application, the association between the new child application and the installation scope of the parent is stored.

Providing Instances of Native Resources

Figure 3A:
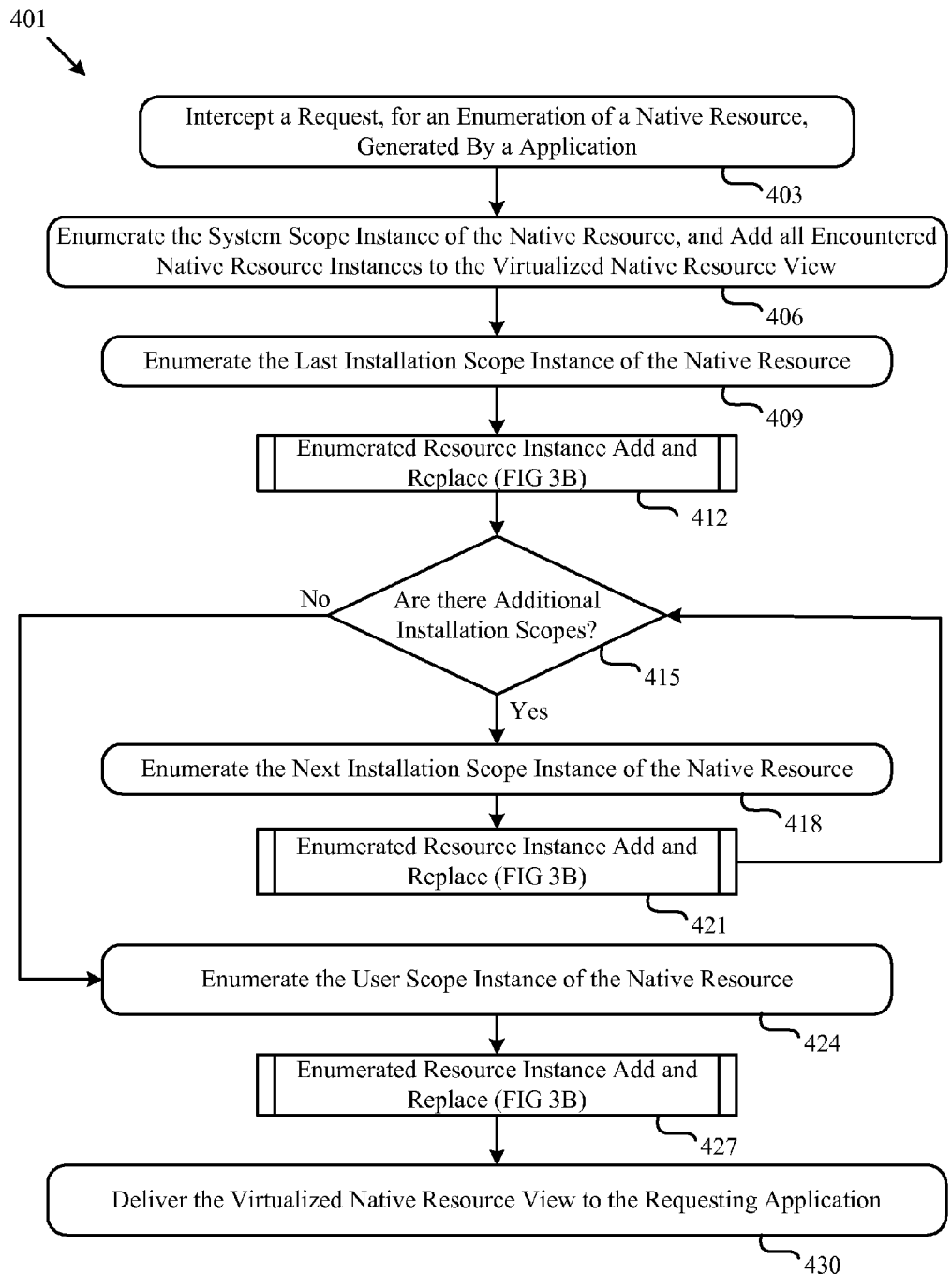
FIGS. 3A and 3B are flowcharts of an embodiment of a method of aggregating instances of native resources into a single native resource instance.

Illustrated in FIG. 3A is one embodiment of a method 401 of aggregating the resource views included in scopes into a virtual scope 262. The method 401 includes intercepting a request for an enumeration of a native resource, the request generated by a first application (step 403). The system scope instance of the native resources is enumerated, and all the resources encountered during the enumeration are added to a virtualized native resource view (step 406). The native resources in the last installation scope are enumerated (step 409), and an "enumerated resource instance add and replace" subroutine is called (step 412). A determination is made as to whether or not additional installation scopes are included within the isolation environment (step 415). When it is determined that there are additional installation scopes in the isolation environment, the native resources in the next installation scope are enumerated (step 418) and an "enumerated resource instance add and replace" subroutine is called (step 421). The determination is again made as to whether or not additional installation scopes are included within the isolation environment (step 415). If there are no additional installation scopes included within the isolation environment, an instance of the native resources in the user scope are enumerated (step 424), and an "enumerated resource instance add and replace" subroutine is called (step 427). A virtualized native resource view is then delivered to the requesting application (step 430).

Further referring to FIG. 3A in more detail, in one embodiment of the method 401, the method 401 is carried out by a driver. The driver, in some embodiments, can be any one of the following: a file system filter driver, a mini-filter, a driver, or any other type of virtual object above to carry out the methods described herein. Other embodiments of the method 401 may include a method 401 carried out by an application, a software program, or other set of software commands. Throughout this description it should be understood that whenever general reference is made to "scope," it is intended to also refer to sub-scopes, where those exist.

In one embodiment of the method 401, requests generated by an application executing on the computing machine 200, are intercepted by a driver (step 403). The requests are, in one embodiment, requests for an enumeration of a native resource. While in one embodiment of the method 401 the request can be for a single native resource, in other embodiments, the request can be for more than one native resource.

The method 401 enumerates the system scope instance of the native resource, and adds all encountered native resource instances to a virtualized native resource view included within the virtual scope 262 (step 406). In one embodiment of the method 401, the driver enumerates the instance of the native resource included in the system scope 256. The enumerated resources, in this embodiment, are added to a virtualized native resource view included in the virtual scope 262. When, in other embodiments, the system root 216 includes more than one system scope, the method 401 calls an "enumerated resource instance add and replace" subroutine in lieu of adding the enumerated system scope instance of the native resource. In this embodiment, the "enumerated resource instance add and replace," subroutine cycles through the more than one system scope and adds and replaces native resource instances within the virtualized native resource view. Embodiments include a method 401 that proceeds to enumerating the last installation scope instance of the native resources (step 409) when no instances of the requested native resource are found within the system scope. Still other embodiments of the method 401 include enumerating only those native resources pertinent to the requested resource, while other embodiments may include enumerating native resources corresponding only to the requested native resource, and still other embodiments may include enumerating all available native resources regardless of which native resource was requested.

Native resource instances in the last installation scope are, in one embodiment of the method 401, enumerated (step 409). The last installation scope, in this embodiment, is the installation scope located nearest to the system scope. Put another way, the last installation scope is the installation scope on which a base application instance is installed. This base application instance is an application instance that is shared by the other applications and application instances installed within the other installation scopes included in the installation root 214. In this embodiment of the method 401, subsequent installation scopes have applications installed thereon that reference this base application. Other embodiments of the method 401 enumerate the native resource instances in a first installation scope; while still other embodiments enumerate the native resource instances in an installation scope included within the installation root 214. Enumeration of the native resource instance means retrieving all instances of the native resource from a scope. Some embodiments of the method 401 can retrieve, obtain, or get native resources from the last installation scope.

Figure 3B:
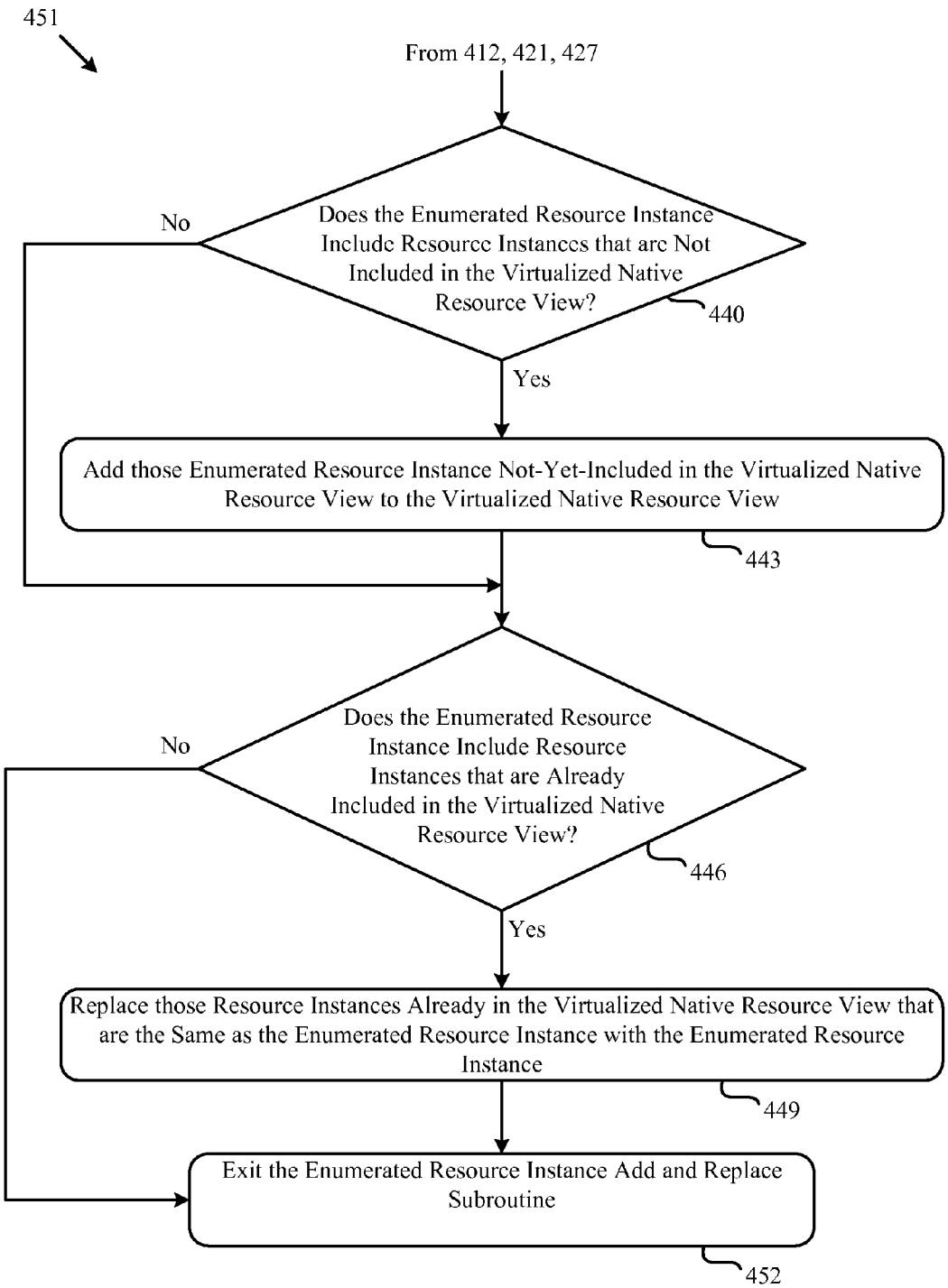

In one embodiment of the method 401, an "enumerated resource instance add and replace" subroutine is called. An embodiment of the "enumerated resource instance add and replace" subroutine 451 is illustrated in FIG. 3B. This subroutine 451 cycles through multiple scopes to add those instances of a native resource not yet included within the virtualized native resource view into the virtualized view, and to replace those native resource instances within the virtualized view with newly discovered native resource instances. Other embodiments of the method 401 may include the subroutine 451 within the main method 401, or may include a portion of the subroutine 451 within the main method 401.

A determination is made as to whether or not there are additional installation scopes within the installation root 214 (step 415). When a determination is made that there are additional installation scopes within the installation root 214, user scope instances of the native resource are enumerated (step 424). Other embodiments of the method 401 can account for more than one installation scope such that the method 401 does not make a determination as to whether or not there are additional installation scopes, but rather enumerates the installation scope native resource instances a pre-determined number of times corresponding to the number of installation scopes included in the installation root 214. Still other embodiments of the method 401 include enumerating the native resource instances in one of the installation scopes, and performing no further checks as to whether or not additional installation scopes are included in the installation root 214.

In one embodiment of the method 401, when a determination is made that there are additional installation scopes, the instances of the native resource within the next installation scope are enumerated (step 418). The last installation scope refers to the installation scope next in line from the last installation scope. For example if the installation root 214 included three installation scopes listed in order from one to three, with the third installation scope being the closest to the system scope, the third installation scope would be the last installation scope. In this example, the second installation scope would be the next installation scope queried. This means that the native resource instances in the second installation scope would be the next set of native resource instances to be enumerated. Further referring to this example, the first installation scope would include the last set of native resource instances to be enumerated.

A call is made to the "enumerated resource instance add and replace" subroutine 451 (step 421) and the resources enumerated in the next installation scope are either added to the virtualized native resource view, or inserted into to the virtualized native resource view in place of a native resource instance already included in the virtualized native resource view. Another determination is made, in one embodiment of the method 401, as to whether or not there are additional installation scopes are included in the installation root 214 (step 415). In this embodiment of the method 401, determinations are made as to whether or not additional installation scopes are included in the installation root 214 (step 415), instances of the native resource included in the next installation scope are enumerated (step 418), and the "enumerated resource instance add and replace" subroutine 451 is called (step 412), until all the installation scopes included in the installation root 214 are cycled through. Other embodiments of the method 401 may only cycle through additional installation scopes when it is determined that the first installation scope does not have an instance of the requested native resource (not illustrated). Still other embodiments of the method 401 may cycle through only a portion of the installation scopes according to user input or system requirements.

If a determination is made that there are not additional installation scopes, then those instances of the native resource in the user scope are enumerated (step 424). In this embodiment, a single user scope is searched for native resource instances. Other embodiments include a cycle similar to that used for the installation scopes (step 415-step 421) to cycle through multiple user scopes when the user root 212 includes multiple user scopes. An enumeration of native resource instances in a user scope can, in one embodiment of the method 401, include enumerating a single native resource instance corresponding to the requested native resource, or in other embodiments, can include enumerating multiple native resource instances related to the requested native resource.

Embodiments of the method 401 make a call to the "enumerated resource instance add and replace" subroutine 451 (step 427) to add enumerated native resource instances identified in the user scope or replace already existing native resource instances with the enumerated native resource instances identified in the user scope. Other embodiments include a method 401 that incorporates the steps within the subroutine 451 into the main method 401. Still other embodiments may return any native resource instance found within the user scope to the requesting application. In this embodiment, a virtualized native resource view would not be shown to the application, but rather an instance of the native resource within the user scope would be shown to the requesting application. Such an embodiment would operate the method 401 under the presumption that those instances of the native resource included within the user scope, take precedence over those native resources retrieved from either installation scopes or the system scope.

A virtualized view of the native resource is delivered to the requesting application (step 430), in one embodiment of the method 401. This virtualized view can in one embodiment include all found instance of the native resource. Other embodiments return to the requesting application a single instance of the native resource found within the most senior scope. In this embodiment, scope seniority is determined according to an order of priority analogous to an ordering of a user scope, a first installation scope, subsequent installation scopes, a last installation scopes, and a system scope; where the user scope has the most priority and the system scope has the least priority. Other embodiments may include an order of priority that is the reverse of the above described order of priority. Still other embodiments may include a user-defined or system-defined order of priority, or any other order of priority not analogous to the above defined ordering. In one embodiment, an instance of the native resource is returned to the requesting application that is found in the scope with the least priority. Other embodiments return to the requesting application a full aggregation of all the native resources included in each of the scopes where the aggregate native resource instance corresponds to the native resource instance included in a pre-determined scope.

Illustrated in FIG. 3B is an embodiment of the "enumerated resource instance add and replace" subroutine 451. The method 451 makes a determination as to whether or not the enumerated resource instance from a particular scope includes resources that are not already included in the virtualized native resource view included in the virtual scope 262 (step 440). When the determination is made that the enumerated resource instance is not included in the virtualized native resource view, that enumerated resource instance is then added to the virtualized native resource view (step 443). When the determination is made that the enumerated resource instance is already included within the virtualized native resource view (step 440), or when the enumerated native resource instance is added to the virtualized native resource view (step 443); a determination is made to verify that the enumerated resource instance includes resource instances already included in the virtualized native resource view (step 446). If it is determined that the enumerated resource instance does not include resource instances already included within the virtualized native resource view, then the "enumerated resource instance add and replace" subroutine is exited (step 452) and the main method 401 resumes. If it is determined that the enumerated resource instance does include resource instances already included within the virtualized native resource view, then those resources in the virtualized native resource view that are the same as the native resources identified in the enumeration of resources, are replaced with the enumerated native resource instance (step 449). The "enumerated resource instance add and replace" subroutine is then exited (step 452) and the main method 401 resumes.

In one embodiment, a conceptually similar method may be performed to enumerate an installation scope, or other scope that includes more than one sub-scope. In this embodiment, the individual sub-scopes are enumerated, where in the aggregate resource view, resources from higher priority sub-scopes replace the matching instances from lower priority sub-scopes.

Further referring to FIG. 3B and in more detail, an enumerated native resource instance is passed to the subroutine 451 from the main method 401 (step 412, step 421, step 427), and a determination is made as to whether or not the enumerated native resource instance is already included within the virtualized native resource view (step 440). In other words, in this embodiment when there is an instance of a native resource already included within the virtualized native resource view that is identified by a virtual name or other form of identification that is substantially similar to the virtual name or identifier given to the enumerated native resource instance, a determination can be made that an instance of the enumerated native resource instance already exists within the virtualized native resource view. Other embodiments may include comparing virtual names, or other identifying criteria associated with the native resource instances included in the virtualized native resource view with those virtual names or other identifying criteria associated with the enumerated native resource instance returned to the subroutine 451 from the main method 401. Still other embodiments could include a search through the virtualized native resource view to identify native resources that are substantially similar to the enumerated native resource instance.

When, in one embodiment, it is determined that the enumerated native resource is not already included in the virtualized native resource view, the enumerated native resource instance is added to the virtualized native resource view (step 443). In this embodiment, adding the enumerated native resource instance to the virtualized native resource view can include naming the enumerated native resource instance a virtual name, or otherwise identifying the enumerated native resource instance via an identifier that signifies to a driver or other object that the type and configuration of the enumerated native resource instance. Other embodiments of the subroutine 451 add the enumerated native resource to the virtualized native resource view regardless of whether or not an instance of the native resource is already included in the virtualized resource view. In such an embodiment, either a subsequent application would filter out duplicate native resource instances, or the virtualized resource view would be configured to display only the relevant native resource instances to the requesting application. Still other embodiments may include a subroutine 451 that does not add new resources to the virtualized native resource view.

When it is determined that the enumerated resource instance already exists within the virtualized native resource view, a further determination is made as to whether or not the enumerated native resource instance includes resource instances that are already included in the virtualized native resource view (step 446). In this embodiment, the further determination is made to verify that an instance of a resource substantially similar in type and/or having a substantially similar identifier or virtual name. Other embodiments may not include a second determination as to whether or not the enumerated resource instance is already included in the virtualized native resource view; but may proceed from a determination that the enumerated resource instance is already included within the virtualized native resource view (step 440) to replacing the resource within the virtualized native resource view with the newly enumerated native resource instance (step 449).

In one embodiment, when an enumerated resource instance is determined to already exist within the virtualized native resource view, that resource is replaced by the newly enumerated native resource instance (step 449). Native resource instances, in this embodiment, that are already included within the virtualized native resource view, have a lower priority than subsequently added native resource instances. In other words, since native resource instances are added from scopes of lower priority, like the system scope 256, before native instances are added from scope of higher priority, like user scopes; subsequently added native resource instances have more priority than already existing native resource instances. One example of this would be an instance of native resource A that is a type A resource, where the instance of native resource A is retrieved from the system scope 256 and added to the virtualized native resource view. In this example, a subsequent instance of native resource A is identified within a user scope. Those native resources within the user scope are a higher priority than those in the system scope because native resources within the user scope indicate user-specified settings that are more desirable than a system native resource which is essentially a generic resource common amongst all user sessions. Further referring to this example, the second instance of native resource A from the user scope is added to the virtualized native resource view, and the first instance of native resource A from the system scope is deleted from the virtualized native resource instance. Returning a native resource from the user scope rather than the system scope ensures that settings created by a user and associated with a user scope, can be available to that user the next time the user executes an application. In other words, replacing the lower priority native resource instance with the higher priority native resource instance, in this example, preserves user settings. Another example could include a system scope and an installation scope, where replacing the system scope instance of the native resource with the installation scope instance of the native resource preserves application settings and configurations so that the next time the application is executed, the settings and configurations are preserved. In other embodiments, the newly enumerated native resource instance is added to the virtualized native resource view, and a filter is later applied to remove the lower priority native resource instances. Still other embodiments include re-configuring an instance of a native resource when subsequent and substantially similar native resource instances are enumerated. In this embodiment, the existing native resource instance would be re-configured so as to resemble the newly enumerated native resource instance. Other embodiments include a subroutine 451 that does not replace those resources in the virtualized native resource view with those resources in the enumerated resource list when such common resources are identified. Still other embodiments include a subroutine 451 that replaces only those resource instances that are marked with permissions that allow the resource to be replaced by a subsequent resource of higher or lower priority. Still other embodiments include a subroutine 451 that replaces common resources when the enumerated resource is different from the virtualized native resource.

When, in some embodiments, the subroutine 451 determines that there are not native resource instances included in the virtualized native resource view that correspond to the enumerated native resource instance, the subroutine exits (step 452). Other embodiments of the subroutine 451 can include exiting the subroutine (step 452) and return to the main method 401. Still other embodiments of the subroutine 451 exit the subroutine (step 452) and the main method 401. In one embodiment of the subroutine 451, the subroutine exits and does not return to the main method 401.

While FIG. 3A and FIG. 3B contemplate an embodiment of a method 401 and subroutine 451 for aggregating native resource views, other embodiments may include a method 401 where the subroutine 451 is integrated into the method 401. Still other embodiments may include a method 401 that is further segmented into additional subroutines.

Figure 4:
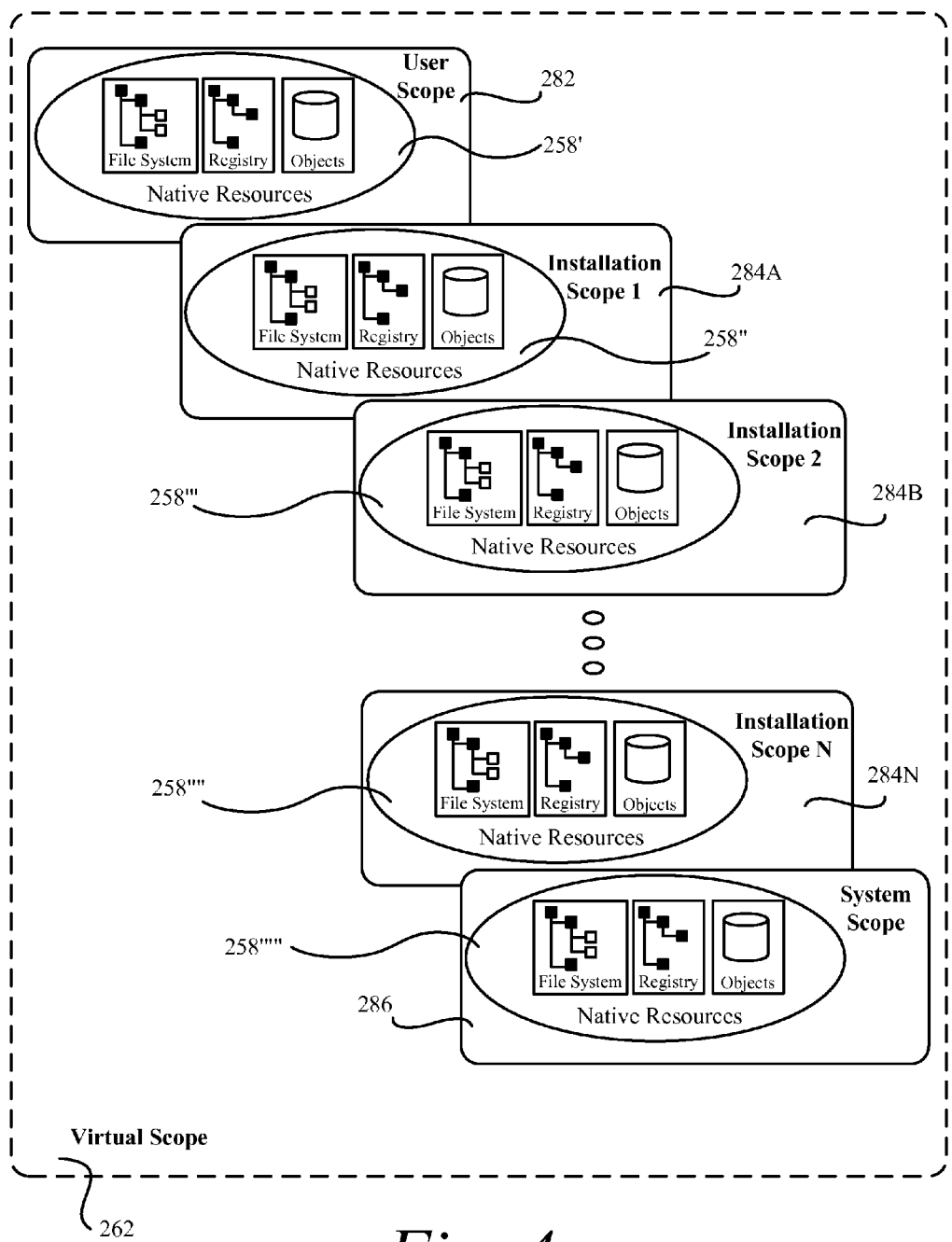
FIG. 4 is a block diagram of an embodiment of a virtual scope.

Illustrated in FIG. 4 is one embodiment created during the aggregation of more than one scope and displayed to an application executing on the computing machine 200. Creation and display of the virtual scope 262 further mitigates problems arising from application incompatibility and application non-sociability. Included within the virtual scope 262 is a user scope 282, a first installation scope 284A, a second installation scope 284B, a last installation scope 284N, and a system scope 286. Within each of the scopes is a set of native resources 258', 258'', 258''', 258'''', 258'''''.

Further referring to FIG. 4 and in more detail, the virtual scope 262 aggregates individual scopes that modify a native resource view 258. Aggregation of the modified resource views 258 further creates an aggregate view of the available native resources which is displayed to applications. The virtual scope 262 illustrated in this embodiment combines the user scope 282 with the system scope 286 and the installation scope(s) 284A-284N. Other embodiments can combine additional scopes (not illustrated) with the user scope 286, the installation scopes 284A-284N, and the system scope 286. Still other embodiments can include any combination of a user scope 282, an installation scope 284A-284N, and a system scope 286, including combinations where the virtual scope 262 includes a single type of scope, or one or more types of scope. Other embodiments include a virtual scope 262 that enumerates and aggregates instances of native resources from the user scope 282 down to the system scope 286. In this embodiment those native resource instances in the system scope 286 would have a higher priority than native resource instances in the installation scopes 284A-284N, and native resource instances in the user scope 282. Other embodiments may forgo creating a virtual scope 262 and perform a substantially instantaneous retrieval of a requested native resource in response to an application request, and using a series of queries and responses rather than enumerating and compiling the resources into a virtualized native resource view included in a virtual scope 262.

In one embodiment, each included scope has a group of modified native resource instances 258. When an application executing on the computing machine 200 requests a native resource, the application is presented with a virtual scope substantially similar to the virtual scope illustrated in FIG. 4. In this scope, the user-specific native resources 258' are combined with the application specific native resource views 258"-258"" and the system specific native resource views 258""" to create a single virtualized native resource view of the native resources. In this embodiment, a user-specified resource view 258' takes precedence over an application specific resource view 258"-258"", while an application specific resource view 258"-258"" takes precedence over a system specific resource view 258""". To take precedence over the native resource views 258 in a junior scope, implies that if there were a single setting common to both the native resource views of a senior scope and the native resource views of a junior scope, the setting associated with the senior scope can be included in the virtual scope 262. The concept of a senior and junior scope translates into an embodiment where there are multiple installation scopes 230 that can be ranked in order from first to last based on each scope's status with relation to the preceding and succeeding scopes. For example, in this embodiment if there were three scopes, then the last scope would be junior to the second scope, the second scope would be junior to the first scope, and the first scope would be senior to both the second scope and the third scope. In an embodiment of the virtual scope 262 that includes senior and junior scopes, a modification to a native resource in a junior scope is available to all those senior scopes associated with that junior scope; a modification to a resource in a senior scope, however, is not be available to all those junior scopes associated with the senior scope. These concepts can be extended to embodiments that utilize sub-scopes, such that the modifications to the native resource view included in a user sub-scope are common to all applications associated with the applicable installation sub-scope executing on behalf of a user, or group of users, associated with a user sub-scope.

If an application attempts to open an existing instance of a native resource with no intent to modify that resource, the specific instance that is returned to the application is the one that is found in the virtual scope 262, or equivalently the instance that would appear in the virtualized enumeration of the parent of the requested resource. From the point of view of the isolation environment 260, the application is said to be requesting to open a "virtual resource", and the particular instance of native resource used to satisfy that request is said to be the "literal resource" corresponding to the requested resource.

If an application executing on behalf of a user attempts to open a resource and indicates that it is doing so with the intent to modify that resource, that application instance is normally given a private copy of that resource to modify, as resources in the installation scope and system scope are common to applications executing on behalf of other users. Typically a user-scope copy of the resource is made, unless the user-scope instance already exists. The definition of the aggregate view provided by a virtual scope means that the act of copying an installation-scope or system-scope resource to a user scope does not change the aggregate view provided by the virtual scope 262 for the user and application in question, nor for any other user, nor for any other application instance. Subsequent modifications to the copied resource by the application instance executing on behalf of the user do not affect the aggregate view of any other application instance that does not share the same user scope. In other words, those modifications do not change the aggregate view of native resources for other users, or for application instances not associated with the same installation scope.

Figure 5:
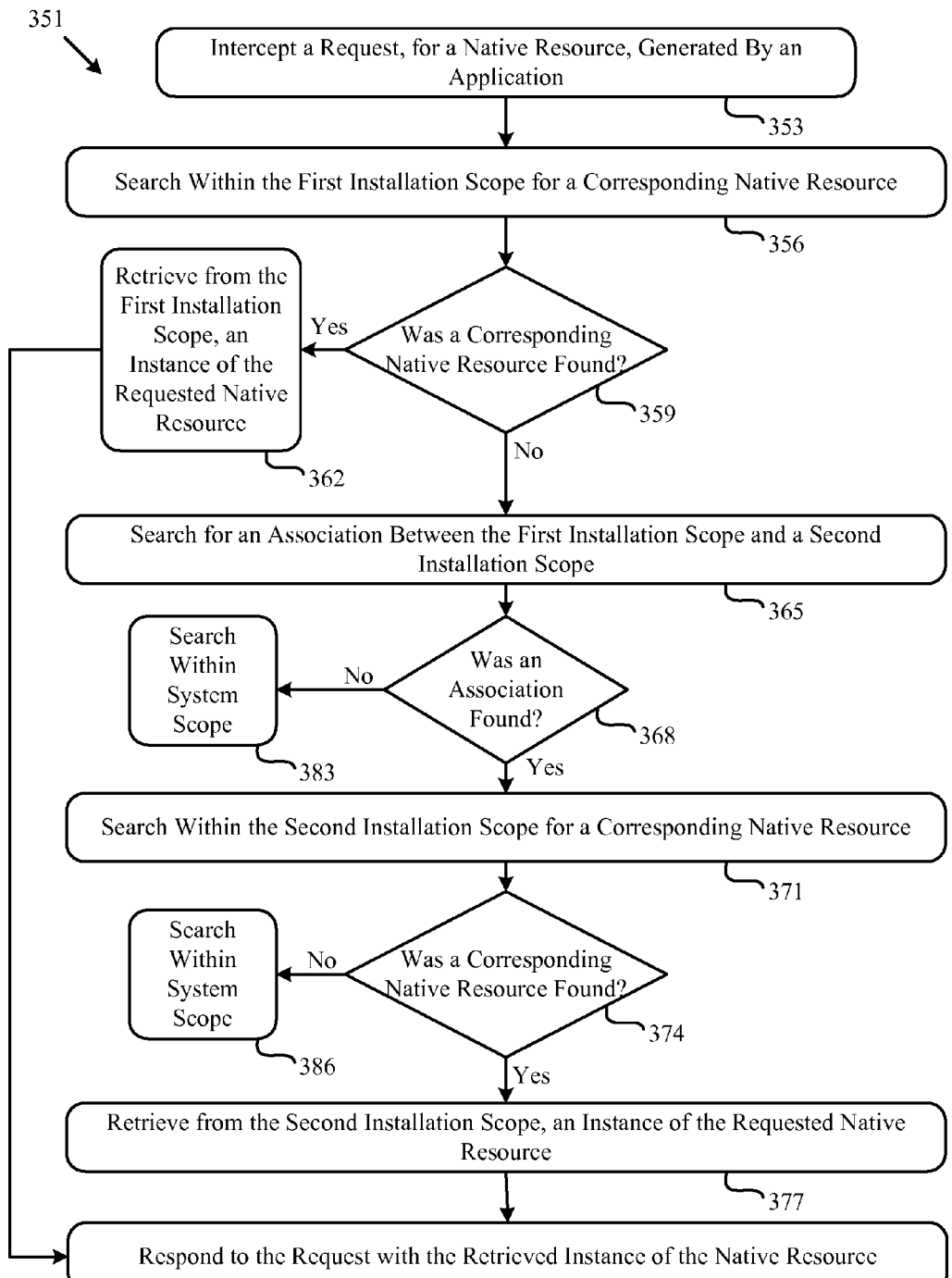
FIG. 5 is a flowchart of an embodiment of a method of retrieving an instance of a native resource.

A method for returning an instance of a native resource to a requesting application is illustrated in FIG. 5. This embodiment includes a method 351 that substantially instantaneously responds to a request for a native resource generated by an application executing in a user session after the request is intercepted (step 353). Upon interception of the native resource request (step 353), a search is performed within the first installation scope for an instance of a native resource corresponding to the requested native resource (step 356). A determination is made as to whether or not a corresponding instance of a native resource was found (step 359), and if the resource was found, an instance of the found native resource is retrieved from the first installation scope (step 362). When a native resource is not found, then a search is performed for an association between the first installation scope and a second installation scope (step 365). A determination is made as to whether or not an association between the first installation scope and the second installation scope was found (step 368), and if an association was not found, then a search is performed within the system scope (step 383) for an instance of a native resource corresponding to the requested native resource. When an association is found, then a search is performed within the second installation scope for an instance of a native resource corresponding to the native resource requested by the application (step 371). A determination is made as to whether or not an instance of a native resource corresponding to the requested native resource was found within the second installation scope (step 374), and if no corresponding resource was found, a search is performed within the system scope (step 383) for an instance of a native resource corresponding to the requested native resource. If an instance of a corresponding native resource is found within the second installation scope, then the instance of the native resource corresponding to the requested native resource is retrieved from the second installation scope (step 377). When a corresponding instance of a native resource is retrieved from either of the first installation scope, or an associated second installation scope, the retrieved resource instance is included within the response sent to the request made by the application for a native resource (step 380).

Further referring to FIG. 5 and in more detail, in the illustrated embodiment, the method 351 includes intercepting a request made by an application executing in a user session (step 353). In this embodiment, the request is made by a single application for a native resource. Other embodiments include a request made by one or more applications for one or more native resources. Further embodiments include an operating system 210 with a filter driver, driver, or other virtual object configured to intercept the application requests and implement the method 351.

In one embodiment, a search is performed in a first installation scope for an instance of a native resource corresponding to the native resource requested by the application (step 356). A first installation scope is the installation scope with the highest priority over all other installation scopes included in the isolation environment 260. For example, if three installation scopes were included in the isolation environment 260, then the first installation scope would be the scope with the highest priority over the other two installation scopes. The last installation scope, in this example, would be the installation scope with a lower priority than each of the other two installation scopes. Priority, in this example, is determinative of whether a native resource included in a scope is shown to a requesting application over resources included in other scopes. In this example, a resource included in the first installation scope can take priority over a resource in either of the second installation scope or the last installation scope, meaning that the requesting application is shown an instance of the native resource included in the first installation scope rather than an instance of the native resource included in the second installation scope, or the last installation scope.

A determination is made, in one embodiment, as to whether or not a corresponding native resource was found in the first installation scope (etrieved from the first installation-step 359). If a corresponding native resource is found, then an instance of this found resource is r scope (step 362). This instance of the native resource can, in some embodiments, be returned substantially immediately to the requesting application, or a further search may be done to find additional instances of the requested resource.

In one embodiment, if no corresponding instance of a native resource is found in the first installation scope, then a search is done for an association between the first installation scope and a second installation scope (365). Embodiments include searching for an association indicating that the first installation scope is associated with a second installation scope with respect to the applications each installation scope isolates. In one embodiment, a first application isolated within a first installation scope may interact with a second application isolated in a second installation scope. Rather than combine each application in a single installation scope, each application executes within its respective installation scope and the applications interact per associations established between the installation scopes. Association between the installation scopes, may in some embodiments cause the installation scopes to interact together within the isolation environment 260, while other embodiments may cause the installation scopes to interact together within the isolation environment 260 on a case by case basis.

A determination is made as to whether or not an association between the first installation scope and the second installation scope is found (step 368), and in one embodiment, the method then searches within the second installation scope for a corresponding native resource (step 371). While the embodiment illustrated in FIG. 5 depicts a search for an association between a first installation scope and a second installation scope, other embodiments may include a search for additional associations between one or more installation scopes, for example: an association between a second installation scope and a third installation scope, an association between a third installation scope and a fourth installation scope, and an association between an "n" installation scope and a "n+1" installation scope where n is any number greater than two. If no association is found between the first installation scope and an additional installation scope, then the method identifies a candidate resource in the system scope and searches within the system scope to verify the existence of the candidate resource (step 383).

In one embodiment, a determination is made as to whether or not an instance of a corresponding native resource is present within the second installation scope (step 374). When in one embodiment no resource instance is found, the method 351 then searches within the system scope for a corresponding instance of the requested native resource (step 386). In one embodiment, a found instance of the native resource is retrieved from the second installation scope (step 377), and this native resource instance is sent to the requesting application when a response to the application request is sent to the application (step 380).

Another embodiment includes a computing machine 200 configured to associate any application instance with any installation scope, regardless of whether the application was installed into that application isolation scope, another application isolation scope or no application isolation scope. Applications which were not installed into a particular application scope can be executed on behalf of a user in the context of an installation scope and the corresponding user scope, because their native resources are available to them via the aggregated virtual scope 262 formed by the user scope, installation scopes and the system scope. Where it is desired to run an application in isolation, this computing machine 200 provides the ability for applications installed directly into the system scope to be run within an isolation environment 260 without requiring a separate installation of the application within the isolation environment 260. This also provides the ability for applications installed directly into the system scope 256 to be used as helper applications in the context of any scope.

Each application instance, including all of the processes that make up the executing application, is associated with either zero or one installation scopes, and by extension exactly zero or one corresponding user scopes. This association is used by the rules engine when determining which rule, if any, to apply to a resource request. The association does not have to be to the installation scope that the application was installed into, if any. Many applications that are installed into a scope does not function correctly when running in a different scope or no scope because they cannot find necessary native resources. However, because a virtual scope 262 is an aggregation of resource views including the system scope, an application installed in the system scope can generally function correctly inside any installation scope. This means that helper programs, as well as out-of-process COM servers, can be invoked and executed by an application executing on behalf of a user in a particular scope.

In some embodiments, applications that are installed in the system scope are executed in a scope for the purpose of identifying what changes are made to the computer's files and configuration settings as a result of this execution. As all affected files and configuration settings are isolated in the user scope, these files and configuration settings are easily identifiable. In some of these embodiments, this is used in order to report on the changes made to the files and configuration settings by the application. In some embodiments, the files and configuration settings are deleted at the end of the application execution, which effectively ensures that no changes to the computer's files and configuration setting are stored as a result of application execution. In still other embodiments, the files and configuration settings are selectively deleted or not deleted at the end of the application execution, which effectively ensures that only some changes to the computer's files and configuration setting are stored as a result of application execution.

Virtualization Mechanism Overview

Figure 6A:
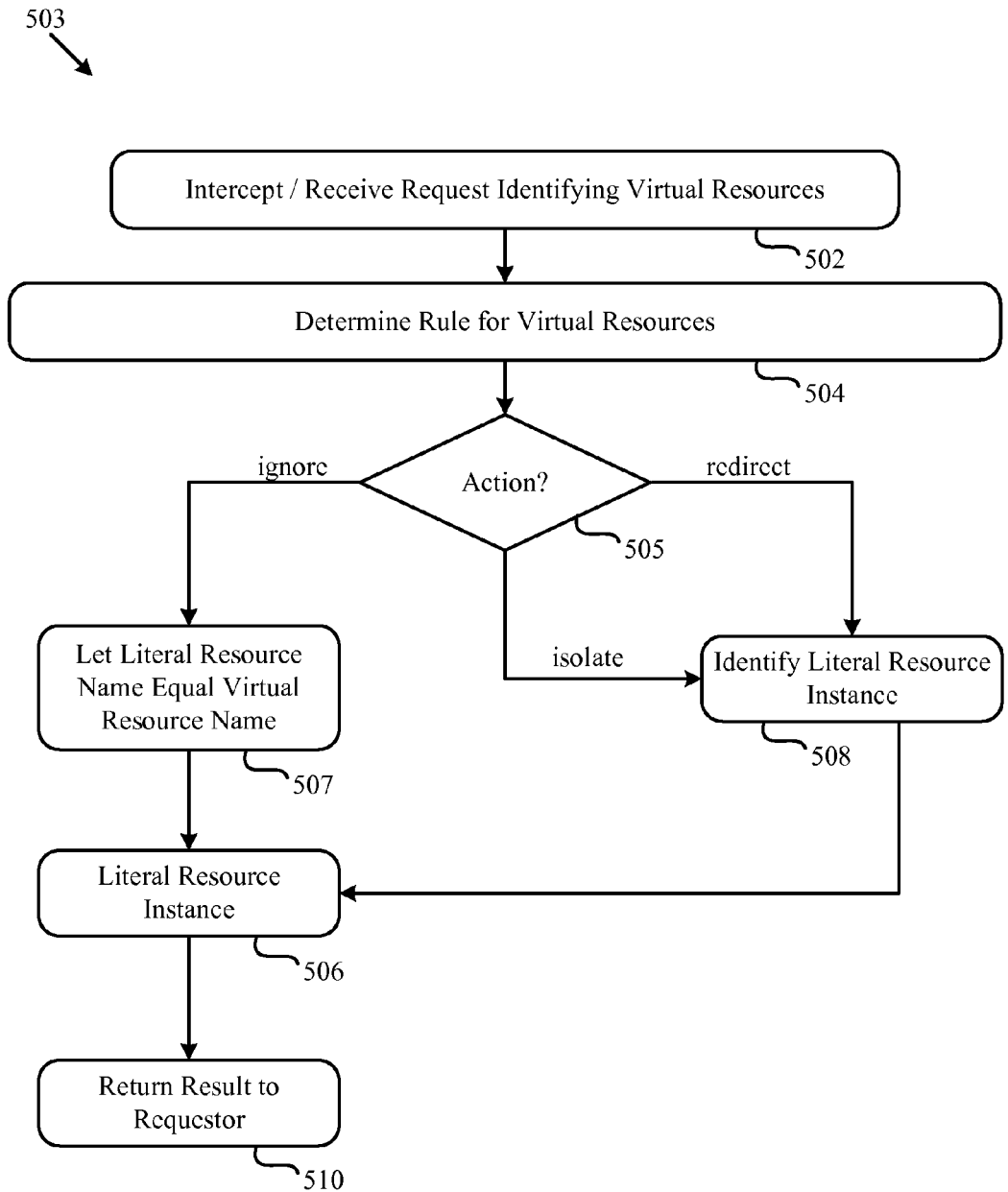
FIG. 6A is a flowchart showing an embodiment of a method for virtualizing access to native resources on a computing machine.

Illustrated in FIG. 6A is an embodiment for virtualizing access to native resources in an execution mode. An access mode is distinguishable from an installation mode as described in more detail below. In brief overview, a request to access a native resource is intercepted or received (step 502). The request identifies the native resource to which access is sought. The applicable rule regarding how to treat the received access request is determined (step 504), and a further determination is made as to what action should be taken (step 505). If the rule indicates the request should be ignored; then the literal resource name is set equal to the virtual resource name (step 507), the access request is passed without modification to the system root (step 506), and the result returned to the requestor (step 510). If the rule indicates that the access request should be either redirected or isolated, the literal instance of the resource that satisfies the request is identified (step 508), a modified or replacement request for the literal resource is passed to the system layer (step 506) and the result is returned to the requestor (step 510).

Still referring to FIG. 6A, and in more detail, a request identifying a native resource is intercepted or received (step 502). In some embodiments, requests for native resources are intercepted by "hooking" functions provided by the operating system 210 for applications to make native resource requests. In one embodiment, interception using a "hooking" function is implemented via a dynamically-linked library (DLL) that gets loaded into the address space of new processes created by the operating system 210, and which performs hooking during its initialization routine. Loading a DLL into each process is achieved in some embodiments using a facility provided by the operating system 210; or in other embodiments by modifying a list of DLLs to import included in the executable image, where the list of DLLs are either in the disk file, or in memory as the executable image for the process is loaded from disk. Still other embodiments perform "hooking" functions using a server, a driver, or a daemon. In other embodiments, executable images, including shared libraries and executable files, provided by the operating system 210 may be modified or patched in order to provide function hooks or to directly embody the logic of this invention. For specific embodiments in which the operating system 210 is a member of the Microsoft WINDOWS family of operating systems, interception may be performed by a kernel mode driver hooking the System Service Dispatch Table. In still other embodiments, the operating system 210 may provide a facility allowing third parties to hook functions that request access to native resources. In some of these embodiments, the operating system 210 may provide this facility via an application programming interface (API) or a debug facility.

In other embodiments, the native resource request is intercepted by a filter in the driver stack or handler stack associated with the native resource. For example, some members of the family of Microsoft WINDOWS operating systems provide the capability to plug a third-party filter driver or mini-filter into the file system driver stack and a file system filter driver or mini-filter may be used to provide the isolation functions described below. In still other embodiments the invention comprises a file system implementation that directly incorporates the logic of this invention. Alternatively, the operating system 210 may be rewritten to directly provide the functions described below. In some embodiments, a combination of some or all of the methods listed above to intercept or receive requests for resources may be simultaneously employed.

In many embodiments, only requests to open an existing native resource or create a new native resource are hooked or intercepted. In these embodiments, the initial access to a native resource is the access that causes the resource to be virtualized. After the initial access, the requesting application program is able to communicate with the operating system 210 concerning the virtualized resource using a handle or pointer or other identifier provided by the operating system 210 that directly identifies the literal resource. In other embodiments, other types of requests to operate on a virtualized native resource are also hooked or intercepted. In some of these embodiments, requests by the application to open or create virtual resources return virtual handles that do not directly identify the literal resource, and the isolation environment 260 is responsible for translating subsequent requests against virtual handles to the corresponding literal resource. In some of those embodiments, additional virtualization operations can be deferred until proven necessary. For example, the operation of providing a private modifiable copy of a resource to an installation scope can be deferred until a request to change the resource is made, rather than when the resource is opened in a mode that allows subsequent modification.

In some embodiments, once the native resource request is intercepted or received, the applicable rule determining how to treat the particular request is determined (step 504). The applicable rule may, in some embodiments, be determined by reference to a rules engine, a database of rules, or a flat file containing rules organized using an appropriate data structure such as a list or a tree structure. In other embodiments, rules are accorded a priority that determines which rule is regarded as the applicable rule when two or more rules apply. Rule priority, in many embodiments, is included in the rules themselves or, in other embodiments, rule priority may be embedded in the data structure used to store the rules, for example, rule priority may be indicated by a rule's position in a tree structure. The determined rule in these embodiments, may include additional information regarding how to process the virtualized resource request such as, for example, to which literal resource to redirect the request. In a specific embodiment a rule is a triple comprising a filter field, an action field, and data field. In this embodiment, the filter field includes the filter used to match received native resource requests to determine if the rule is valid for the requested resource name.

In one embodiment, a determination is made as to what action should be performed (step 505). Some embodiments of the method 503 encapsulate action information within the retrieved rule information. Exemplary actions include: "ignore;" "redirect;" or "isolate". Further embodiments include a data field that include additional information concerning the action to be taken when the rule is valid, including the function to be used when the rule is valid. Still other embodiments of the method 503 include a determination as to which action should be performed (step 505), where the action instruction is generated by user-input.

In many embodiments, a rule action of "ignore" means the request directly operates on the requested native resource in the system scope. That is, the name of the literal resource is made to equal the virtual name (step 507), and the request is passed unaltered to the system root 216 (step 506) and the request is fulfilled as if no isolation environment 260 exists. In this case, the isolation environment 260 is said to have a "hole", or the request may be referred to as a "pass through" request.

If the rule action, in some embodiments, indicates that the native resource request should be redirected or isolated, then the literal resource that satisfies the request is identified (step

508). A rule action of "redirect" means in many embodiments, that the native resource request directly operates on a system-scope native resource, albeit a different resource than specified in the request. The literal resource is identified by applying a mapping function specified in, or implied by, the data field of the determined rule to the name of the requested native resource. In the most general case the literal native resource may be located anywhere in the system scope 256. As a simple example, the rule {prefix match ("c:\temp\", resource name), REDIRECT, replace_prefix ("c:\temp\", "d:\wutemp\", resource name)} can redirect a requested access to the file c:\temp\examples\d1.txt to the literal file d:\wutemp\examples\d1.txt. The mapping function included in the data field of the rule and the matching function may be further generalized to support complex behaviors by, for example, using regular expressions. Some embodiments may provide the ability to specify mapping functions that locate the literal resource within the user isolation scope or a sub-scope applicable to the application executing on behalf of the user, or the installation scope or a sub-scope applicable to the application. Further embodiments may provide the ability to specify mapping functions that locate the literal resource within an installation scope applicable to a different application in order to provide a controlled form of interaction between isolated applications. In some particular embodiments, the "redirect" action can be configured to provide behavior equivalent to the "ignore" rule action. In these embodiments, the literal resource is exactly the requested native resource. When this condition is configured, the isolation environment 260 may be said to have a "hole," or the request may be referred to as a "pass through" request.

A rule action of "isolate" means that the request operates on a literal resource that is identified using the appropriate user scope and installation scope. That is, the identifier for the literal resource is determined by modifying the identifier for the requested native resource using the user scope, the installation scope, both scopes, or neither scope. The particular literal resource identified depends on the type of access requested and whether instances of the requested native resource already exist in the applicable user scope, the applicable installation scope and the system scope 256.

Figure 6B:
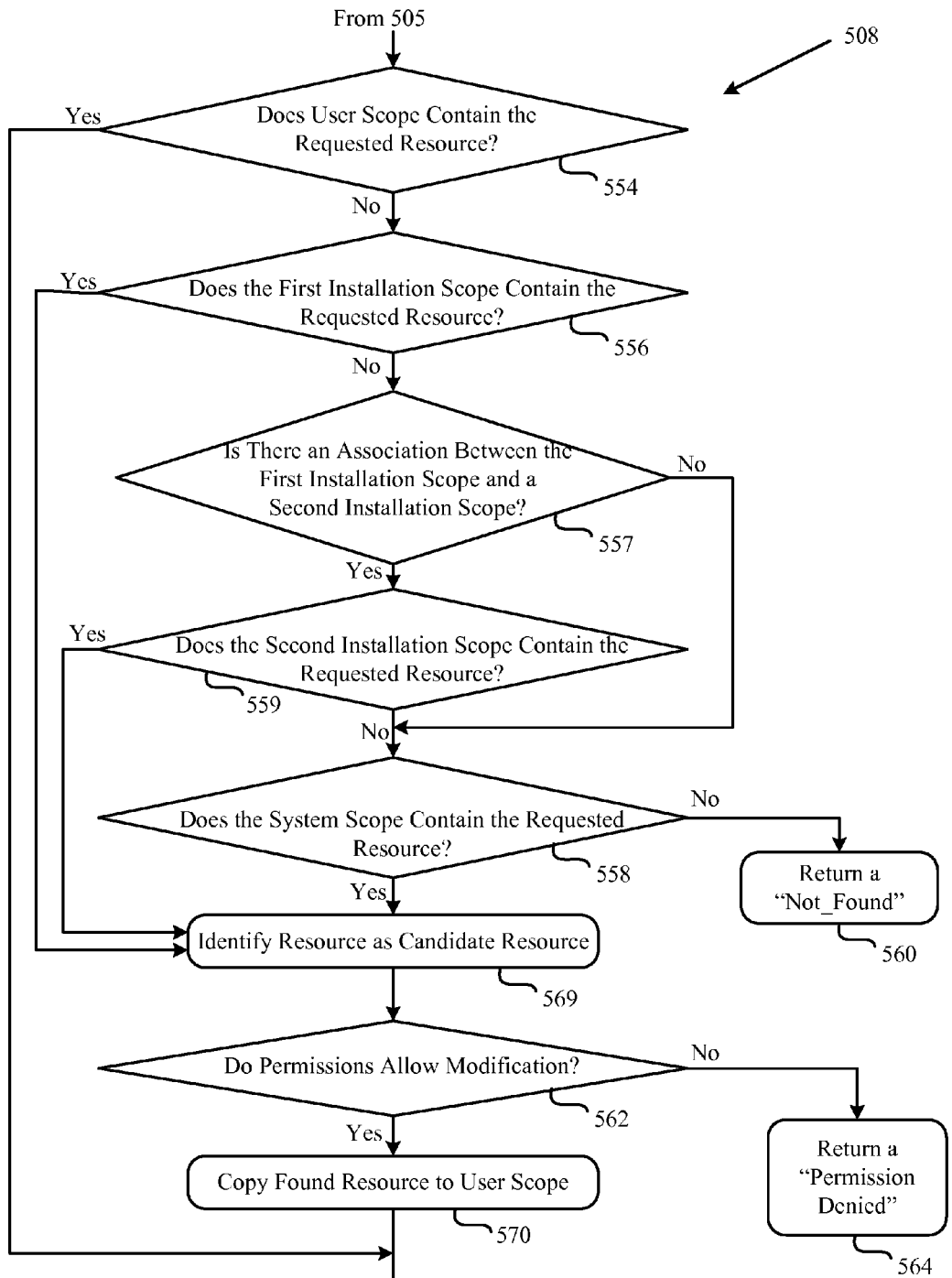
FIG. 6B is a flowchart showing an embodiment of a method for identifying a replacement instance of a resource while in execute mode.

FIG. 6B depicts one embodiment of a process 508 that includes the steps taken to identify the literal resource (step 506 in FIG. 6A) when a request to open a native resource is received that indicates the resource is being opened with the intention of modifying it. Briefly, a determination is made whether the user-scope instance, that is, an instance that exists in an applicable user scope or user sub-scope, of the requested native resource exists (step 554). If so, the user-scope instance is identified as the literal resource for the request (step 506), and that instance is opened and returned to the requestor. If the user-scope instance does not exist, a determination whether the first installation-scoped instance of the requested native resource exists is made (step 556). If the first installation-scope instance exists, it is identified as the "candidate" resource instance (step 569), and permission data associated with the candidate instance is checked to determine if modification of that instance is allowed (step 562). If no first installation-scope instance exists, then a determination whether there exists an association between the first installation scope and a second installation scope is made (step 557). If such an association exists between the first installation scope and a second installation scope exists, then a determination whether the second installation-scope instance of the requested native resource exists is made (step 559). If the second installation-scope instance exists, it is identified as the "candidate" resource instance (step 569). If an association between the first installation scope and a second installation scope does not exist, or if an association does exist but no second installation-scope instance exists; then a determination is made whether the system-scope instance of the requested native resource exists (step 558). If a system-scope instance does not exist, an error condition is returned to the requestor indicating that the requested virtualized resource does not exist in the virtual scope (step 560). However, if the system-scope instance exists, the instance is identified as the candidate resource instance (step 569), and permission data associated with the candidate instance is checked to determine if modification of that instance is allowed (step 562). If not, an error condition is returned to the requestor (step 564) indicating that modification of the virtualized resource is not allowed. If the permission data indicates that the candidate resource may be modified, a user-scope copy of the candidate instance of the native resource is made (step 570), the user-scope instance is identified as the literal instance for the request (step 506), and is opened and returned to the requestor.

Still referring to FIG. 6B, and in more detail, in one embodiment of the process 508, a determination is made whether the user-scope resource exists, or in other words, whether the requested resource exists in the applicable user scope or sub-scope (step 554). In some embodiments, the applicable user scope or sub-scope is the scope associated with the user session executing the application that made the request. The user scope or a sub-scope, in an embodiment where the requested resource is a file from the file system, may be a directory under which all files that exist in the user scope are stored. In some of these embodiments, the directory tree structure under the user scope directory reflects the path of the requested resource. For example, if the requested file is c:\temp\test.txt and the user scope directory is d:\user1\app1\, then the path to the user-scoped literal file may be d:\user1\app1\c\temp\test.txt. In other embodiments, the path to the user-scope literal file may be defined in a native naming convention. For example, the path to the user-scope literal file may be d:\user1\app1\device\harddisk1\temp\test.txt. In still other embodiments, the user-scope files may all be stored in a single directory with names chosen to be unique and a database may be used to store the mapping between the requested file name and the name of the corresponding literal file stored in the directory. In still other embodiments, the contents of the literal files may be stored in a database. In still other embodiments, the native file system provides the facility for a single file to contain multiple independent named "streams", and the contents of the user-scope files are stored as additional streams of the associated files in the system scope 256. Alternatively, the literal files may be stored in a custom file system that may be designed to optimize disk usage or other criteria of interest.

If the user-scope resource instance does not exist, then a determination is made whether the first installation-scope resource exists, or in other words whether the requested resource exists in the first installation scope (step 556). In one embodiment, the methods described above are used to make this determination. For example, if the requested file is c:\temp\test.txt and the first installation scope directory is e:\app1\, then the path to the first installation-scope file may be e:\app1\c\temp\test.txt. As above, other embodiments may allow the path to the first installation-scope file to be stored in a native naming convention. The embodiments described above may also apply to the first installation scope.

If the first installation-scope resource does not exist, then a determination is made whether there exists an association between the first installation scope and a second installation scope (step 557). In many embodiments, multiple installation scopes may exist within the isolation environment 260, meaning that a first installation scope may be associated with one or more additional installation scopes such that images of these additional installation scopes are included within the isolation environment 260 associated with the first installation scope. While FIG. 6B illustrates a process 508 that only checks for an association with a second installation scope, other embodiments of the process 508 may include checks for one or more additional installation scopes. In this embodiment, each additional installation scope would be analyzed to determine if that installation scope contains an instance of the requested resource (analogous to step 559), and when the determination is true, the found resource would be identified as a candidate resource (step 569).

If an association between the first installation scope and a second installation scope does exist, then a determination is made as to whether or not the second installation scope contains an instance of the requested resource (step 559). In one embodiment, the methods described above may be used to make this determination. For example, if the requested file is c:\temp\test.txt and the second installation scope directory is e:\app1\, then the path to the second installation-scope file may be e:\app1\c\temp\test.txt. As above, other embodiments may allow the path to the second installation-scope file to be stored in a native naming convention. The embodiments described above may also apply to the second installation scope.

If either the second installation-scope resource does not exist, or an association between the first installation scope and a second installation scope does not exist; then a determination is made whether the system-scope resource exists, or in other words, whether the requested resource exists in the system scope (step 558). For example, if the requested file is c:\temp\test.txt then the path to the system-scope file is c:\temp\test.txt. If the requested resource does not exist in the system scope, an indication that the requested resource does not exist in the virtual scope is returned to the requestor (step 560).

Whether the candidate resource instance for the requested resource is located in one of the installation scopes, or in the system scope, a determination is made whether modification of the candidate resource instance is allowed (step 562). For example, the candidate native resource instance may have associated native permission data indicating that modification of the candidate instance is not allowed by that user session. Further, the rules engine may include configuration settings instructing the isolation environment 260 to obey or override the native permission data for virtualized copies of resources. In some embodiments, the rules may specify for some virtual resources the scope in which modifications are to occur, for example the system scope, an installation scope or a sub-scope, or the user scope or a sub-scope. In some embodiments, the rules engine may specify configuration settings that apply to subsets of the virtualized native resources based on hierarchy or on type of resource accessed. In some of these embodiments, the configuration settings may be specific to each virtualized native resource. In another example, the rules engine may include configuration data that prohibits or allows modification of certain classes of files, such as executable code, MIME types, or file types as defined by the operating system 210.

If the determination is made that the permissions do not allow modification of the candidate resource instance, then an error condition is returned to the requestor indicating that write access to the virtual resource is not allowed (step 564). If the determination is made that the permissions do allow the candidate resource instance to be modified, then the candidate instance is copied to the appropriate user scope or sub-scope (step 570). For embodiments in which the logical hierarchy structure of the requested native resource is maintained in the various scopes, copying the candidate instance of the resource to the user scope (step 570) may require the creation in the user scope of hierarchy placeholders. A hierarchy placeholder is a node that is placed in the hierarchy to correctly locate the copied resource in a scope. A hierarchy placeholder stores no data, is identified as a placeholder node, and "does not exist" in the sense that it cannot be the literal resource returned to a requestor. In some embodiments, the identification of a node as a placeholder node is made by recording the fact in metadata attached to the node, or to the parent of the node, or to some other related entity in the system layer. In other embodiments, a separate repository of placeholder node names is maintained.

In some embodiments, the rules may specify that modifications to particular resources may be made at a particular scope, such as the installation scope. In those cases the copy operation (step 570) is expanded to determine whether modification to the candidate resource instance is allowed at the scope or sub-scope in which it is found. If not, the candidate resource instance is copied to the scope or sub-scope in which modification is allowed, which may not be the user scope, and the new copy is identified as the literal resource instance (step 506). If so, the candidate resource instance is identified as the literal instance (step 506), and is opened and the result returned to the requestor (step 510).

Referring back to FIG. 6A, the literal resource instance, whether located within the user scope (step 554) or created when copied into the user scope (step 570); is opened (step 506) and returned to the requestor (step 510). In some embodiments, opening the resource instance and returning the instance to the requesting application is accomplished by issuing an "open" command to the operating system 210 and returning to the requesting application the response from the operating system 210 to the "open" command.

If an application executing on behalf of a user deletes a native resource, the aggregated view of native resources presented to that application as the virtual scope 262 reflects that deletion. In one embodiment, a request to delete a resource is a request for a special type of modification, albeit one that modifies the resource by removing its existence entirely. Conceptually a request to delete a resource proceeds in a similar manner to that outlined in FIG. 6A, including the determination of the literal resource as outlined in FIG. 6B. In an embodiment that supports a deletion operation, however, identifying a literal resource instance (step 506) operates differently for isolated resources and for redirected or ignored resources. When the action is "redirect" or "ignore," the literal resource is deleted from the system scope. When the action is "isolate," the literal resource is "virtually" deleted, or in other words the fact that it has been deleted is recorded in the user scope. A deleted node contains no data, is identified as deleted, and it and all of its descendants "do not exist". In other words, if it is the resource or the ancestor of a resource that would otherwise satisfy a resource request a "resource not found" error is returned to the requestor. Outlined below are further details regarding this process. In some embodiments, the identification of a node as a deleted node is made by recording the fact in metadata attached to the node, or to the parent of the node, or to some other related entity in the system root 216. In other embodiments, a separate repository of deleted node names is maintained, for example, in a separate sub-scope.

Installation of an Application into an Installation Scope

In many embodiments, an installation scope as described above is the scope in which associated instances of an application share resources independently of other user sessions, or equivalently on behalf of all possible user sessions, including the resources that those application instances create. Embodiments can include a main class of these resources that is created when an application gets installed onto the operating system 210. Some embodiments include a computer 200 where two incompatible applications do not have permission to be installed thereon. In this embodiment, the problem of incompatibility between two different applications is solved by installing at least one of the applications into an isolation environment 260. To accomplish installation of an application into an isolation environment 260, an embodiment of an installation method allows an installation scope, or an application instance associated with an installation scope to operate in an "install mode" such that the installation scope or application instance can support installation of an application. In this embodiment, the "install mode" utilizes the installation program for a chosen application, and associates this installation program with an installation scope under the presumption that the installation program should execute on behalf of all user sessions. The installation scope, in this embodiment, acts for the application instance as if the installation scope were a user scope for "all users" even though no user scope is active for that application instance.

Figure 6C:
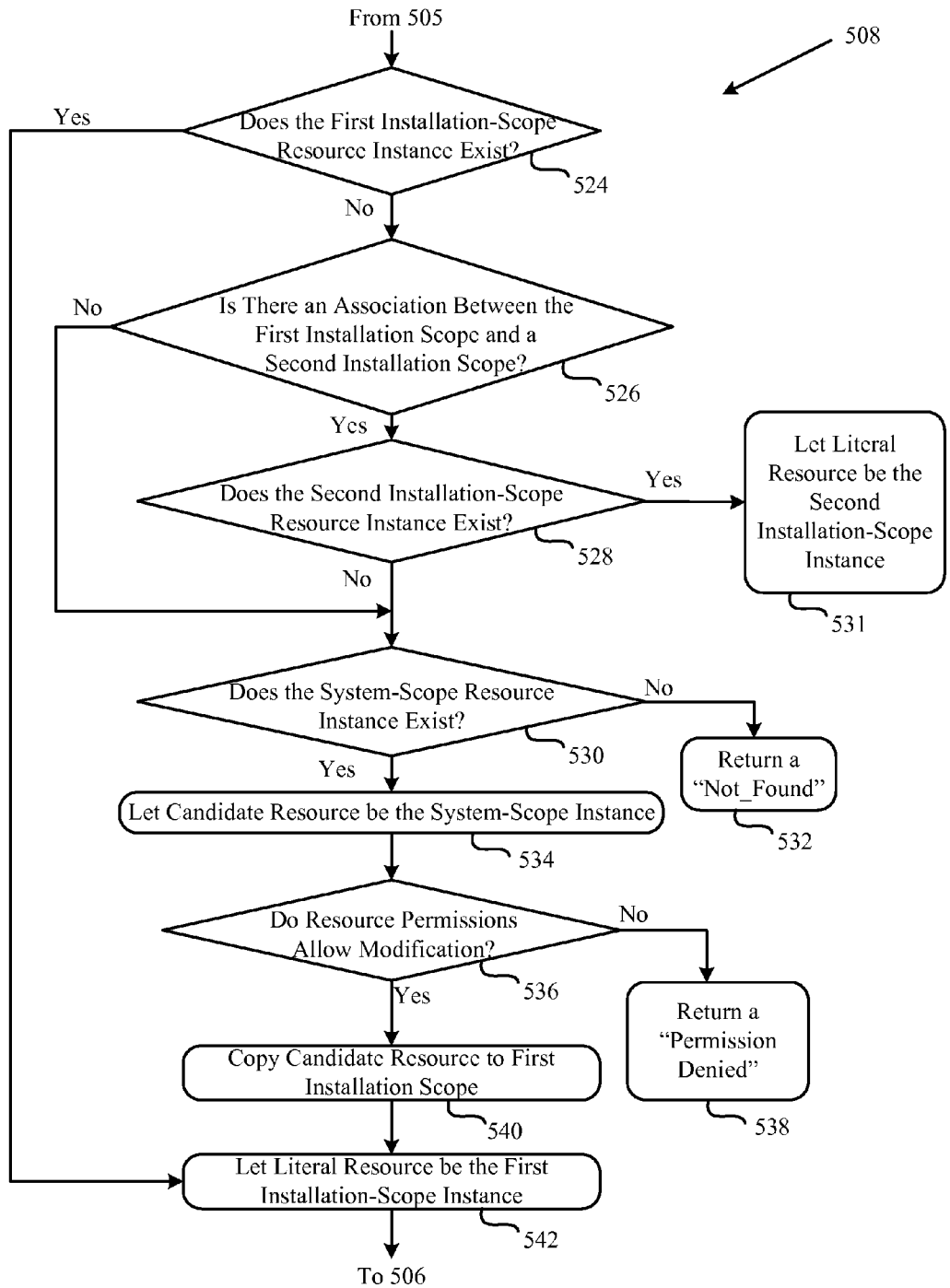
FIG. 6C is a flowchart showing an embodiment of a method for identifying a literal resource when a request to open a native resource is received that indicated the resource is being opened with the intention of modifying it.

Illustrated in FIG. 6C are is an embodiment of a method 508 operating in install mode, and an method 508 configured to identify a literal resource when a request to open a native resource is received that indicates the resource is being opened with the intention of modifying it. A determination is first made as to whether or not the resource instance exists within the first installation scope (step 524). If no resource instance exists within the first installation scope, then a determination is made as to whether or not there is an association between the first installation scope and a second installation scope (step 526). If there is no association between the first installation scope and a second installation scope, then a determination is made as to whether or not an instance of the resource exists within the system scope (step 530). If there is an association between the first installation scope and a second installation scope, then a determination is made as to whether or not an instance of the resource exists within the second installation scope (step 528). If a determination is made that an instance of the resource exists within the second installation scope, then the literal instance is identified as the instance found within the second installation scope (step 531). If a determination is made that an instance of the resource does not exist within the second installation scope, then a determination is made as to whether or not an instance of the requested resource exists within the system scope (step 530). If no instance of the resource exists within the system scope, then an error of "Not Found" is returned to the requesting application (step 532). If, however, an instance of the requested resource is found within the system scope, then the system scope instance of the requested resource is identified as the candidate resource (step 534). A determination is then made as to whether or not the permissions associated with the identified resource allow the identified resource instance to be modified (step 536). If the permissions do not allow for a modification of the identified instance of the resource, then an error of "Permission Denied" is returned to the requesting application (step 538). When, however, the permissions do allow for a modification of the identified instance of the resource, then the candidate resource is copied to the first installation scope (step 540), and the literal resource is the instance of the resource within the first installation scope (step 542). When a determination is made that an instance of the resource exists within the first installation scope (step 524), then the literal resource is the instance of the resource within the first installation scope (step 542).

Further referring to FIG. 6C in more detail, in one embodiment of the method 508, no user-scope is active and so a determination is first made whether there exists a first installation-scope instance of the requested native resource exists (step 524). If the first installation-scope instance exists, it is identified as the literal resource instance (step 542). If no first installation-scope instance exists, a determination is made as to whether or not there exists an association between the first installation scope and a second installation scope (step 526). When it is determined that there exists an association, a further determination is made as to whether a second installation-scope instance exists (step 528). In other embodiments of the method 508, more than two installation scopes are searched for an instance of the resource, and determinations are made as to whether or not there are associations between more than two installation scopes.

In one embodiment of the method 508, when no association is found between the first installation scope and additional installation scopes, a determination is made as to whether or not an instance of the resource exists within the system scope (step 530). If an instance of the resource does exist within the second installation scope, then that found resource is identified as the literal resource (step 531). Other embodiments of the method 508 may copy the identified resource instance to the first installation scope (step 540), and identify the copied instance as the literal resource.

In one embodiment of the method 508, when a determination is made that a resource identified in the system scope as the candidate resource (step 534) has permission to be modified (step 536), that resource is copied to the first installation scope (step 540) and identified as the literal resource (step 542). In some embodiments of the method 508, the candidate file is copied to a location defined by the rules engine. For example, a rule may specify that the file is copied to an application isolation scope. In other embodiments the rules may specify a particular application isolation sub-scope or user isolation sub-scope to which the file should be copied. Any ancestors of the requested file that do not appear in the isolation scope to which the file is copied are created as placeholders in the isolation scope in order to correctly locate the copied instance in the hierarchy.

Figure 6D:
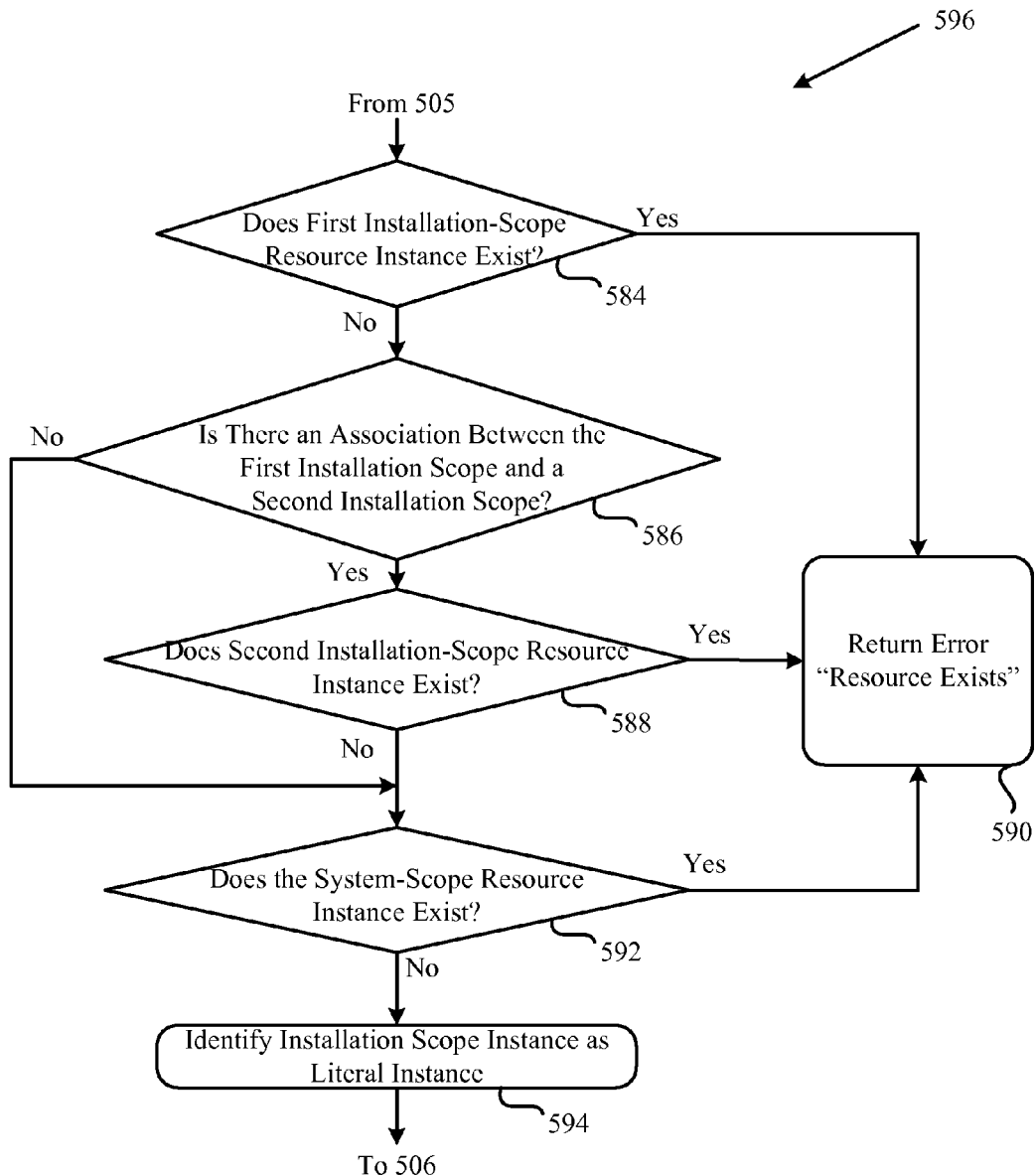
FIG. 6D is a flowchart showing an embodiment of a method for identifying, while in install mode, the literal resource when a request to create a virtual resource is received.

Illustrated in FIG. 6D is an embodiment of a method 596 that operates in install mode such that the method 596 is configured to identify the literal resource when a request to create a native resource is received. Briefly, as no user-scope is active, a determination is first made whether the first installation-scope instance of the requested native resource exists (step 584). If the first installation-scope instance exists, an error condition may be returned to the requestor indicating that the resource cannot be created because it already exists (step 590). If no first installation-scope instance exists, a determination is made as to whether or not an association exists between the first installation scope and the second installation scope (step 586). If there is an association between the first installation scope and the second installation scope, then a determination is made as to whether or not the system-scoped instance of the requested native resource exists (step 588). If an instance of the resource exists within the second installation scope, then an error condition may be returned to the requestor indicating that the resource cannot be created because it already exists (step 590). If an instance of the resource does not exist within the second installation scope, then a determination is made as to whether or not an instance of the resource exists within the system scope (step 592). When an instance of the resource exists within the system scope, an error condition may be returned to the requestor indicating that the resource cannot be created because it already exists (step 590). In some embodiments, the request used to open the resource may specify that any extant system-scope instance of the resource may be overwritten. If the system-scope resource instance does not exist, either of the installation-scope resource instances may be identified as the literal instance which is created to fulfill the request (step 594).

By comparing FIG. 6B with FIGS. 6C and 6D, it can be seen that install mode operates in a similar manner to execute mode, with the installation scope taking the place of the user scope. In other words, modifications to persistent resources, including creation of new resources, take place in the appropriate installation scope instead of the appropriate user scope. Furthermore, virtualization of access to existing isolated resources also ignores the appropriate user scope and begins searching for a candidate literal resource in the installation scope.

There are two other cases where the installation scope operates in this manner to contain modifications to existing resources and creation of new resources. Firstly, there may be an isolation environment 260 configured to operate without a user layer, or a virtual scope 262 configured to operate without a user scope. In this case, the installation scope is the only scope that can isolate modified and newly created resources. Secondly, the rules governing a particular set of virtual resources may specify that they are to be isolated into the appropriate installation scope rather than into the appropriate user scope. Again, this means modifications to and creations of resources subject to that rule are isolated in the appropriate installation scope where they are visible to all application instances sharing that scope, rather than in the user scope where they are only visible to the user executing those application instances.

In still other embodiments, an isolation environment 260 may be configured to allow certain resources to be shared in the system scope, that is, the isolation environment 260 may act, for one or more system resources, as if no user scope and no installation scope exists. System resources shared in the system scope are not copied when accessed with the intent to modify, because they are shared by all applications and all users, i.e., they are global objects.

Figure 7:
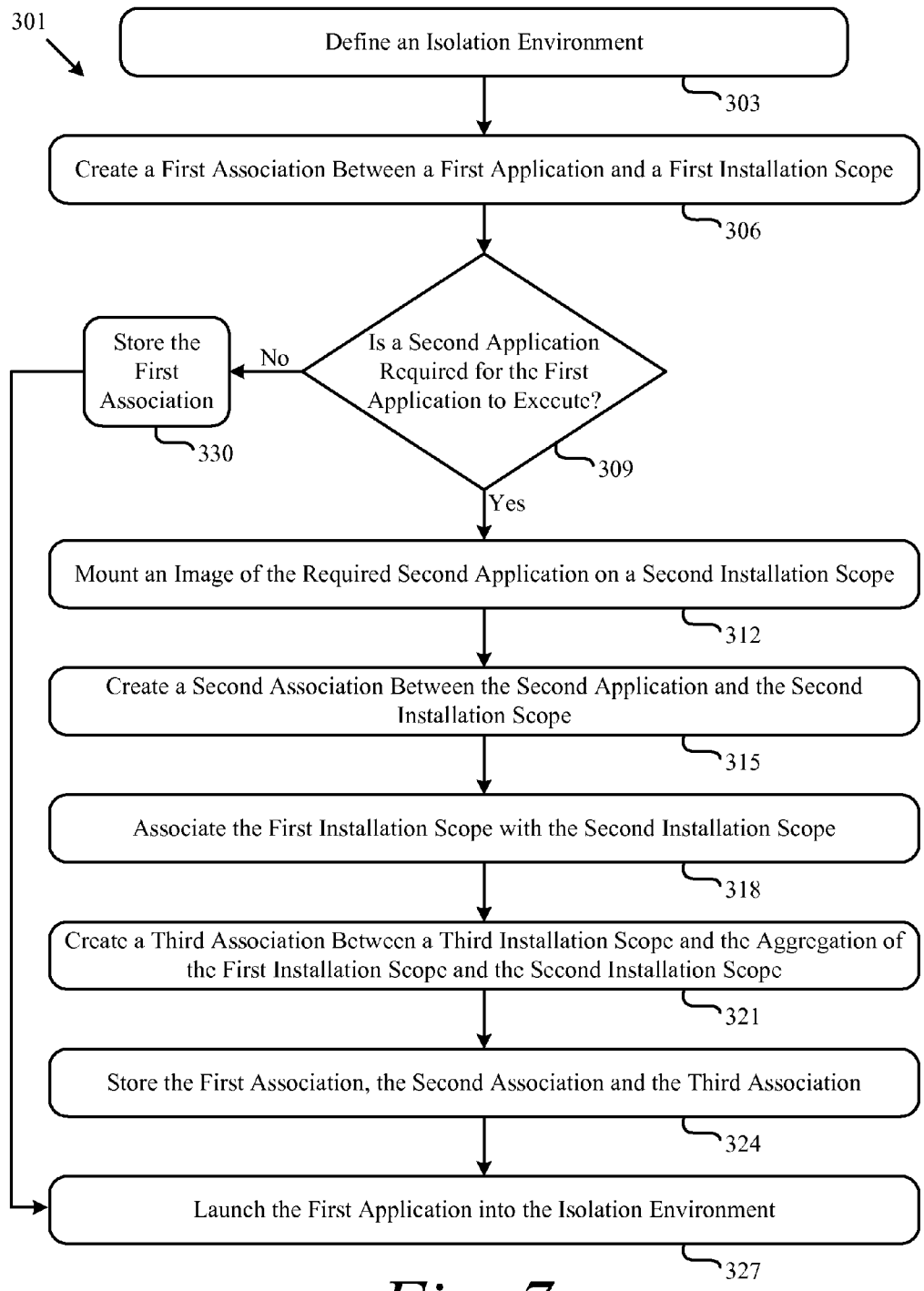
FIG. 7 is a flowchart of an embodiment of a method for installing an application within an installation scope.

Illustrated in FIG. 7 is an embodiment of a method 301 for installing an application into an isolation environment 260. An isolation environment 260 is defined (step 303), and a first association is created between the first application and the first installation scope (step 306). Upon creation of the first association, a determination is made as to whether or not an instance of a second application is required for the first application to execute (step 309). If a determination is made indicating that no additional application instances are needed to install the application within the isolation environment 260, then the first association is stored (step 330), and the first application is launched into the isolation environment 260 (step 327). If a determination is made indicating that additional application instances are needed to install the application within the isolation environment, then an image of the second application is mounted onto a second installation scope (step 312). A second association between the second application and the second installation scope is created (step 315), and an association between the first installation scope and the second installation scope is created (step 318). Between a third installation scope and the aggregation of the first installation scope and the second installation scope, a third association is created (step 321). The first association, the second association, and the third association are then stored within a memory element (step 324).

Further referring to FIG. 7 in more detail, an embodiment of the method 301 includes defining an isolation environment 260 (step 303) within the operating system 210. Other embodiments of the method 301 may define the isolation environment 260 within a separate memory element or application located outside the operation system 210 but included within the computing machine 200. In one embodiment of the method 301, the isolation environment 260 is located on a third computing machine (not illustrated) in communication with the computing machine 200 but installed in a location remote from the location where the computing machine 200 is installed. An isolation environment 260, in some embodiments, is not defined within the operating system 210 but rather the installation root 214 and the user root 212 are included as separate entities on the computing machine 200.

In one embodiment of the method 301, an association is created between the first application and a first installation scope (step 306). The first association, in this embodiment, can be created using an identifier that is common to both the first application and the first installation scope. Another embodiment of the method 301 may create the association by entering an entry into a table, list, or other document for tracking associations created between applications and installation scopes. Still other embodiments of the method 301 includes saving a virtual object onto the computing machine 200 representative of the association created between the first association and the first installation scope.

A determination is made, in one embodiment of the method 301, as to whether or not the first application requires the presence of a second application to properly execute (step 309). Applications can, in some embodiments of the method 301, require the presence of another application in order to properly execute on the computing machine 200. An example of this would be a document management program application that includes resources that reference resources within a second program application such that the document management program application relies on the existence of the resources within a second program application to properly execute. When it is determined that the first application requires a second application to properly execute, the first association is stored in a memory element (step 330), and the first application is launched into the isolation environment 260 (step 327). Other embodiments of the method 301 launch the application into the third installation scope, while still other embodiments launch the application into the user scope.

If a determination is made that an instance of a second application is required for the first application to execute, the in one embodiment of method 301, an image of the required second application is mounted onto a second installation scope (step 312). Other embodiments of the method 301 can mount the application into the first installation scope. Still other embodiments of the method 301 can mount a modified version of the application onto either a second installation scope, or the first installation scope.

Embodiments of the method 301 then create a second association between the second application and the second installation scope (step 315). In this embodiment, a further association is made between the first installation scope and the second installation scope (step 318). In some embodiments of the method 301, the association between the second application and the second installation scope occurs when the second application is mounted onto the second installation scope (step 312). Other embodiments of the method 301 include an association between the first installation scope and the second installation scope that is created in a separate installation scope. Still other embodiments of the method 301 create an association between the first installation scope and the second installation scope by aggregating each scope into a single installation scope; while other embodiments create an association between the first installation scope and the second installation scope by doing any one of the following: creating a virtual object representative of the association between the first installation scope and the second installation scope; generating an entry, representative of the association, into a table, database, file, or other data tracking object; or adding identifiers to either installation scope to indicate that each of the first installation scope and the second installation scope should be associated with each other.

In one embodiment of the method 301, a third association is created between a third installation scope and the aggregation of the first installation scope and the second installation scope (step 321). Other embodiments of the method 301 create a third installation scope that includes the first installation scope and the second installation scope. Still other embodiments include a third installation scope that creates a common association between the third installation scope, the first installation scope, and the second installation scope without aggregating each of the first and second installation scopes.

The first association, second association, and third association are stored (step 324), and the first application is launched into the isolation environment 260 (step 327). In other embodiments of the method 301, each created association is stored in a memory element, where more than three associations may be stored therein. Still other embodiments may include associations that are "stored" in the sense that entries are stored in a table, list, or other data tracking object, where each entry catalogues the associations created.

While the embodiment illustrated in FIG. 7 depicts a method 301 that reviews only a first and second application and a first and second installation scope, other embodiments of the method 301 can review more than two application and more than two installation scopes. Still other embodiments can review an X number of applications and a Y number of installation scopes, where X is representative of a whole number greater than two, and Y is representative of a whole number greater than two that is a different number value than the number value represented by X.

Detailed Virtualization Examples

The methods and apparatus described above may be used to virtualize a wide variety of native resources 258. A number of these are described in detail below.

File System Virtualization

The methods and apparatus described above may be used to virtualize access to a file system. As described above, a file system is commonly organized in a logical hierarchy of directories, which are themselves files and which may contain other directories and data files.

Figure 8:
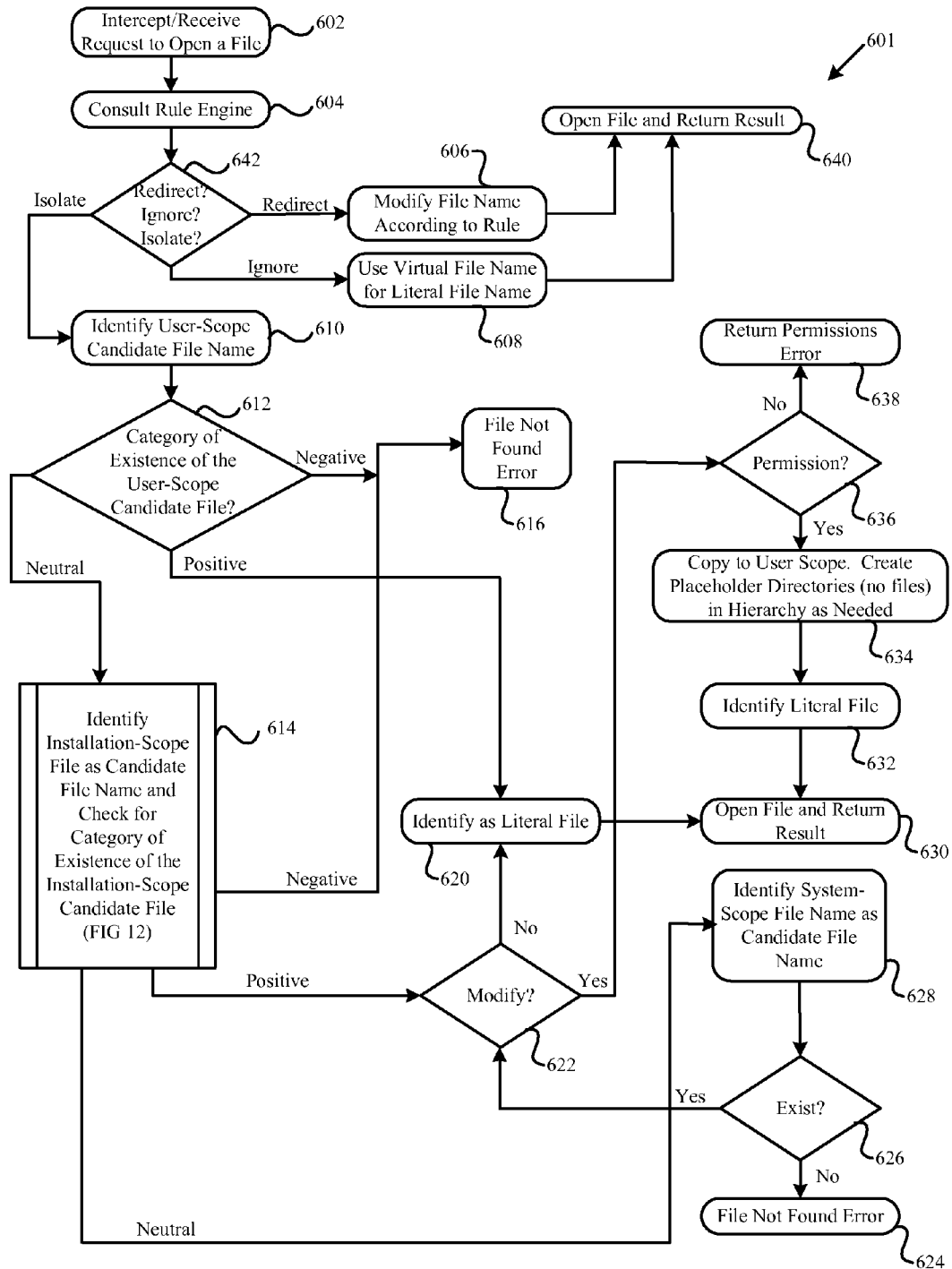
FIG. 8 is a flowchart depicting an embodiment of a method for opening an entry in a file system within the described virtualized environment.

In brief overview, FIG. 8 depicts one embodiment of the steps taken to open a file in the virtualized environment described above. A request to open a file is received or intercepted (step 602). The request contains a file name, which is treated as a virtual file name by the isolation environment 260. The processing rule applicable to the target of the file system open request is determined (step 604). If the rule action is "redirect" (step 642), the virtual file name provided in the request is mapped to a literal file name according to the applicable rule (step 606). A request to open the literal file using the literal file name is passed to the operating system 210 and the result from the operating system 210 is returned to the requestor (step 640). If instead the rule action is "ignore" (step 642), then the literal file name is determined to be exactly the virtual file name (step 608), and the request to open the literal file is passed to the operating system 210 and the result from the operating system 210 is returned to the requestor (step 640). If in step 642 the rule action is "isolate", then the file name corresponding to the virtual file name in the user scope is identified as the candidate file name (step 610). In other words, the candidate file name is formed by mapping the virtual file name to the corresponding native file name specific to the applicable user scope. The category of existence of the candidate file is determined by examining the user scope and any metadata associated with the candidate file (step 612). If the candidate file is determined to have "negative existence", because either the candidate file or one of its ancestor directories in the user scope is marked as deleted, this means the requested virtual file is known to not exist. In this case, an error condition indicating the requested file is not found is returned to the requestor (step 616). If instead in step 612 the candidate file is determined to have "positive existence", then because the candidate file exists in the user scope and the candidate file is not marked as a placeholder node, the requested virtual file is known to exist. The candidate file is identified as the literal file for the request (step 620), and a request issued to open the literal file and the result returned to the requestor (step 630). If, however, in step 612, the candidate file has "neutral existence" because the candidate file does not exist, or the candidate file exists but is marked as a placeholder node, it is not yet known whether the virtual file exists or not. In this case a subroutine is called to retrieve an installation-scope file name corresponding to the virtual file name, identify found installation-scope file names as candidate file names, and categorize the existence of the identified candidate files by examining the installation scopes and any metadata associated with the identified candidate files (step 614). In one embodiment, the subroutine called is an embodiment of the subroutine depicted in FIG. 12. This subroutine searches through the one or more installation scopes included in the isolation environment 260 to determine whether or not the candidate file name exists within the one or more installation scopes. In one embodiment of the subroutine, a value is returned by the subroutine indicating whether or not the candidate file exists within any of the more or more installation scopes. If the value returned from the subroutine indicates that the candidate file has "negative existence", because either the candidate file or one of its ancestor directories in the installation scope is marked as deleted, this means the requested virtual file is known to not exist. In this case, an error condition indicating the requested file is not found is returned to the requestor (step 616). If instead in step 614 the value returned from the subroutine indicates that the candidate file is determined to have "positive existence", because the candidate file exists in at least one of the installation scopes and is not marked as a placeholder node, then the requested virtual file is known to exist. The request is checked to determine if the open request indicates an intention to modify the file (step 622). If not, the candidate file is identified as the literal file for the request (step 620), and a request issued to open the literal file and the result returned to the requestor (step 630). If, however, in step 622, it is determined that the open request indicates intention to modify the file, permission data associated with the file is checked to determine if modification of the file is allowed (step 636). If not, an error condition is returned to the requestor (step 638) indicating that modification of the file is not allowed. If the permission data indicates that the file may be modified, the candidate file is copied to the user scope (step 634). In some embodiments, the candidate file is copied to a location defined by the rules engine. For example, a rule may specify that the file is copied to an installation scope. In other embodiments the rules may specify a particular installation sub-scope or user sub-scope to which the file should be copied. Any ancestors of the requested file that do not appear in the scope to which the file is copied are created as placeholders in the scope in order to correctly locate the copied instance in the hierarchy. The scoped instance is identified as the literal file (step 632) and a request issued to open the literal file and the result returned to the requestor (step 630). Returning to step 614, if the candidate file has neutral existence because the candidate file does not exist, or because the candidate file is found but marked as a placeholder node, it is not yet known whether the virtual file exists or not. In this case, the system-scope file name corresponding to the virtual file name is identified as the candidate file name (step 628). In other words, the candidate file name is exactly the virtual file name. If the candidate file does not exist (step 626), an error condition indicating the virtual file was not found is returned to the requestor (step 624). If on the other hand the candidate file exists (step 626), the request is checked to determine if the open request indicates an intention to modify the file (step 622). If not, the candidate file is identified as the literal file for the request (step 620), and a request issued to open the literal file and the result returned to the requestor (step 630). If, however, in step 622, it is determined that the open request indicates intention to modify the file, permission data associated with the file is checked to determine if modification of the file is allowed (step 636). If not, an error condition is returned to the requestor (step 638) indicating that modification of the file is not allowed. If the permission data indicates that the file may be modified, the candidate file is copied to the user scope (step 634). In some embodiments, the candidate file is copied to a location defined by the rules engine. For example, a rule may specify that the file is copied to an installation scope. In other embodiments the rules may specify a particular installation sub-scope or user sub-scope to which the file should be copied. Any ancestors of the requested file that do not appear in the scope are created as placeholders in the scope to correctly locate the copied instance in the hierarchy. The scoped instance is identified as the literal file (step 632) and a request issued to open the literal file and the result returned to the requestor (step 630).

This embodiment can be trivially modified to perform a check for existence of a file rather than opening a file. The attempt to open the literal file in step 630 is replaced with a check for the existence of that literal file and that status returned to the requestor.

Still referring to FIG. 8 and now in more detail, a request to open a virtual file is received or intercepted (step 602). The corresponding literal file may be of user scope, installation scope or system scope, or it may be scoped to an installation sub-scope or a user sub-scope. In some embodiments, the request is hooked by a function that replaces the operating system 210 function or functions for opening a file. In another embodiment a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system 210 resource that is used in dispatching requests for native files. For embodiments in which a separate operating system 210 function is provided for each type of file operation, each function may be hooked separately. Alternatively, a single hooking function may be provided which intercepts create or open calls for several types of file operations.

The request contains a file name, which is treated as a virtual file name by the isolation environment 260. The processing rule applicable to the file system open request is determined (step 604) by consulting the rules engine. In some embodiments the processing rule applicable to the open request is determined using the virtual name included in the open request. In some embodiments, the rules engine may be provided as a relational database. In other embodiments, the rules engine may be a tree-structured database, a hash table, or a flat file database. In some embodiments, the virtual file name provided for the requested file is used as an index into the rule engine to locate one or more rules that apply to the request. In particular ones of these embodiments, multiple rules may exist in the rules engine for a particular file and, in these embodiments, the rule having the longest prefix match with the virtual file name is the rule applied to the request. In other embodiments, a process identifier is used to locate in the rule engine a rule that applies to the request, if one exists. The rule associated with a request may be to ignore the request, redirect the request, or isolate the request. Although shown in FIG. 6 as a single database transaction or single lookup into a file, the rule lookup may be performed as a series of rule lookups.

If the rule action is "redirect" (step 642), the virtual file name provided in the request is mapped to a literal file name according to the applicable rule (step 606). A request to open the literal file identified by the literal file name is passed to the operating system 210 and the result from the operating system 210 is returned to the requestor (step 640). For example, a request to open a file named "file_1" may result in the opening of a literal file named "Different_file_1". In one embodiment, this is accomplished by calling the original version of the hooked function and passing the formed literal name to the function as an argument. For embodiments using a file system filter driver, the first request to open the file using the virtual name results in the return of a STATUS_REPARSE response from the file system filter driver indicating the determined literal name. The I/O Manager then reissues the file open request with the determined literal name include in the STATUS_REPARSE response.

If instead the rule action is "ignore" (step 642), then the literal file name is determined to be exactly the virtual file name (step 608), and the request to open the literal file is passed to the operating system 210 and the result from the operating system 210 is returned to the requestor (step 640). For example, a request to open a file named "file_1" results in the opening of an actual file named "file_1". In one embodiment, this is accomplished by calling the original version of the hooked function and passing the formed literal name to the function as an argument.

If in step 642 the rule action is "isolate", then the user-scoped file name corresponding to the virtual file name is identified as the candidate file name (step 610). In other words, the candidate file name is formed by mapping the virtual file name to the corresponding native file name specific to the applicable user scope. For example, a request to open a file named "file_1" may result in the opening of an actual file named "Isolated file_1". In one embodiment, this is accomplished by calling the original version of the hooked function and passing the formed literal name to the function as an argument. For embodiments using a file system filter driver, the first request to open the file using the virtual name results in the return of a STATUS_REPARSE response from the file system filter driver indicating the determined literal name. The I/O Manager then reissues the file open request with the determined literal name include in the REPARSE response.

In some embodiments, the literal name formed in order to isolate a requested system file may be based on the virtual file name received and a scope-specific identifier. The scope-specific identifier may be an identifier associated with an installation scope, a user scope, a session scope, an installation sub-scope, a user sub-scope, or some combination of the above. The scope-specific identifier is used to "mangle" the virtual name received in the request.

In other embodiments, the user scope or a sub-scope may be a directory under which all files that exist in the user scope are stored. In some of these embodiments, the directory tree structure under the user directory reflects the path of the requested resource. In other words, the literal file path is formed by mapping the virtual file path to the user scope. For example, if the requested file is c:\temp\test.txt and the user scope directory is d:\user1\app1\, then the path to the user-scope literal file may be d:\user1\app1\c\temp\test.txt. In other embodiments, the path to the user-scope literal may be defined in a native naming convention. For example, the path to the user-scope literal file may be d:\user1\app1\device\harddisk1\temp\test.txt. In still other embodiments, the user-scope files may all be stored in a single directory with names chosen to be unique and a database may be used to store the mapping between the requested file name and the name of the corresponding literal file stored in the directory. In still other embodiments, the contents of the literal files may be stored in a database. In still other embodiments, the native file system provides the facility for a single file to contain multiple independent named "streams", and the contents of the user-scope files are stored as additional streams of the associated files in the system scope. Alternatively, the literal files may be stored in a custom file system that may be designed to optimize disk usage or other criteria of interest.

The category of existence of the candidate file is determined by examining the user scope and any metadata associated with the candidate file (step 612). If the candidate file is determined to have "negative existence", because either the candidate file or one of its ancestor directories in the user scope is marked as deleted, this means the requested virtual file is known to not exist. In this case, an error condition indicating the requested file is not found is returned to the requestor (step 616).

In some embodiments, small amounts of metadata about a file may be stored directly in the literal filename, such as by suffixing the virtual name with a metadata indicator, where a metadata indicator is a string uniquely associated with a particular metadata state. The metadata indicator may indicate or encode one or several bits of metadata. Requests to access the file by virtual filename check for possible variations of the literal filename due to the presence of a metadata indicator, and requests to retrieve the name of the file itself are hooked or intercepted in order to respond with the literal name. In other embodiments, one or more alternate names for the file may be formed from the virtual file name and a metadata indicator, and may be created using hard link or soft link facilities provided by the file system. The existence of these links may be hidden from applications by the isolation environment 260 by indicating that the file is not found if a request is given to access a file using the name of a link. A particular link's presence or absence may indicate one bit of metadata for each metadata indicator, or there may be a link with a metadata indicator that can take on multiple states to indicate several bits of metadata. In still other embodiments, where the file system supports alternate file streams, an alternate file stream may be created to embody metadata, with the size of the stream indicating several bits of metadata. In still other embodiments, a file system may directly provide the ability to store some third-party metadata for each file in the file system.

In specific ones of these embodiments, a list of deleted files or file system elements may be maintained and consulted to optimize this check for deleted files. In these embodiments, if a deleted file is recreated then the file name may be removed from the list of deleted files. In others of these embodiments, a file name may be removed from the list if the list grows beyond a certain size.

If instead the candidate file is determined to have "positive existence", because the candidate file exists in the user scope and is not marked as a placeholder node, then the requested virtual file is known to exist. The candidate file is identified as the literal file for the request (step 620), and a request issued to open the literal file and the result returned to the requestor (step 630).

If, however, the candidate file has a "neutral existence" because the candidate file does not exist, or the candidate file exists but is marked as a placeholder node, it is not yet known whether the virtual file exists or not. In this case a call is made to a subroutine that searches through the one or more installation scopes to retrieve an installation-scope file name and identify the virtual file name as the candidate file name (step 614). In other words, the candidate file name is formed by mapping the virtual file name to the corresponding native file name specific to an installation scope identified as the installation scope within which a corresponding native file name may be found. In one embodiment, once the subroutine identifies a candidate file, the subroutine then can determine the category of existence of the candidate file by examining the installation scope and any metadata associated with the candidate file (step 614). The subroutine, in one embodiment, returns a value indicative of the category of existence of the candidate file (step 614).

If the value returned by the subroutine indicates that the installation-scope candidate file has a "negative existence", and then in one embodiment this "negative existence" is a result of either the candidate file or one of its ancestor directories in the installation scope being marked as deleted, this means the requested virtual file is known to not exist. In this embodiment, an error condition indicating the requested file is not found is returned to the requestor (step 616).

If in step 614 the value returned by the subroutine indicates that the candidate file has a "positive existence," and the candidate file exists in the installation scope and is not marked as a placeholder node, then the requested virtual file is known to exist. The request is checked to determine if the open request indicates an intention to modify the file (step 622). If not, the candidate file is identified as the literal file for the request (step 620), and a request issued to open the literal file and the result returned to the requestor (step 630).

If, however, in step 622, it is determined that the open request indicates intention to modify the file, permission data associated with the file is checked to determine if modification of the file is allowed (step 636). In some embodiments, the permission data is associated with the installation-scope candidate file. In some of these embodiments, the permissions data is stored in a rules engine or in metadata associated with the candidate file. In other embodiments, the permission data associated with the candidate file is provided by the operating system 210. Further, the rules engine may include configuration settings instructing the isolation environment 260 to obey or override the native permission data for virtualized copies of resources. In some embodiments, the rules may specify for some virtual resources the scope in which modifications are to occur, for example the system scope or the installation scope or a sub-scope, or the user scope or a sub-scope. In some embodiments, the rules engine may specify configuration settings that apply to subsets of the virtualized native resources based on hierarchy or on the type of resource accessed. In some of these embodiments, the configuration settings may be specific to each native resource. In another example, the rules engine may include configuration data that prohibits or allows modification of certain classes of files, such as executable code or MIME types or file types as defined by the operating system 210.

If the permission data associated with the candidate file indicates that it may not be modified, an error condition is returned to the requestor (step 638) indicating that modification of the file is not allowed. If the permission data indicates that the file may be modified, the candidate file is copied to the user scope (step 634). In some embodiments, the candidate file is copied to a location defined by the rules engine. For example, a rule may specify that the file is copied to another installation scope. In other embodiments the rules may specify a particular installation sub-scope or user sub-scope to which the file should be copied. Any ancestors of the requested file that do not appear in the scope to which the file is copied are created as placeholders in the scope in order to correctly locate the copied instance in the hierarchy.

In some embodiments, metadata is associated with files copied to the scope that identifies the date and time at which the files were copied. This information may be used to compare the time stamp associated with the copied instance of the file to the time stamp of the last modification of the original instance of the file or of another instance of the file located in a lower isolation scope. In these embodiments, if the original instance of the file, or an instance of the file located in a lower scope, is associated with a time stamp that is later than the time stamp of the copied file, that file may be copied to the scope to update the candidate file. In other embodiments, the copy of the file in the scope may be associated with metadata identifying the scope containing the original file that was copied.

In further embodiments, files that are copied to scopes because they have been opened with intent to modify them may be monitored to determine if they are, in fact, modified. In one embodiment a copied file may be associated with a flag that is set when the file is actually modified. In these embodiments, if a copied file is not actually modified, it may be removed from the scope to which it was copied after it is closed, as well as any placeholder nodes associated with the copied file. The scoped instance is identified as the literal file (step 632) and a request issued to open the literal file and the result returned to the requestor (step 630).

Returning to step 614, if the candidate file has neutral existence because the candidate file does not exist, or if the candidate file is found but marked as a placeholder node, it is not yet known whether the virtual file exists or not. In this case, the system-scope file name corresponding to the virtual file name is identified as the candidate file name (step 628). In other words, the candidate file name is exactly the virtual file name.

If the candidate file does not exist (step 626), an error condition indicating the virtual file was not found is returned to the requestor (step 624). If on the other hand the candidate file exists (step 626), the request is checked to determine if the open request indicates an intention to modify the file (step 622).

As above, if the candidate file is being opened without the intent to modify it, the system-scope candidate file is identified as the literal file for the request (step 620), and a request issued to open the literal file and the result returned to the requestor (step 630). If, however, in step 622, it is determined that the open request indicates intention to modify the file, permission data associated with the file is checked to determine if modification of the file is allowed (step 636). In some embodiments, the permission data is associated with the system-scope candidate file. In some of these embodiments, the permissions data is stored in a rules engine or in metadata associated with the candidate file. In other embodiments, the permission data associated with the candidate file is provided by the operating system 210.

If the permission data associated with the system-scope candidate file indicates that the file may not be modified, an error condition is returned to the requestor (step 638) indicating that modification of the file is not allowed. If, however, the permission data indicates that the file may be modified, the candidate file is copied to the user scope (step 634). In some embodiments, the candidate file is copied to a location defined by the rules engine. For example, a rule may specify that the file is copied to an installation scope or that it may be left in the system scope. In other embodiments the rules may specify a particular installation sub-scope or user isolation sub-scope to which the file should be copied. Any ancestors of the requested file that do not appear in the scope are created as placeholders in the scope in order to correctly locate the copied instance in the hierarchy.

In some embodiments, metadata is associated with files copied to the scope that identifies the date and time at which the files were copied. This information may be used to compare the time stamp associated with the copied instance of the file to the time stamp of the last modification of the original instance of the file. In these embodiments, if the original instance of the file is associated with a time stamp that is later than the time stamp of the copied file, the original file may be copied to the scope to update the candidate file. In other embodiments, the candidate file copied to the scope may be associated with metadata identifying the scope from which the original file was copied.

In further embodiments, files that are copied to scopes because they have been opened with intent to modify them may be monitored to determine if they are, in fact, modified. In one embodiment a copied file may be associated with a flag that is set when the file is actually modified. In these embodiments, if a copied file is not actually modified, when it is closed it may be removed from the scope to which it was copied, as well as any placeholder nodes associated with the copied file. In still further embodiments, the file is only copied to the appropriate scope when the file is actually modified.

The scoped instance is identified as the literal file (step 632) and a request issued to open the literal file and the result returned to the requestor (step 630).

Figure 9:
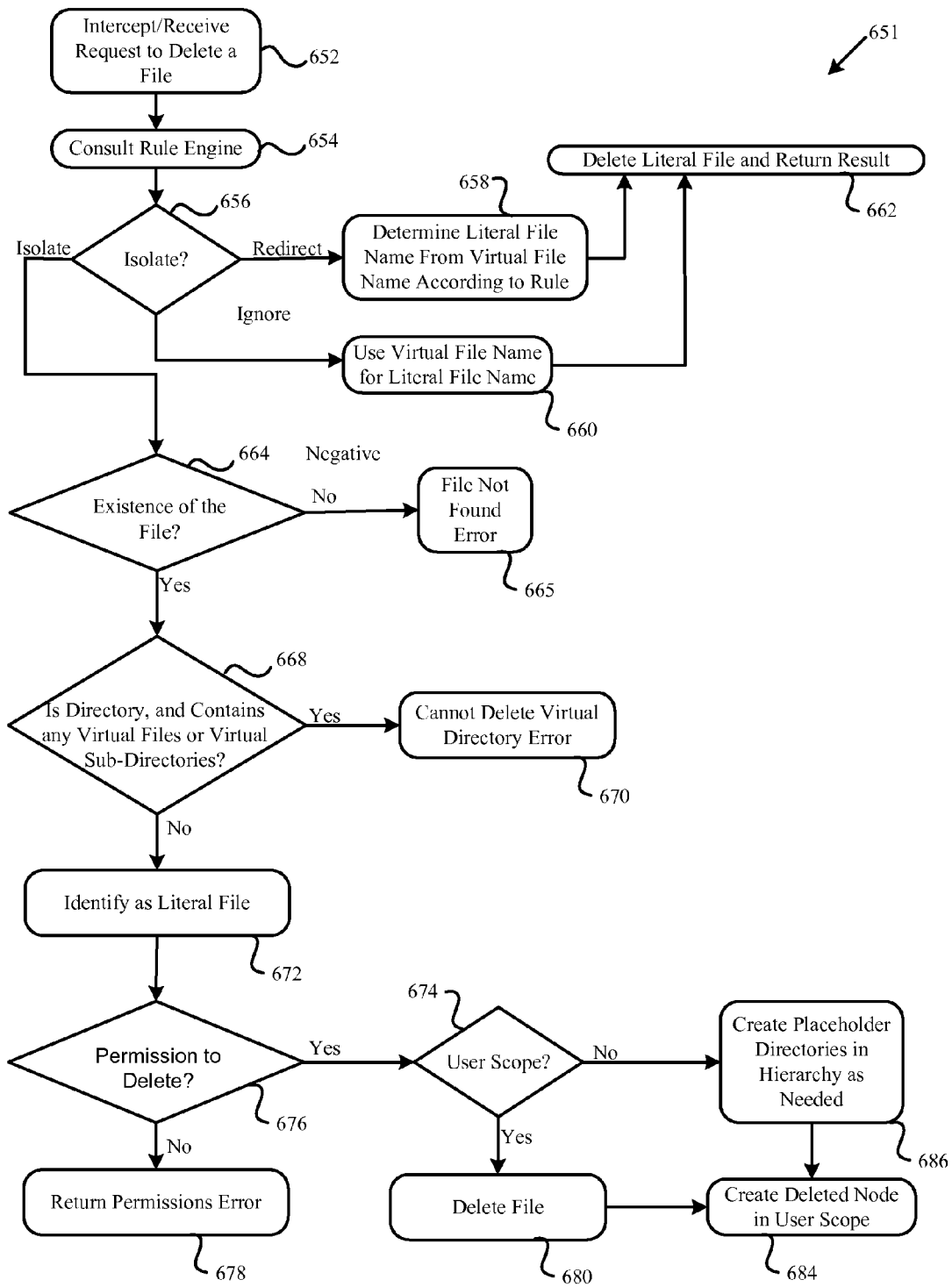
FIG. 9 is a flowchart depicting an embodiment of a method for deleting an entry from a file system within the described virtualized environment.

Referring now to FIG. 9, and in brief overview, one embodiment of the steps taken to delete a file is depicted. A request to delete a file is received or intercepted (step 652). The request contains a file name, which is treated as a virtual file name by the isolation environment 260. A rule determines how the file operation is processed (step 654). If the rule action is "redirect" (step 656), the virtual file name is mapped directly to a literal file name according to the rule (step 658). A request to delete the literal file is passed to the operating system 210 and the result from the operating system 210 is returned to the requestor (step 662). If the rule action is "ignore" (step 656), then the literal file name is identified as exactly the virtual file name (step 660), and a request to delete the literal file is passed to the operating system 210 and the result from the operating system 210 is returned to the requestor (step 662). If the rule action is "isolate" (step 656), then the existence of the virtual file is determined (step 664). If the virtual file does not exist, an error condition is returned to the requestor indicating that the virtual file does not exist (step 665). If the virtual file exists, and if the virtualized file specifies a directory rather than an ordinary file, the virtual directory is consulted to determine if it contains any virtual files or virtual subdirectories (step 668). If the requested virtualized file is a virtual directory that contains any virtual files or virtual subdirectories, the virtual directory cannot be deleted and an error message is returned (step 670). If the requested virtualized file is an ordinary file or is a virtual directory that contains no virtual files and no virtual subdirectories, then the literal file corresponding to the virtual file is identified (step 672). Permission data associated with the file is checked to determine if deletion is allowed (step 676). If not, a permission error message is returned (step 678). If, however, deletion of the file is allowed, and if the literal file is in the appropriate user scope (step 674), the literal file is deleted (step 680) and a "deleted" node representing the deleted virtual file is created in the appropriate user scope (step 684). If, however, in step 674 it is determined that the literal file is not in the user scope but is in the appropriate installation scope or the system scope, then an instance of user-scoped ancestors of the user-scope instance of the requested file that does not already exist is created and marked as a placeholder (step 686). This is done to maintain the logical hierarchy of the directory structure in the user scope. A user-scoped "deleted" node representing the deleted virtual file is then created in the appropriate user scope (step 684).

Still referring to FIG. 9, and in more detail, a request to delete a file is received or intercepted (step 652). The file may be of user scope, installation scope, system scope, or some applicable sub-scope. In some embodiments, the request is hooked by a function that replaces the operating system 210 function or functions for deleting the file. In another embodiment a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system 210 resource that is used in dispatching requests for native files. For embodiments in which a separate operating system 210 function is provided for each type of file, each function may be hooked separately. Alternatively, a single hooking function may be provided which intercepts create or open calls for several types of files.

The request contains a file name, which is treated as a virtual file name by the isolation environment 260. A processing rule applicable to the delete operation is determined (step 654) by consulting the rules engine. In some embodiments, the virtual file name provided for the requested file is used to locate in the rule engine a rule that applies to the request. In particular ones of these embodiments, multiple rules may exist in the rules engine for a particular file and, in these embodiments, the rule having the longest prefix match with the virtual file name is the rule applied to the request. In some embodiments, the rules engine may be provided as a relational database. In other embodiments, the rules engine may be a tree-structured database, a hash table, or a flat file database. In some embodiments, the virtual file name provided in the request is used as an index into a rules engine to locate one or more rules that apply to the request. In other embodiments, a process identifier is used to locate in the rule engine a rule that applies to the request, if one exists. The rule associated with a request may be to ignore the request, redirect the request, or isolate the request. Although shown in FIG. 9 as a series of decisions, the rule lookup may occur as a single database transaction.

If the rule action is "redirect" (step 656), the virtual file name is mapped directly to a literal file name according to the applicable rule (step 658). A request to delete the literal file is passed to the operating system 210 and the result from the operating system 210 is returned to the requestor (step 662). For example, a request to delete a file named "file_1" may result in the deletion of an actual file named "Different_file_1". In one embodiment, this is accomplished by calling the original version of the hooked function and passing the formed literal name to the function as an argument. For embodiments using a file system filter driver, the first request to delete the file using the virtual name results in the return of a STATUS_REPARSE response from the file system filter driver indicating the determined literal name. The I/O Manager then reissues the file delete request with the determined literal name include in the STATUS_REPARSE response.

In some embodiments, operating system 210 permissions associated with the literal file "Different_file_1" may prevent deletion of the literal file. In these embodiments, an error message is returned that the file could not be deleted.

If the rule action is "ignore" (step 656), then the literal file name is identified as exactly the virtual file name (step 660), and a request to delete the literal file is passed to the operating system 210 and the result from the operating system 210 is returned to the requestor (step 662). For example, a request to delete a file named "file_1" results in the deletion of an actual file named "file_1". In one embodiment, this is accomplished by calling the original version of the hooked function and passing the formed literal name to the function as an argument. For embodiments using a file system filter driver, the first request to delete the file using the virtual name results in the return of a STATUS_REPARSE response from the file system filter driver indicating the literal name. The I/O Manager then reissues the file delete request with the determined literal name include in the STATUS_REPARSE response.

In some embodiments, operating system 210 permissions associated with the literal file "file_1" may prevent deletion of the literal file. In these embodiments, an error message is returned that the file could not be deleted. If the rule action is "isolate" (step 656), then the existence of the virtual file is determined (step 664). If the file does not exist, an error is returned indicating that the file is not found (step 665). If, however, in step 668 it is determined that the file exists but that it is not an ordinary file and is not an empty virtual directory, i.e., it contains virtual files or virtual subdirectories, an error message is returned indicating that the file may not be deleted (step 670).

If, however, the file is determined to exist and the requested virtualized file is an ordinary file or is an empty virtual directory, i.e., it contains no virtual files and no virtual subdirectories (step 668), then the literal file corresponding to the virtual file is identified (step 672). The literal file name is determined from the virtual file name as specified by the isolation rule. For example, a request to delete a file named "file_1" may result in the deletion of an actual file named "Isolated_file_1". In one embodiment, this is accomplished by calling the original version of the hooked function and passing the formed literal name to the function as an argument. For embodiments using a file system filter driver, the first request to delete the file using the virtual name results in the return of a STATUS_REPARSE response from the file system filter driver indicating the literal name. The I/O Manager then reissues the file delete request with the determined literal name include in the STATUS_REPARSE response.

Once the literal file corresponding to the virtual file is identified, it is determined whether the literal file may be deleted (step 676). If the file may not be deleted, an error is returned indicating that the file could not be deleted (step 676). In some embodiments, the permission data is associated with the system-scope candidate file. In some of these embodiments, the permissions data is stored in a rules engine or in metadata associated with the candidate file. In other embodiments, the permission data associated with the candidate file is provided by the operating system 210. If, however, deletion of the file is allowed, and if the literal file is in the appropriate user scope (step 674), the literal file is deleted (step 680) and a "deleted" node representing the deleted virtual file is created in the appropriate user scope (step 684). If, however, in step 674 it is determined that the literal file is not in the user scope but is in the appropriate installation scope or the system scope, then an instance of user-scope ancestors of the user-scope instance of the requested file that does not already exist is created and marked as a placeholder (step 686). This is done to maintain the logical hierarchy of the directory structure in the user scope. A user-scope "deleted" node representing the deleted virtual file is then created in the appropriate user scope (step 684). In some embodiments, the identity of the deleted file is stored in a file or other cache memory to optimize checks for deleted files.

In some embodiments, the located virtualized file may be associated with metadata indicating that the virtualized file has already been deleted. In some other embodiments, an ancestor of the virtualized file (e.g., a higher directory containing the file) is associated with metadata indicating that it is deleted. In these embodiments, an error message may be returned indicating that the virtualized file does not exist. In specific ones of these embodiments, a list of deleted files or file system elements may be maintained and consulted to optimize this check for deleted files.

Figure 10:
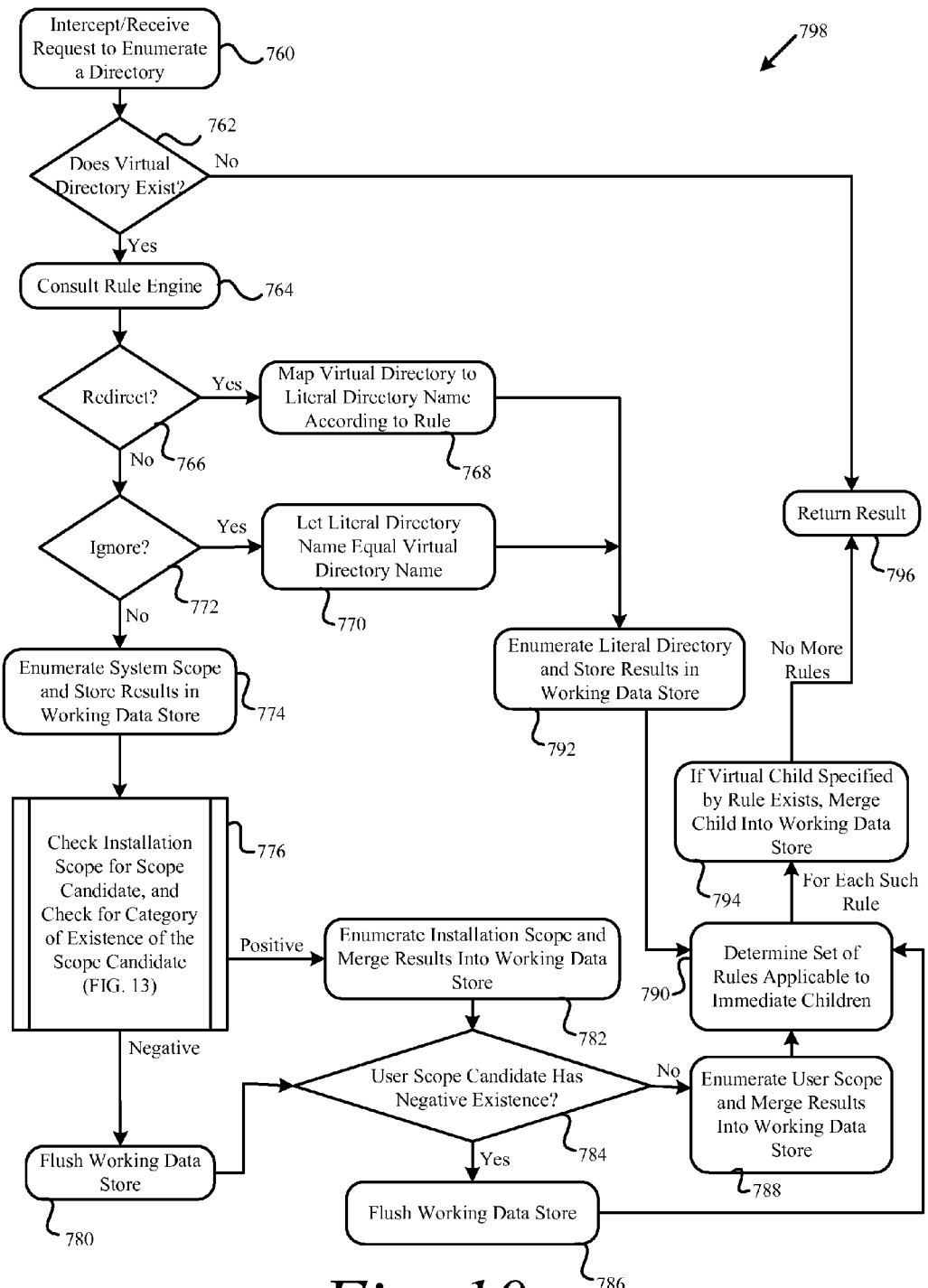
FIG. 10 is a flowchart depicting an embodiment of a method for enumerating entries in a file system within the described virtualized environment.

Referring now to FIG. 10, and in brief overview, one embodiment of the steps taken to enumerate a directory in the described virtualized environment is shown. A request to enumerate is received or intercepted (step 760). The request contains a directory name that is treated as a virtual directory name by the isolation environment 260. Conceptually, the virtual directory's existence is determined as described above (step 762). If the virtual directory does not exist, a result indicating that the virtual directory is not found is returned to the requestor (step 796). If instead the virtual directory exists, the rules engine is consulted to determine the rule for the directory specified in the enumerate request (step 764). If the rule specifies an action of "redirect" (step 766), the literal directory name corresponding to the virtual directory name is determined as specified by the rule (step 768) and the literal directory identified by the literal name is enumerated, and the enumeration results stored in a working data store (step 792), followed by step 790 as described later. If the rule action specified is not "redirect" and is "ignore," (step 772) the literal directory name is exactly the virtual directory name (step 770) and the literal directory is enumerated, and the enumeration results stored in a working data store (step 792), followed by step 790 as described later. If, however, the rule action specifies "isolate," firstly the system scope is enumerated; that is, the candidate directory name is exactly the virtual directory name, and if the candidate directory exists it is enumerated. The enumeration results are stored in a working data store. If the candidate directory does not exist, the working data store remains empty at this stage (step 774). Next, a subroutine executes to identify a scope candidate in the installation scopes (step 776). A candidate is returned by the subroutine (step 776), and the candidate directory is identified as the installation-scope instance of the virtual directory, and the category of existence of the candidate directory is determined (step 778). If the candidate directory has "negative existence", i.e. it or one of its ancestors in the scope is marked as deleted, then within this scope it is known to be deleted, and this is indicated by flushing the working data store (step 780). If instead the candidate directory does not have negative existence, the candidate directory is enumerated and any enumeration results obtained are merged into the working data store. In particular, for each file system element in the enumeration, its category of existence is determined. Elements with negative existence are removed from the working data store and elements with positive existence, i.e. those that exist and are not marked as placeholders and are not marked as deleted, are added to the working data store, replacing the corresponding element if one is already present in the working data store (step 782).

In either case, the candidate directory is identified as the user-scope instance of the virtual directory, and the category of existence of the candidate directory is determined (step 784). If the candidate directory has "negative existence", i.e. it or one of its ancestors in the scope is marked as deleted, then within this scope it is known to be deleted, and this is indicated by flushing the working data store (step 786). If instead the candidate directory does not have negative existence, the candidate directory is enumerated and any enumeration results obtained are merged into the working data store. In particular, for each file system element in the enumeration, its category of existence is determined. Elements with negative existence are removed from the working data store, and elements with positive existence, i.e. those that exist and are not marked as placeholders and are not marked as deleted, are added to the working data store, replacing the corresponding element if one is already present in the working data store (step 788), followed by step 790 as described below.

Then, for all three types of rules, step 790 is executed. The rules engine is queried to find the set of rules whose filters match immediate children of the requested directory, but do not match the requested directory itself (step 790). For each rule in the set, the existence of the virtual child whose name matches the name in the rule is queried using the logic outlined above. If the child has positive existence, it is added to the working data store, replacing any child of the same name already there. If the child has negative existence, the entry in the working data store corresponding to the child, if any, is removed. (Step 794). Finally, the constructed enumeration is then returned from the working data store to the requestor (step 796).

Still referring to FIG. 10, and in more detail, a request to enumerate a directory is received or intercepted (step 760). In some embodiments, the request is hooked by a function that replaces the operating system function or functions for enumerating a directory. In another embodiment, a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system 210 resource that is used in dispatching requests for file operations. For embodiments in which a separate operating system 210 function is provided for each type of file operation, each function may be hooked separately. Alternatively, a single hooking function may be provided which intercepts create or open calls for several types of file operations.

The existence of the virtual directory is determined (step 762). This is achieved as described above. If the virtual directory does not exist, it cannot be enumerated, and a result indicating that the virtual directory does not exist is returned to the requestor (step 796).

The request contains a directory name, which is treated as a virtual directory name by the isolation environment 260. If the virtual directory exists, then a rule determining how the enumeration operation is to be processed is located (step 764) by consulting the rules engine. In some embodiments, the rules engine may be provided as a relational database. In other embodiments, the rules engine may be a tree-structured database, a hash table, or a flat file database. In some embodiments, the virtual directory name provided for the requested directory is used to locate in the rule engine a rule that applies to the request. In particular ones of these embodiments, multiple rules may exist in the rules engine for a particular directory and, in these embodiments, the rule having the longest prefix match with the virtual directory name is the rule applied to the request. In other embodiments, a process identifier is used to locate in the rule engine a rule that applies to the request, if one exists. The rule associated with a request may be to ignore the request, redirect the request, or isolate the request. Although shown in FIG. 10 as a single database transaction or single lookup into a file, the rule lookup may be performed as a series of rule lookups.

If the rule action is "redirect" (step 766) the virtual directory name is mapped directly to a literal directory name according to the rule (step 768). A request to enumerate the literal directory is passed to the operating system 210 (step 792) and step 790 is executed as described later. For example, a request to enumerate a directory named "directory_1" may result in the enumeration of a literal directory named "Different_directory_1". In one embodiment, this is accomplished by calling the original version of the hooked function and passing the formed literal name to the function as an argument. For embodiments using a file system filter driver, the first request to open the directory for enumeration using the virtual name results in a "STATUS_REPARSE" request response indicating the determined literal name. The I/O Manager then reissues the directory open request for enumeration with the determined literal name include in the STATUS_REPARSE response.

If the rule action is not "redirect" (step 766), but is "ignore" (step 772), then the literal directory name is identified as exactly the virtual directory name (step 770), and a request to enumerate the literal directory is passed to the operating system 210 (step 792) and step 790 is executed as described later. For example, a request to enumerate a directory named "directory_1" results in the enumeration of an actual directory named "directory_1." In one embodiment, this is accomplished by calling the original version of the hooked function and passing the formed literal name to the function as an argument. For embodiments using a file system filter driver, the first request to enumerate the directory using the virtual name is passed on unmodified by the filter driver.

If the rule action determined in step 772 is not "ignore" but is "isolate", then the system scope is enumerated, that is, the virtual name provided in the request is used to identify the enumerated directory (step 774). The results of the enumeration are stored in a working data store. In some embodiments, the working data store is comprised of a memory element. In other embodiments, the working data store comprises a database or a file or a solid-state memory element or a persistent data store.

Next, a sub-routine is called to check the installation scopes to identify and return a candidate directory (step 776). The existence of the candidate director is then determined (step 778). If the candidate directory has "negative existence", i.e. it or one of its ancestors in the scope is marked as deleted, then within this scope it is known to be deleted, and this is indicated by flushing the working data store (step 780).

In some embodiments, small amounts of metadata about a file may be stored directly in the literal filename, such as by suffixing the virtual name with a metadata indicator, where a metadata indicator is a string uniquely associated with a particular metadata state. The metadata indicator may indicate or encode one or several bits of metadata. Requests to access the file by virtual filename check for possible variations of the literal filename due to the presence of a metadata indicator, and requests to retrieve the name of the file itself are hooked or intercepted in order to respond with the literal name. In other embodiments, one or more alternate names for the file may be formed from the virtual file name and a metadata indicator, and may be created using hard link or soft link facilities provided by the file system. The existence of these links may be hidden from applications by the isolation environment by indicating that the file is not found if a request is given to access a file using the name of a link. A particular link's presence or absence may indicate one bit of metadata for each metadata indicator, or there may be a link with a metadata indicator that can take on multiple states to indicate several bits of metadata. In still other embodiments, where the file system supports alternate file streams, an alternate file stream may be created to embody metadata, with the size of the stream indicating several bits of metadata. In still other embodiments, a file system may directly provide the ability to store some 3rd party metadata for each file in the file system. In yet other embodiment, a separate sub-scope may be used to record deleted files and existence of a file (not marked as a placeholder) in that sub-scope is taken to mean that the file is deleted.

If instead the installation scope candidate directory does not have negative existence, the candidate directory is enumerated and any enumeration results obtained are merged into the working data store. In particular, for each file system element in the enumeration, its category of existence is determined. Elements with negative existence are removed from the working data store and elements with positive existence, i.e. those that exist and are not marked as placeholders and are not marked as deleted, are added to the working data store, replacing the corresponding element if one is already present in the working data store (step 782).

In either case, the candidate directory is identified as the user-scope instance of the virtual directory, and the category of existence of the candidate directory is determined (step 784). If the candidate directory has "negative existence", i.e. it or one of its ancestors in the scope is marked as deleted, then within this scope it is known to be deleted, and this is indicated by flushing the working data store (step 786). If instead the candidate directory does not have negative existence, the candidate directory is enumerated and any enumeration results obtained are merged into the working data store. In particular, for each file system element in the enumeration, its category of existence is determined. Elements with negative existence are removed from the working data store, and elements with positive existence, i.e. those that exist and are not marked as placeholders and are not marked as deleted, are added to the working data store, replacing the corresponding element if one is already present in the working data store (step 788), followed by step 790 as described below.

Then, for all three types of rules, step 790 is executed. The rules engine is queried to find the set of rules whose filters match immediate children of the requested directory, but do not match the requested directory itself (step 790). For each rule in the set, the existence of the virtual child whose name matches the name in the rule is queried using the logic outlined above. If the child has positive existence, it is added to the working data store, replacing any child of the same name already there. If the child has negative existence, the entry in the working data store corresponding to the child, if any, is removed. (Step 794). Finally, the constructed enumeration is then returned from the working data store to the requestor (step 796).

A practitioner of ordinary skill in the art realizes that the layered enumeration process described above can be applied with minor modification to the operation of enumerating a single scope that includes a plurality of sub-scopes. A working data store is created, successive sub-scopes are enumerated and the results are merged into the working data store to form the aggregated enumeration of the scope.

Figure 11:
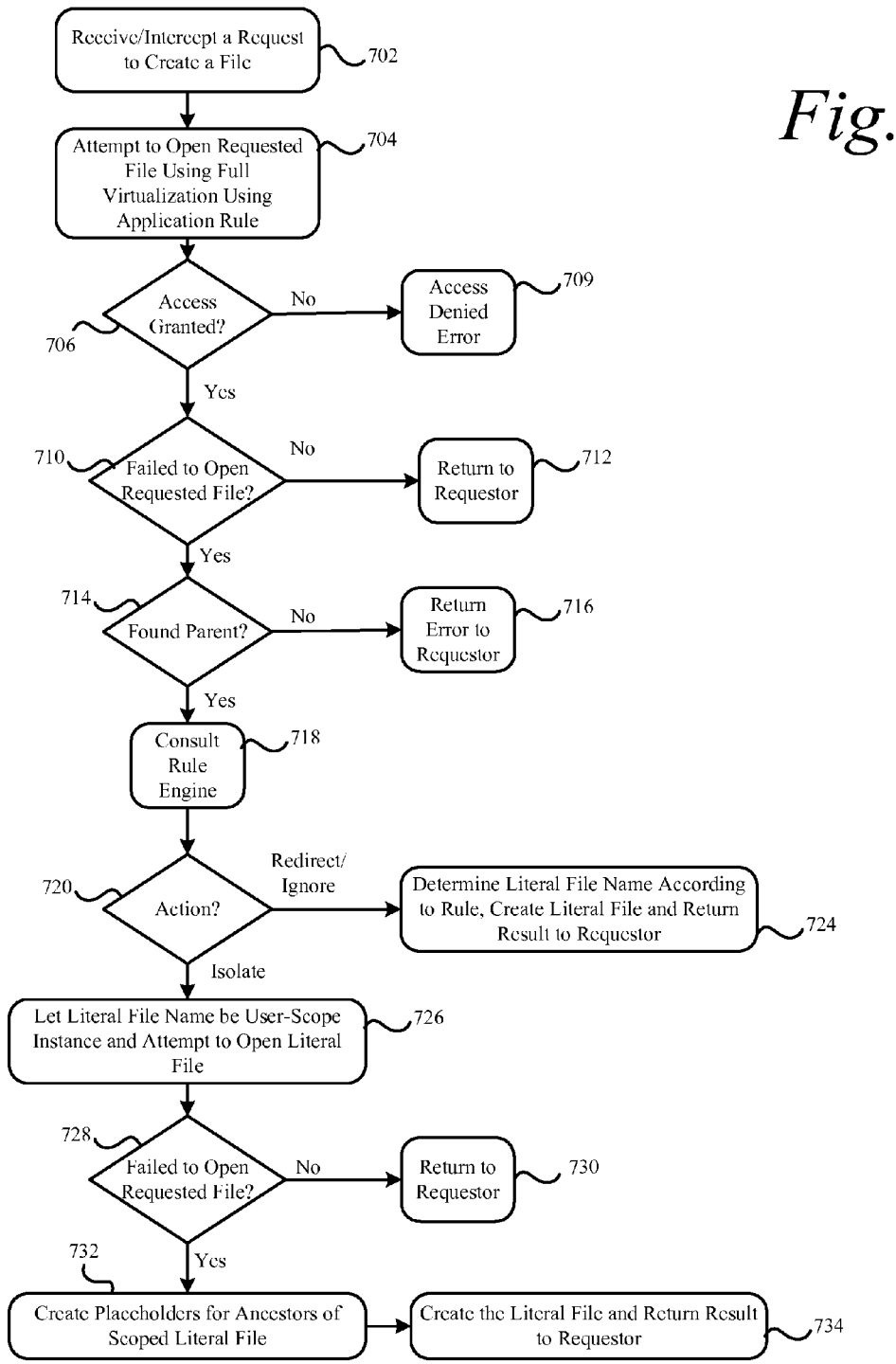
FIG. 11 is a flowchart depicting an embodiment of a method for creating an entry in a file system within the described virtualized environment.

Referring now to FIG. 11, and in brief overview, one embodiment of the steps taken to create a file in the isolation environment 260 is shown. A request to create a file is received or intercepted (step 702). The request contains a file name, which is treated as a virtual file name by the isolation environment 260. An attempt is made to open the requested file using full virtualization using applicable rules, i.e. using appropriate user and installation scope, as described above (step 704). If access is denied (step 706), an access denied error is returned to the requestor (step 709). If access is granted (step 706), and the requested file is successfully opened (step 710), the requested file is returned to the requestor (step 712). However, if access is granted (step 706), but the requested file is not opened successfully (step 710) then if the parent of the requested file also does not exist (step 714), an error appropriate to the request semantics is issued to the requestor (step 716). If on the other hand, the parent of the requested file is found in full virtualized view using the appropriate user and installation scope (step 714), a rule then determines how the file operation is processed (step 718). If the rule action is "redirect" or "ignore" (step 720), the virtual file name is mapped directly to a literal file name according to the rule. Specifically, if the rule action is "ignore", the literal file name is identified as exactly the virtual file name. If, instead, the rule action is "redirect", the literal file name is determined from the virtual file name as specified by the rule. Then a request to create the literal file is passed to the operating system 210, and the result is returned to the requestor (step 724). If on the other hand, the rule action determined in step 720 is "isolate", then the literal file name is identified as the instance of the virtual file name in the user scope. If the literal file already exists, but is associated with metadata indicating that it is a placeholder or that it is deleted, then the associated metadata is modified to remove those indications, and it is ensured that the file is empty. In either case, a request to open the literal file is passed to the operating system 210 (step 726). If the literal file was opened successfully (step 728), the literal file is returned to the requestor (step 730). If on the other hand, in step 728, the requested file fails to open, placeholders for each ancestor of the literal file that does not currently exist in the user scope (step 732) and a request to create the literal file using the literal name is passed to the operating system 210 and the result is returned to the requestor (step 734).

Still referring to FIG. 11, and in more detail, a request to create a file is received or intercepted (step 702). In some embodiments, the request is hooked by a function that replaces the operating system 210 function or functions for creating the file. In another embodiment, a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system 210 resource that is used in dispatching requests for files. For embodiments in which a separate operating system 210 function is provided for each type of file operation, each function may be hooked separately. Alternatively, a single hooking function may be provided which intercepts create or open calls for several types of file operations.

The request contains a file name, which is treated as a virtual file name by the isolation environment 260. The requestor attempts to open the requested file using full virtualization using applicable rules, i.e. using appropriate user and installation scope, as described above (step 704). If access is denied during the full virtualized open operation (step 706), an access denied error is returned to the requestor (step 709). If access is granted (step 706), and the requested virtual file is successfully opened (step 710), the corresponding literal file is returned to the requestor (step 712). However, if access is granted (step 706), but the requested file is not opened successfully (step 710) then the virtual file has been determined not to exist. If the virtual parent of the requested virtual file also does not exist, as determined by the procedures described above (step 714), an error appropriate to the request semantics is issued to the requestor (step 716). If on the other hand, the virtual parent of the requested virtual file is found in full virtualized view using the appropriate user and installation scope (step 714), then a rule that determines how the create operation is processed is located (step 718) by consulting the rules engine. In some embodiments, the rules engine may be provided as a relational database. In other embodiments, the rules engine may be a tree-structured database, a hash table, or a flat file database. In some embodiments, the virtual file name provided for the requested file is used to locate in the rule engine a rule that applies to the request. In particular ones of these embodiments, multiple rules may exist in the rules engine for a particular file and, in some of these embodiments, the rule having the longest prefix match with the virtual file name is the rule applied to the request. In some embodiments, a process identifier is used to locate in the rule engine a rule that applies to the request, if one exists. The rule associated with a request may be to ignore the request, redirect the request, or isolate the request. Although shown in FIG. 11 as a single database transaction or single lookup into a file, the rule lookup may be performed as a series of rule lookups.

If the rule action is "redirect" or "ignore" (step 720), the virtual file name is mapped directly to a literal file name according to the rule (step 724). If the rule action is "redirect" (step 720), the literal file name is determined from the virtual file name as specified by the rule (step 724). If the rule action is "ignore" (step 720), the literal file name is determined to be exactly the virtual file name (step 724). If the rule action is "ignore" or the rule action is "redirect", a request to create the literal file using the determined literal file name is passed to the operating system 210 and the result from the operating system 210 is returned to the requestor (step 724). For example, a request to create a virtual file named "file_1" may result in the creation of a literal file named "Different_file_1." In one embodiment, this is accomplished by calling the original version of the hooked function and passing the formed literal name to the function as an argument (step 724). For embodiments using a file system filter driver, the first request to open the file using the virtual name results in a "STATUS_REPARSE" request response that indicates the determined literal name. The I/O Manager then reissues the file open request with the determined literal name include in the STATUS_REPARSE response.

If the rule action determined in step 720 is not "ignore" or "redirect" but is "isolate," then the literal file name is identified as the instance of the virtual file name in the user scope. If the literal file already exists, but is associated with metadata indicating that it is a placeholder or that it is deleted, then the associated metadata is modified to remove those indications, and it is ensured that the file is empty.

In some embodiments, small amounts of metadata about a file may be stored directly in the literal filename, such as by suffixing the virtual name with a metadata indicator, where a metadata indicator is a string uniquely associated with a particular metadata state. The metadata indicator may indicate or encode one or several bits of metadata. Requests to access the file by virtual filename check for possible variations of the literal filename due to the presence of a metadata indicator, and requests to retrieve the name of the file itself are hooked or intercepted in order to respond with the literal name. In other embodiments, one or more alternate names for the file may be formed from the virtual file name and a metadata indicator, and may be created using hard link or soft link facilities provided by the file system. The existence of these links may be hidden from applications by the isolation environment 260 by indicating that the file is not found if a request is given to access a file using the name of a link. A particular link's presence or absence may indicate one bit of metadata for each metadata indicator, or there may be a link with a metadata indicator that can take on multiple states to indicate several bits of metadata. In still other embodiments, where the file system supports alternate file streams, an alternate file stream may be created to embody metadata, with the size of the stream indicating several bits of metadata. In still other embodiments, a file system may directly provide the ability to store some third party metadata for each file in the file system.

In specific ones of these embodiments, a list of deleted files or file system elements may be maintained and consulted to optimize this check for deleted files. In these embodiments, if a deleted file is recreated then the file name may be removed from the list of deleted files. In others of these embodiments, a file name may be removed from the list if the list grows beyond a certain size.

In either case, a request to open the user-scope literal file is passed to the operating system 210 (step 726). In some embodiments, rules may specify that the literal file corresponding to the virtual file should be created in a scope other than the user scope, such as the installation scope, the system scope, a user sub-scope or an installation sub-scope.

If the literal file was opened successfully (step 728), the literal file is returned to the requestor (step 730). If on the other hand, in step 728, the requested file fails to open, placeholders are created for each ancestor of the literal file that does not currently exist in the user scope (step 732) and a request to create the literal file using the literal name is passed to the operating system 210 and the result is returned to the requestor (step 734). This embodiment is for operating systems 210 with APIs or facilities that only support creation of one level per call invocation. Extension to multi-levels per call invocation should be obvious to one skilled in the art.

In some file systems, both short and long filenames may be given to each file. Either name may be used to access the file in any of the file operations described above. For each file that possesses both a short and long filename, this implicitly creates an association between the short and long filename assigned to that file. In some of these file systems, short names are automatically assigned by the file system to files that are created using long file names. If the association between short and long filename is not maintained by the isolation environment 260, files with different long names in the same directory but in different scope levels may have the same short file name, leading to ambiguity if the short name is used to access a virtual file. Alternately, the short file name may change when a file is copied to a user scope for modification meaning the virtual file can no longer be accessed using the original short name.

In order to prevent these issues, firstly file system operations that copy file instances opened with intention to modify to a "higher" scope preserve the association between the short and long filenames associated with the copied instance. Secondly, unique short names are created for newly-created isolated files in lieu of the filenames assigned by the operating system. The generated short filenames should satisfy the condition that the generated filenames do not match any existing short filenames in the same directory in the same scope or in the same directory in a "lower" scope. For example, a short filename generated for an instance of a file located in a user scope should not match existing short filenames in installation-scope instance of the directory or in the system-scope instance of the directory.

Figure 11A:
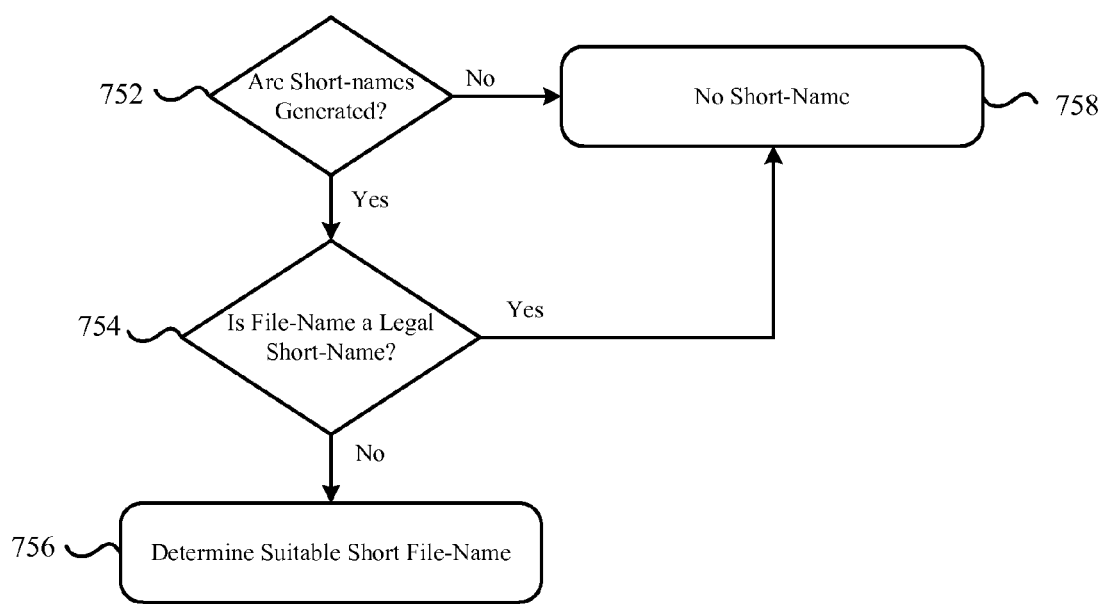
FIG. 11A is a flowchart depicting an embodiment of a method for creating a file entry in the file system within the described virtualized environment.

Referring now to FIG. 11A, one embodiment of the steps taken to assign unique short filenames after creating a new file is shown. In brief overview, a check is made to determine if short filenames should be generated (step 752). If not, a status is returned indicating that no short filename is generated (step 758). Otherwise, the filename is checked to determine if it is already a legal short filename according to the file system (step 754). If it is already a legal short filename, a status is returned indicating that no short name is generated (step 756). Otherwise, a suitable short filename is constructed (step 756).

Still referring to FIG. 11A, and in greater detail, a check is made to determine if short filenames should be generated (step 752). In some embodiments, this decision may be made based on the device storing the file to which the filename refers. In other embodiments, generation of short filenames may be enabled for certain scopes or sub-scopes, or for the isolation environment 260 as a whole. In some of these embodiments, a registry setting may specify whether a short filename is generated for a particular filename. If no short filename should be generated, a status that no short filename is generated is returned (step 758).

Otherwise, the filename is checked to determine if it is already a legal short filename (step 754). In some embodiments, legal short filenames contain up to eight characters in the filename and up to three characters in an optional extension. In some embodiments, legal short names contain only legal characters, such as A-Z, a-z, 0-9, ', ~, !, @, #, $, %, ^, &, *, (,), -, _, ', {, and }. In some embodiments a leading space or "." or more than one embedded "." is illegal. If the provided filename is already a legal short filename, a status is returned that no short filename is generated (step 758).

Otherwise, if it is determined in step 754 that the filename is an illegal short filename, a suitable short filename is constructed (step 756). In some embodiments this is achieved by using some of the parts of the long filename that are legal to use in a short filename, combined with an encoded iteration count to form a candidate short filename. The iteration count is increased until the associated candidate short filename is suitable, that is it is a legal short filename that is not used by any other file in the same directory in the same scope, or in the same directory in a lower scope. In other embodiments, the long filename is mangled or hashed and encoded, and is combined with an encoded iteration count to form a candidate short filename. The iteration count is increased until the associated candidate short filename is suitable, that is it is a legal short filename that is not used by any other file in the same directory in the same scope, or in the same directory in a lower scope. In all of these embodiments a scope-specific string may be incorporated into the candidate short filename to increase the likelihood that a suitable candidate short filename is found with a low iteration count.

Figure 12:
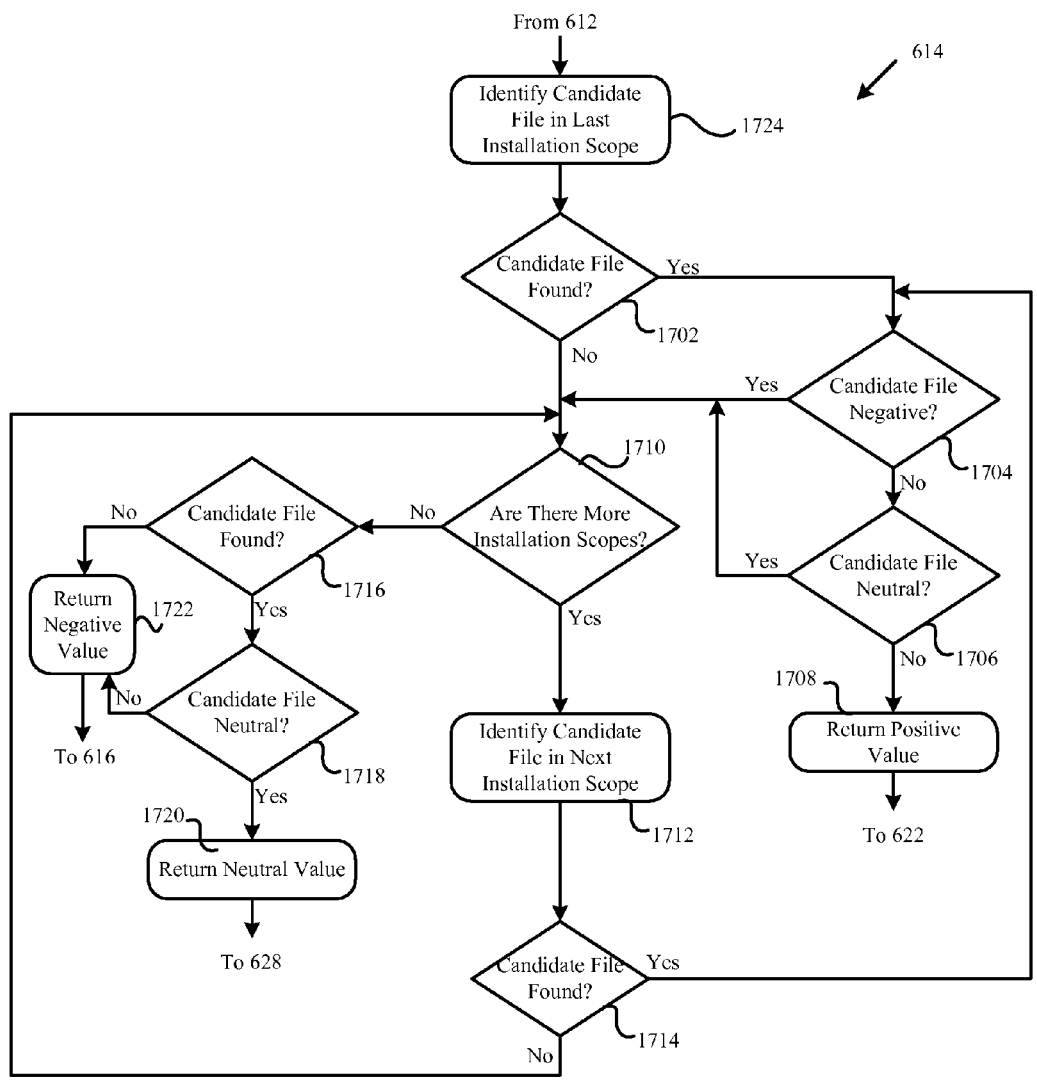
FIG. 12 is a flowchart depicting an embodiment of a method for cycling through more than one installation scope.

Illustrated in FIG. 12 is one embodiment of the subroutine 614 called in the process illustrated in FIG. 8. This subroutine is a method, executed within the method 601 depicted in FIG. 8, to cycle through the one or more installation scopes included in the isolation environment 260. When the existence of a user-scope candidate file is determined in step 612 of the method 601 in FIG. 8 to have a neutral existence, the subroutine 614 is called and a candidate file is identified in the first installation scope (step 1724). It is then determined whether or not a candidate file was in fact found in the first installation scope (step 1702). If a candidate file is found then a check is done as to whether or not this found candidate file has a negative existence indicating that that found file has been marked for deletion or is otherwise no longer present in the installation scope (step 1704). When the candidate has a negative existence, a check is the done to determine if there are more installation scopes within the isolation environment 260 (step 1710), however if the candidate file does not have a negative existence, then a check is done to determine if the candidate file has a neutral existence (step 1706). When the candidate file has a neutral existence this indicates that the file may be a placeholder or that the file may not exist, and so the isolation scope 260 is further analyzed to determine if there are additional installation scopes present in the isolation environment 260 (step 1710). If the candidate file does not have a neutral existence, then a value is returned to the main method 601 indicating that the candidate file has a positive existence (step 1708). If after step 1724, it is determined that a candidate file was not found (step 1702), then the isolation environment 260 is analyzed to determine if there are additional installation scopes in the isolation environment 260 (step 1710). When it is determined that there are additional installation scopes present, a second candidate file is identified in the next installation scope (step 1712). Once the next installation scope is analyzed, it is determined whether or not a candidate file was found in that installation scope (step 1714). When a candidate file is found, that file is then checked to determine whether or not is has a negative existence (step 1704), or a neutral existence (step 1706). If a second candidate file is not found, then a check is done as to whether or not there are additional installation scopes (step 1710). When no more additional installation scopes are identified (step 1710), a check is done as to whether a candidate file was found during the last check (step 1724, step 1712), and if no file is found, a negative value is returned to the main method 601 (step 1722). If a candidate file is found (step 1716), then it is determined whether or not the found candidate file has a neutral existence (step 1718). When the candidate file has a neutral existence, a neutral value is returned to the main method 601 (step 1720), and when the candidate file does not have a neutral existence, a negative value is returned to the main method 601 (step 1722).

Further referring to FIG. 12 in more detail, in one embodiment of the subroutine 614, a candidate file is identified in the first installation scope (step 1724). Other embodiments may include a subroutine 614 that checks for the candidate file in the last installation scope or in another installation scope where the location of the installation scope is either a user-defined value or a pre-determined value. Still further embodiments include a subroutine 614 where the first installation scope is the installation scope is the highest priority installation scope within the isolation environment 260. Embodiments of the subroutine 614 may include a first installation scope that is the lowest priority installation scope within the isolation environment 260, a first installation scope that has the highest priority within a sub-scope of installation scopes, or a first installation scope that has the lowest priority within a sub-scope of installation scopes. It is then determined whether or not a candidate file was found in the first installation scope (step 1702). In one embodiment of the process 614, when a candidate file is found in the first installation scope, determinations are made as to whether the file has a negative existence (step 1704), a neutral existence (step 1706), or a positive existence (step 1708). When a file has a negative existence, further determinations are made as to whether or not there are additional installation scopes (step 1710), if there are no other installation scopes then a verification is made that a candidate file was found (step 1716) and a determination is made as to whether or not the candidate file is neutral (step 1718) or negative (step 1722). When a file does not have a negative existence, a determination is made as to whether the file has a neutral existence (step 1706), and if the candidate file does not have a neutral existence (step 1706), then a positive value indicating a candidate file with a positive existence is returned to the main process 601 (step 1708). If a file has a neutral existence then a check is done as to whether or not additional installation scopes are included in the isolation environment 260 (step 1710), if there are no other installation scopes then a verification is made that a candidate file was found (step 1716) and a determination is made as to whether or not the candidate file is neutral (step 1718) or negative (step 1722).

In one embodiment, when a candidate file is not found in the first installation scope, a determination is made as to whether or not there exist additional installation scopes within the isolation environment 260 (step 1710). Other embodiments may be configured to search through a pre-determined number of installation scopes. When additional installation scopes exist, a next installation scope is searched to identify a candidate file (step 1712). In one embodiment, the next installation scope is the installation scope that is one priority level less than the priority level of the previously checked installation scope. For example, in this embodiment if the previously check installation scope was the first installation scope with the highest priority, then the next installation scope would be the installation scope with the second highest priority. When additional installation scopes do not exist, a determination is made as to whether or not a candidate file was previously identified (step 1716). In one embodiment, a previously identified candidate file would include files identified by the method 614 before a check was made as to the existence of additional installation scopes.

When additional installation scopes are included within the isolation environment 260, the method attempts to identify a candidate file in each installation scope (1712). In one embodiment, a determination is made as to whether or not a candidate file was found (step 1714), and if a candidate file was found, the file is then analyzed to determine if the file has a negative existence (step 1704), a neutral existence (step 1706), or a positive existence (step 1708). When a candidate file is not found (1714), then a check is made for more installation scopes (step 1710), and if there are no additional installation scopes, it is verified that a candidate file was found (step 1716). If a candidate file was not found, a negative value is returned (step 1722), and if a candidate file is found, then a determination is made as to whether the candidate file is neutral (step 1718).

Figure 13:
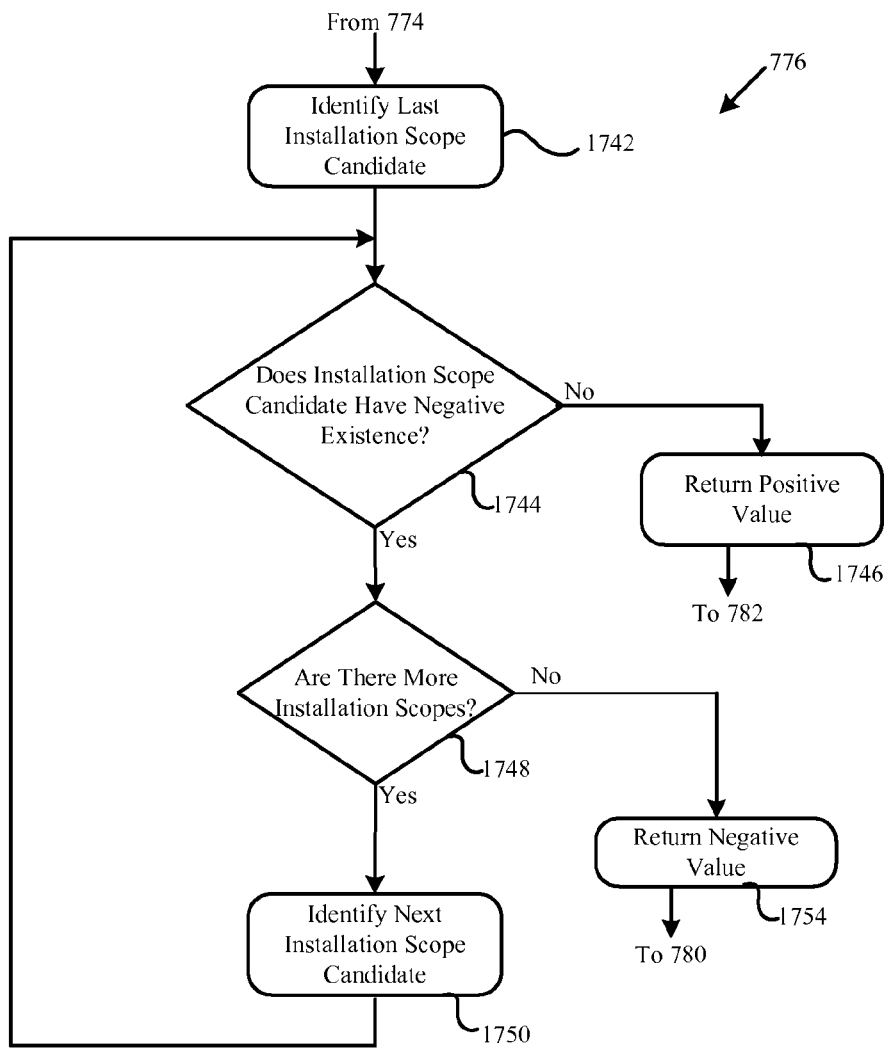
FIG. 13 is a flowchart depicting an embodiment of a method for cycling through more than one installation scope.

Illustrated in FIG. 13 is one embodiment of a subroutine 776 called by the method 798 in FIG. 10. In one embodiment, a subroutine 776 is called by the process 798 in FIG. 10 to cycle through all installation scopes included in the isolation environment 260, and identify an installation scope with a positive existence. After storing the enumerated system scope results in a working data store (step 774), a first installation scope candidate is identified (1742). A determination is made as to whether or not the first installation scope candidate has a negative existence (1744). When the first installation scope has a positive existence, a positive value is returned to the main process 798 (step 1746), and the installation scope is enumerated into the working data store (step 782). When the first installation scope has a negative existence, a check is made for the existence of additional installation scopes within the isolation environment (step 1748). If there are no additional installation scopes, then a negative value is returned to the main process 798 (step 1754). If there are additional installation scopes, then a next candidate installation scope is identified (step 1750) and a determination is made as to whether or not the next installation scope has a negative existence (step 1744). A verification is made as to whether or not the next candidate installation scope Referring to FIG. 13 in more detail, when the subroutine 776 is called from the main process 798, an embodiment of which is illustrated in FIG. 10, a first installation scope candidate is identified (step 1742). In one embodiment, the first installation scope candidate is the installation scope that has a higher priority than all other installation scopes included in the isolation environment 260. Other embodiments may include a first installation scope candidate that is the installation scope that has a lower priority than all other installation scopes included in the isolation environment 260. Still other embodiments may include a first installation sub-scope that has a higher priority than the other installation sub-scopes, or a first installation scope that has a higher priority than the other installation scopes included in a sub-isolation environment 260.

An embodiment of the process 776 makes a determination as to whether or not the installation scope has a negative existence (step 1744). In one embodiment, when the installation scope does have a negative existence (step 1744), a check is made to determine whether or not the isolation environment 260 includes additional installation scopes (step 1748). In another embodiment, when the installation scope does not have a negative existence (step 1744), a positive value is returned to the main process 798 (step 1746).

One embodiment of the method 776 determines whether or not there exist additional installation scopes within the isolation environment 260 (step 1748). In one embodiment, when there exist no additional installation scopes, a negative value is returned to the main process 798 (step 1746), while in another embodiment a next installation scope candidate is identified (step 1750) when there exist additional installation scopes within the isolation environment 260.

Registry Virtualization

The methods and apparatus described above may be used to virtualize access to a registry database. As described above a registry database stores information regarding hardware physically attached to the computer 200, which system options have been selected, how computer memory is set up, various items of application-specific data, and what application programs should be present when the operating system 210 is started. A registry database 220 is commonly organized in a logical hierarchy of "keys" which are containers for registry values.

Figure 14:
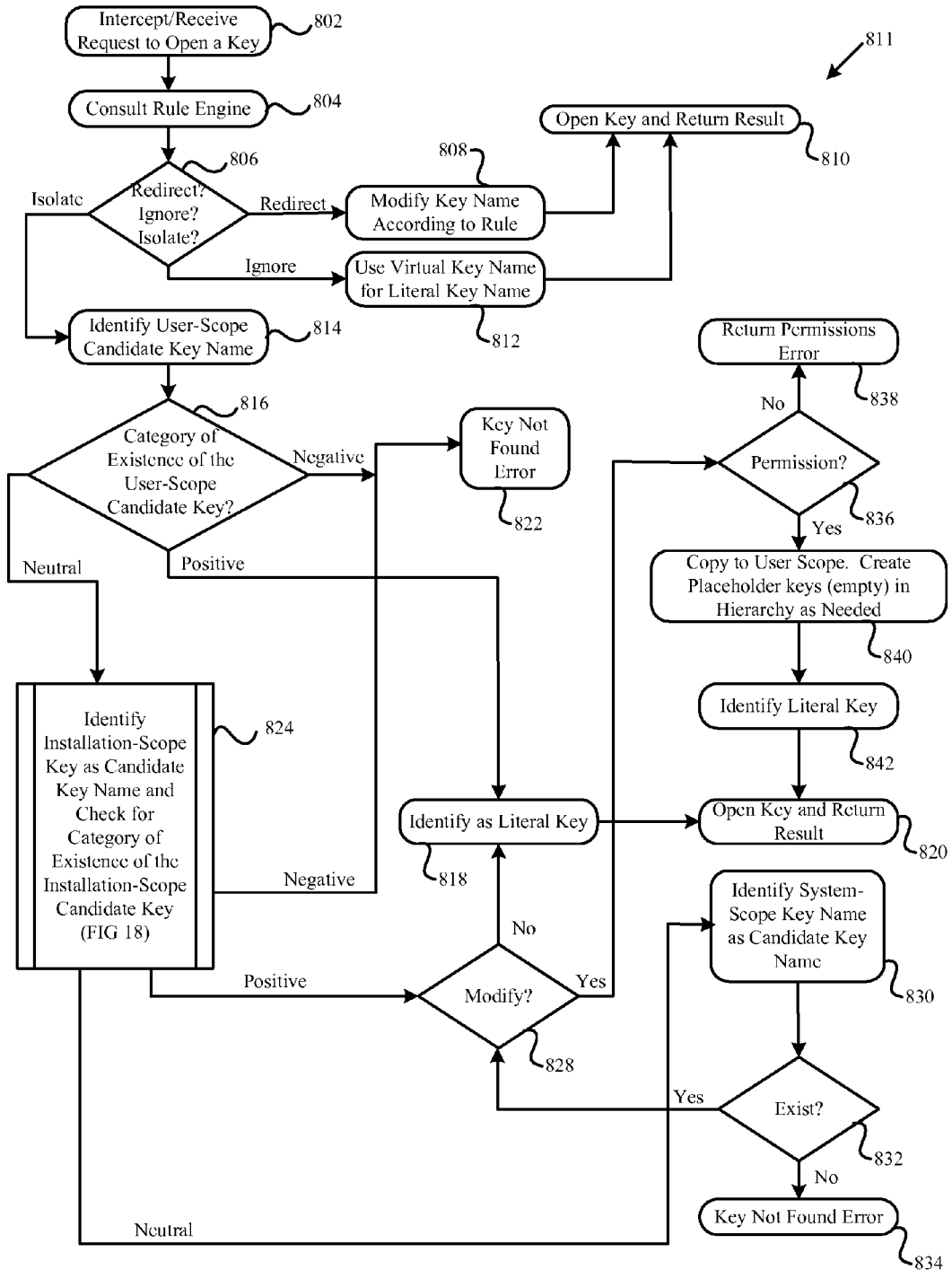
FIG. 14 is a flowchart depicting an embodiment of a method for opening a registry key within the described virtualized environment.

In brief overview, FIG. 14 depicts one embodiment of the steps taken to open a registry key in the isolation environment 260 described above. A request to open a registry key is received or intercepted, the request containing a registry key name which is treated as a virtual key name by the isolation environment 260 (step 802). A processing rule applicable to the virtual name in the request determines how the registry key operation is processed (step 804). If the rule action is "redirect" (step 806), the virtual key name provided in the request is mapped to a literal key name as specified by the applicable rule (step 808). A request to open the literal registry key using the literal key name is passed to the operating system 210 and the result from the operating system 210 is returned to the requestor (step 810). If the rule action is not "redirect", but is "ignore" (step 806), then the virtual key name is identified as the literal key name (step 812), and a request to open the literal registry key is passed to the operating system 210 and the result from the operating system 210 is returned to the requestor (step 810). If the rule action determined in step 806 is not "redirect" and is not "ignore," but is "isolate", the virtual key name provided in the request is mapped to a user-scope candidate key name, that is a key name corresponding to the virtual key name that is specific to the applicable user scope (step 814). The category of existence of the user-scope candidate key is determined by examining the user scope and any metadata associated with the candidate key (step 816). If the candidate key is determined to have "negative existence", because either the candidate key or one of its ancestor keys in the user scope is marked as deleted, this means the requested virtual key is known to not exist. In this case, an error condition indicating the requested file is not found is returned to the requestor (step 822). If instead in step 816 the candidate key is determined to have "positive existence", because the candidate key exists in the user scope and is not marked as a placeholder node, then the requested virtual key is known to exist. The candidate key is identified as the literal key for the request (step 818), and a request issued to open the literal key and the result returned to the requestor (step 820). If, however, in step 816, the candidate key has "neutral existence" because the candidate key does not exist, or the candidate key exists but is marked as a placeholder node, it is not yet known whether the virtual key exists or not. In this case a call is made to a subroutine that identifies an installation-scope key name corresponding to the virtual key name as the candidate key name, and further verifies the category of existence of the candidate key (step 824). In other words, this subroutine creates a candidate key name by mapping the virtual key name to the corresponding native key name specific to the applicable installation scope, and determines the category of existence of the candidate key by examining the installation scope and any metadata associated with the candidate key (step 824). The subroutine returns a value to the main method 811 indicating the category of existence of the candidate key. If the returned value is a "negative existence", then either the candidate key or one of its ancestor keys in the installation scope is marked as deleted, this means the requested virtual key is known to not exist. In this case, an error condition indicating the requested key is not found is returned to the requestor (step 822). If instead in step 826 the candidate key is determined to have "positive existence", because the candidate key exists in the installation scope and is not marked as a placeholder node, then the requested virtual key is known to exist. The request is checked to determine if the open request indicates an intention to modify the key (step 828). If not, the candidate key is identified as the literal key for the request (step 818), and a request issued to open the literal key and the result returned to the requestor (step 820). If, however, in step 828, it is determined that the open request indicates an intention to modify the key, permission data associated with the key is checked to determine if modification of the key is allowed (step 836). If not, an error condition is returned to the requestor (step 838) indicating that modification of the key is not allowed. If the permission data indicates that the key may be modified, the candidate key is copied to the user scope (step 840). In some embodiments, the candidate key is copied to a location defined by the rules engine. For example, a rule may specify that the key is copied to an installation scope. In other embodiments the rules may specify a particular installation sub-scope or user sub-scope to which the key should be copied. Any ancestors of the requested key that do not appear in the scope to which the key is copied are created as placeholders in the scope in order to correctly locate the copied instance in the hierarchy. The newly copied scoped instance is identified as the literal key (step 842) and a request issued to open the literal key and the result returned to the requestor (step 820). Returning to step 826, if the candidate key has neutral existence because the candidate key does not exist, or because the candidate key is found but marked as a placeholder node, it is not yet known whether the virtual key exists or not. In this case, the system-scope key name corresponding to the virtual key name is identified as the candidate key name (step 830). In other words, the candidate key name is exactly the virtual key name. If the candidate key does not exist (step 832), an error condition indicating the virtual key was not found is returned to the requestor (step 834). If on the other hand the candidate key exists (step 832), the request is checked to determine if the open request indicates an intention to modify the key (step 828). If not, the candidate key is identified as the literal key for the request (step 818), and a request issued to open the literal key and the result returned to the requestor (step 820). If, however, in step 828, it is determined that the open request indicates intention to modify the key, permission data associated with the key is checked to determine if modification of the key is allowed (step 836). If not, an error condition is returned to the requestor (step 838) indicating that modification of the key is not allowed. If the permission data indicates that the key may be modified, the candidate key is copied to the user scope (step 840). In some embodiments, the candidate key is copied to a location defined by the rules engine. For example, a rule may specify that the key is copied to an installation scope. In other embodiments the rules may specify a particular installation sub-scope or user sub-scope to which the key should be copied. Any ancestors of the requested key that do not appear in the scope are created as placeholders in the scope in order to correctly locate the copied instance in the hierarchy. The newly copied scoped instance is identified as the literal key (step 842) and a request issued to open the literal key and the result returned to the requestor (step 820).

Still referring to FIG. 14 and now in more detail, a request to open a virtual registry key is received or intercepted (step 802). The corresponding literal registry key may be of user scope, installation scope or system scope, or it may be scoped to an installation sub-scope or a user sub-scope. In some embodiments, the request is hooked by a function that replaces the operating system 210 function or functions for opening a registry key. In another embodiment a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for native registry keys. For embodiments in which a separate operating system 210 function is provided for each type of registry key operation, each function may be hooked separately. Alternatively, a single hooking function may be provided which intercepts create or open calls for several types of registry key operations.

The request contains a registry key name, which is treated as a virtual registry key name by the isolation environment 260. The processing rule applicable to the registry key open request is determined (step 804) by consulting the rules engine. In some embodiments, the rules engine may be provided as a relational database. In other embodiments, the rules engine may be a tree-structured database, a hash table, or a flat file database. In some embodiments, the virtual registry key name provided for the requested registry key is used to locate in the rule engine a rule that applies to the request. In particular ones of these embodiments, multiple rules may exist in the rules engine for a particular registry key and, in these embodiments, the rule having the longest prefix match with the virtual registry key name is the rule applied to the request. In other embodiments, a process identifier is used to locate in the rule engine a rule that applies to the request, if one exists. The rule associated with a request may be to ignore the request, redirect the request, or isolate the request. Although shown in FIG. 14 as a single database transaction or single lookup into a file, the rule lookup may be performed as a series of rule lookups.

If the rule action is "redirect" (step 806), the virtual registry key name provided in the request is mapped to the literal registry key name according to the applicable rule (step 808). A request to open the literal registry key using the literal registry key name is passed to the operating system 210 and the result from the operating system 210 is returned to the requestor (step 810). For example, a request to open a registry key named "registry_key_1" may result in the opening of a literal registry key named "Different_registry_key_1". In one embodiment, this is accomplished by calling the original version of the hooked function and passing the formed literal name to the function as an argument. In other embodiments, a registry filter driver facility conceptually similar to a file system filter driver facility may be provided by the operating system 210. In these embodiments, opening the literal registry key may be achieved by responding to the original request to open the virtual key by signaling to the registry filter manager to reparse the request using the determined literal key name. If instead the rule action is "ignore" (step 806), then the literal registry key name is determined to be exactly the virtual registry key name (step 812), and the request to open the literal registry key is passed to the operating system and the result from the operating system is returned to the requestor (step 810). For example, a request to open a registry key named "registry_key_1" results in the opening of a literal registry key named "registry_key_1". In one embodiment, this is accomplished by calling the original version of the hooked function and passing the formed literal name to the function as an argument. In another embodiment, this is accomplished by signaling to the registry filter manager to continue processing the original unmodified request in the normal fashion.

If in step 806 the rule action is "isolate", then the user-scope registry key name corresponding to the virtual registry key name is identified as the candidate registry key name (step 814). In other words, the candidate registry key name is formed by mapping the virtual registry key name to the corresponding native registry key name specific to the applicable user scope. For example, a request to open a registry key named "registry_key_1" may result in the opening of a literal registry key named "Isolated_UserScope_UserA_registry_key_1". In one embodiment, this is accomplished by calling the original version of the hooked function and passing the formed literal name to the function as an argument. In other embodiments, opening the literal registry key may be achieved by responding to the original request to open the virtual key by signaling to the registry filter manager to reparse the request using the determined literal key name.

In some embodiments, the literal name formed in order to isolate a requested virtual registry key may be based on the virtual registry key name received and a scope-specific identifier. The scope-specific identifier may be an identifier associated with an installation scope, a user scope, a session scope, an installation sub-scope, a user sub-scope, or some combination of the above. The scope-specific identifier is used to "mangle" the virtual name received in the request.

In other embodiments, the user scope or a sub-scope may be a registry key under which all keys that exist in the user scope are stored. In some of these embodiments, the key hierarchy under the user scope key reflects the path of the requested resource. In other words, the literal key path is formed by mapping the virtual key path to the user scope. For example, if the requested key is HKLM\Software\Citrix\MyKey and the user scope key is HKCU\Software\UserScope\, then the path to the user-scope literal key may be HKCU\Software\UserScope\HKLM\Software\Citrix\MyKey. In other embodiments, the path to the user-scope literal may be defined in a native naming convention. For example, the path to the user-scope literal key may be HKCU\Software\UserScope\Registry\Machine\Software\Citrix\MyKey. In still other embodiments, the user-scope keys may all be stored under a single key with names chosen to be unique and a database may be used to store the mapping between the requested key name and the name of the corresponding literal key stored in the user key. In still other embodiments, the contents of the literal keys may be stored in a database or a file store.

The category of existence of the candidate key is determined by examining the user scope and any metadata associated with the candidate key (step 816). If the candidate key is determined to have "negative existence", because either the candidate key or one of its ancestor keys in the user scope is marked as deleted, this means the requested virtual key is known to not exist. In this case, an error condition indicating the requested key is not found is returned to the requestor (step 822).

In some embodiments, the literal registry key may be associated with metadata indicating that the virtualized registry key has already been deleted. In some embodiments, metadata about a registry key may be stored in a distinguished value held by that key, with the existence of that value hidden from ordinary application usage of registry APIs. In some embodiments, small amounts of metadata about a registry key may be stored directly in the literal key name, such as by suffixing the virtual name with a metadata indicator, where a metadata indicator is a string uniquely associated with a particular metadata state. The metadata indicator may indicate or encode one or several bits of metadata. Requests to access the key by virtual name check for possible variations of the literal key name due to the presence of a metadata indicator, and requests to retrieve the name of the key itself are hooked or intercepted in order to respond with the literal name. In other embodiments, the metadata indicator may be encoded in a sub-key name or a registry value name instead of the key name itself. In still other embodiments, a registry key system may directly provide the ability to store some 3rd party metadata for each key. In some embodiments, metadata is stored in a database or other repository separate from the registry database. In some embodiments, a separate sub-scope may be used to store keys that are marked as deleted. The existence of a key in the sub-scope indicates that the key is marked as deleted.

In specific ones of these embodiments, a list of deleted keys or key system elements may be maintained and consulted to optimize this check for deleted keys. In these embodiments, if a deleted key is recreated then the key name may be removed from the list of deleted keys. In others of these embodiments, a key name may be removed from the list if the list grows beyond a certain size.

If instead in step 816 the candidate key is determined to have "positive existence", because the candidate key exists in the user scope and is not marked as a placeholder node, then the requested virtual key is known to exist. The candidate key is identified as the literal key for the request (step 818), and a request issued to open the literal key and the result returned to the requestor (step 820).

If, however, in step 816, the candidate key has "neutral existence" because the candidate key does not exist, or the candidate key exists but is marked as a placeholder node, it is not yet known whether the virtual key exists or not.

In this case a subroutine is called to retrieve an installation-scope key name corresponding to the virtual key name, identify found installation-scope key names as candidate key names, and categorize the existence of the identified candidate keys by examining the installation scopes and any metadata associated with the identified candidate keys (step 824). In one embodiment, the subroutine called is an embodiment of the subroutine depicted in FIG. 18. This subroutine searches through the one or more installation scopes included in the isolation environment 260 to determine whether or not the candidate key name exists within the one or more installation scopes. In other words, the candidate key name is formed by mapping the virtual key name to the corresponding native key name specific to the applicable installation scope. In one embodiment of the subroutine, a value is returned by the subroutine indicating the category of existence of the candidate key as determined by examining the installation scopes and any metadata associated with the candidate key (step 824).

If the installation-scope candidate key is determined to have "negative existence", because either the candidate key or one of its ancestor keys in the installation scope is marked as deleted, this means the requested virtual key is known to not exist. In this case, an error condition indicating the requested key is not found is returned to the requestor (step 822).

If, however, in step 824 the candidate key is determined to have "positive existence", because the candidate key exists in the installation scope and is not marked as a placeholder node, then the requested virtual key is known to exist. The request is checked to determine if the open request indicates an intention to modify the key (step 828). If not, the candidate key is identified as the literal key for the request (step 818), and a request issued to open the literal key and the result returned to the requestor (step 820).

If, however, in step 828, it is determined that the open request indicates intention to modify the key, permission data associated with the key is checked to determine if modification of the key is allowed (step 836). In some embodiments, the permission data is associated with the installation-scope candidate key. In some of these embodiments, the permissions data is stored in a rules engine or in metadata associated with the candidate key. In other embodiments, the permission data associated with the candidate key is provided by the operating system 210. Further, the rules engine may include configuration settings instructing the isolation environment 260 to obey or override the native permission data for virtualized copies of resources. In some embodiments, the rules may specify for some virtual resources the scope in which modifications are to occur, for example the system scope or the installation scope or a sub-scope, or the user scope or a sub-scope. In some embodiments, the rules engine may specify configuration settings that apply to subsets of the virtualized native resources based on hierarchy. In some of these embodiments, the configuration settings may be specific to each atomic native resource.

If the permission data associated with the candidate key indicates that it may not be modified, an error condition is returned to the requestor (step 838) indicating that modification of the key is not allowed. If the permission data indicates that the key may be modified, the candidate key is copied to the user scope (step 840). In some embodiments, the candidate key is copied to a location defined by the rules engine. For example, a rule may specify that the key is copied to another installation scope. In other embodiments the rules may specify a particular installation sub-scope or user sub-scope to which the key should be copied. Any ancestors of the requested key that do not appear in the scope to which the key is copied are created as placeholders in the scope in order to correctly locate the copied instance in the hierarchy.

In some embodiments, metadata is associated with keys copied to the scope that identifies the date and time at which the keys were copied. This information may be used to compare the time stamp associated with the copied instance of the key to the time stamp of the last modification of the original instance of the key or of another instance of the key located in a lower isolation scope. In these embodiments, if the original instance of the key, or an instance of the key located in a lower scope, is associated with a time stamp that is later than the time stamp of the copied key, that key may be copied to the scope to update the candidate key. In other embodiments, the copy of the key in the scope may be associated with metadata identifying the scope containing the original key that was copied.

In further embodiments, keys that are copied to scopes because they have been opened with intent to modify them may be monitored to determine if they are, in fact, modified. In one embodiment a copied key may be associated with a flag that is set when the key is actually modified. In these embodiments, if a copied key is not actually modified, it may be removed from the scope to which it was copied after it is closed, as well as any placeholder nodes associated with the copied key.

The scoped instance is identified as the literal key (step 842) and a request issued to open the literal key and the result returned to the requestor (step 820).

Returning to step 826, if the candidate key has neutral existence because the candidate key does not exist, or if the candidate key is found but marked as a placeholder node, it is not yet known whether the virtual key exists or not. In this case, the system-scope key name corresponding to the virtual key name is identified as the candidate key name (step 830). In other words, the candidate key name is exactly the virtual key name.

If the candidate key does not exist (step 832), an error condition indicating the virtual key was not found is returned to the requestor (step 834). If on the other hand the candidate key exists (step 832), the request is checked to determine if the open request indicates an intention to modify the key (step 828).

As above, if the candidate key is being opened without the intent to modify it, the system-scope candidate key is identified as the literal key for the request (step 818), and a request issued to open the literal key and the result returned to the requestor (step 820). If, however, in step 828, it is determined that the open request indicates intention to modify the key, permission data associated with the key is checked to determine if modification of the key is allowed (step 836). In some embodiments, the permission data is associated with the installation-scope candidate key. In some of these embodiments, the permissions data is stored in a rules engine or in metadata associated with the candidate key. In other embodiments, the permission data associated with the candidate key is provided by the operating system 210. Further, the rules engine may include configuration settings instructing the isolation environment 260 to obey or override the native permission data for virtualized copies of resources. In some embodiments, the rules may specify for some virtual resources the scope in which modifications are to occur, for example the system scope or the installation scope or a sub-scope, or the user scope or a sub-scope. In some embodiments, the rules engine may specify configuration settings that apply to subsets of the virtualized native resources based on hierarchy. In some of these embodiments, the configuration settings may be specific to each atomic native resource.

If the permission data associated with the system-scope candidate key indicates that the key may not be modified, an error condition is returned to the requestor (step 838) indicating that modification of the key is not allowed. If, however, the permission data indicates that the key may be modified, the candidate key is copied to the user scope (step 840). In some embodiments, the candidate key is copied to a location defined by the rules engine. For example, a rule may specify that the key is copied to an installation scope or that it may be left in the system scope. In other embodiments the rules may specify a particular installation sub-scope or user sub-scope to which the key should be copied. Any ancestors of the requested key that do not appear in the scope are created as placeholders in the scope in order to correctly locate the copied instance in the hierarchy.

In some embodiments, metadata is associated with keys copied to the scope that identifies the date and time at which the keys were copied. This information may be used to compare the time stamp associated with the copied instance of the key to the time stamp of the last modification of the original instance of the key. In these embodiments, if the original instance of the key is associated with a time stamp that is later than the time stamp of the copied key, the original key may be copied to the scope to update the candidate key. In other embodiments, the candidate key copied to the scope may be associated with metadata identifying the scope from which the original key was copied.

In further embodiments, keys that are copied to scopes because they have been opened with intent to modify them may be monitored to determine if they are, in fact, modified. In one embodiment a copied key may be associated with a flag that is set when the key is actually modified. In these embodiments, if a copied key is not actually modified, when it is closed it may be removed from the scope to which it was copied, as well as any placeholder nodes associated with the copied key. In still further embodiments, the key is only copied to the appropriate scope when the key is actually modified.

The scoped instance is identified as the literal key (step 842) and a request issued to open the literal key and the result returned to the requestor (step 820).

Figure 15:
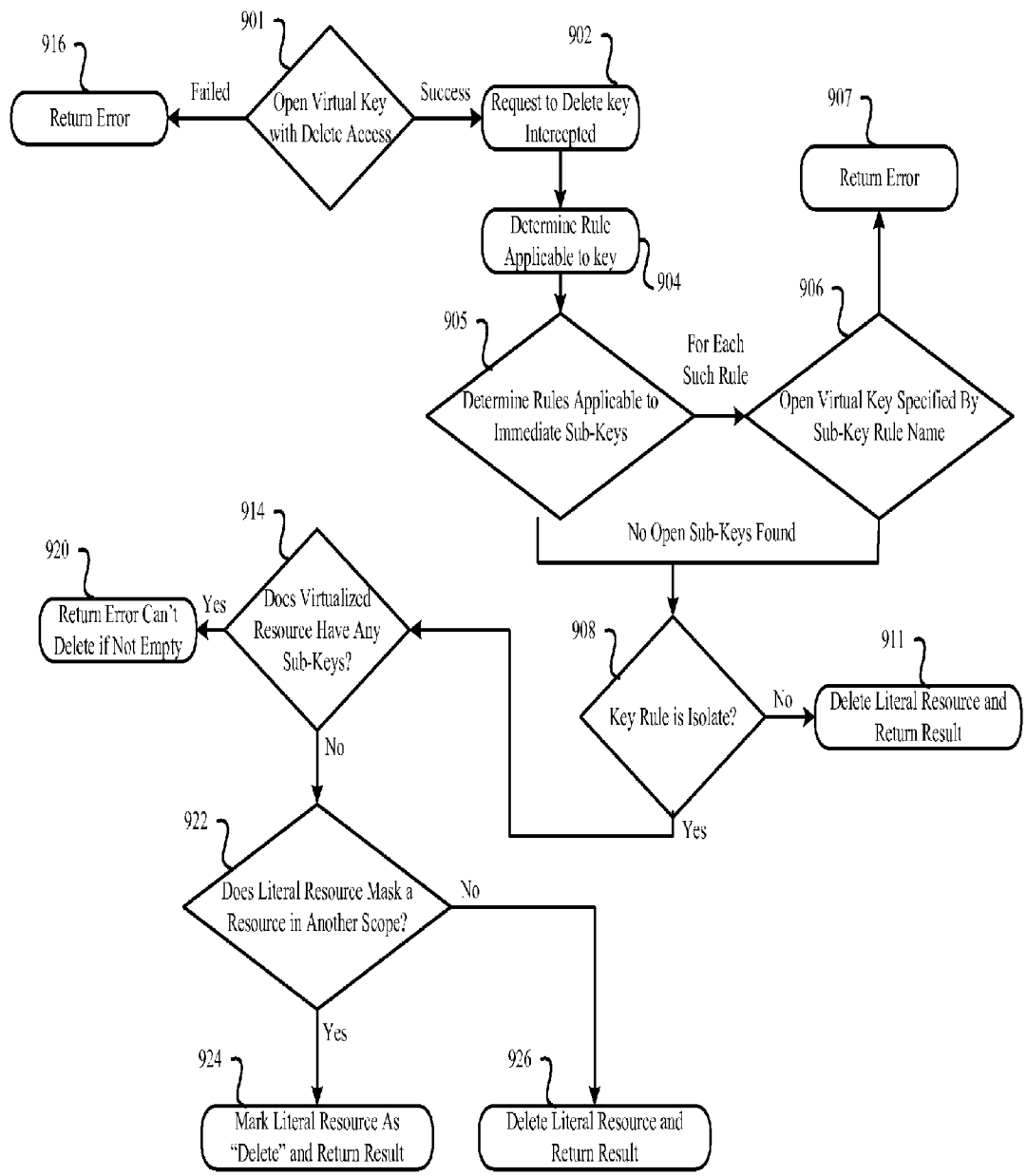
FIG. 15 is a flowchart depicting an embodiment of a method for deleting a registry key within the described virtualized environment.

Referring now to FIG. 15, and in brief overview, one embodiment of the steps taken to delete a registry key is depicted. Before a key can be deleted, the key is first opened with delete access (step 901). If the key is not opened successfully, an error is returned (step 916). If the virtual key is opened successfully, a request to delete a virtualized registry key is received or intercepted, the request including the handle to the literal key corresponding to the virtual key (step 902). A rule determines how the registry key operation is processed (step 904). In addition to the rule applicable to the key to be deleted, any other rules applicable to immediate sub-keys are examined (step 905). For each rule applicable to an immediate sub-key found, an attempt is made to open a virtual sub-key, with the virtual sub-key's name being specified by the name given in the rule found in step 905. If a sub-key with a name corresponding to one of the rules found in step 905 is opened successfully (step 906), then the virtual key is considered to have sub-keys, which means it cannot be deleted, and an error returned (step 907).

If, after all the virtual key names extracted in step 905 have been attempted to be opened (step 906) and no virtual keys were found to exist, further examination is required. If the rule action is not "isolate", but is "redirect", or is "ignore" (step 908), a request to delete the literal registry key is passed to the operating system 210 and the result from the operating system 210 is returned to the requestor (step 911). If however the rule action determined in step 908 is "isolate" the aggregated virtualized registry key is consulted to determine if it contains any virtual sub-keys (step 914). If the virtualized key has virtual sub-keys, then the deletion cannot continue, and an error is returned indicating the key has not been deleted (step 920). If the virtualized key does not have virtual sub-keys, then the literal key corresponding to the virtual key is examined to determine if it masks a scoped key with the same virtual name in another scope level (step 922). If the literal key corresponding to the virtual key does not mask a differently scoped key with the same virtual name, then the literal key which corresponds to the virtual key is deleted, and the result returned (step 926). If the literal key corresponding to the virtual key masks a differently scoped key with the same virtual name, then the literal key corresponding to the virtual key is marked with a value indicating that it is deleted, and a successful result returned to the caller (step 924).

Still referring to FIG. 15, and in more detail, in order to delete a key, it is first opened with delete access (step 901). The request to open the key with delete access includes the name of the key which is treated as a virtual name by the isolation environment 260. A full virtualized key open is performed as described above. If the virtualized open operation fails, an error is returned to the requestor (step 916). If the virtualized open operation succeeds, the handle of the literal key corresponding to the virtual key is returned to the requestor. Subsequently a request to delete the registry key which was opened in step 901 is received or intercepted (step 902). The opened literal registry key may be of user scope, installation scope, system scope, or some applicable sub-scope. In some embodiments, the delete request is hooked by a function that replaces the operating system 210 function or functions for deleting the registry key. In another embodiment a hooking dynamically-linked library is used to intercept the delete request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system 210 resource that is used in dispatching requests for native registry keys. In other embodiments, a registry filter driver facility conceptually similar to a file system filter driver facility may be provided by the operating system 210. A practitioner skilled in the art may create a registry filter driver, to which the operating system 210 passes requests to perform registry operations, thus providing a mechanism to intercept registry operation requests. For embodiments in which a separate operating system 210 function is provided for each type of registry key function, each function may be hooked separately. Alternatively, a single hooking function may be provided which intercepts create or open calls for several types of registry key functions.

The delete request contains a literal key handle. The virtual key name associated with the handle is determined by querying the operating system 210 for the literal name associated with the handle. The rules engine is consulted to determine the virtual name associated with the literal name, if any. A rule determining how the registry key operation is processed (step 904) is obtained by consulting the rules engine. In some embodiments, the virtual key name of the virtual registry key to be deleted is used to locate in the rule engine a rule that applies to the request. In particular ones of these embodiments, multiple rules may exist in the rules engine for a particular virtual registry key and, in some of these embodiments, the rule having the longest prefix match with the virtual key name is the rule applied to the request. In some embodiments, the rules engine may be provided as a relational database. In other embodiments, the rules engine may be a tree-structured database, a hash table, or a flat registry key database. In some embodiments, the virtual key name corresponding to the virtual key handle in the request is used as an index into a rules engine to locate one or more rules that apply to the request. In some embodiments, a process identifier is used to locate in the rule engine a rule that applies to the request, if one exists. The rule associated with a request may be to ignore the request, redirect the request, or isolate the request. The rule lookup may occur as a series of decisions, or the rule lookup may occur as a single database transaction.

The virtual name of the key to be deleted is used to consult the rules engine to locate the set of rules applicable to any immediate child keys of the virtual key to delete, but not applicable to the virtual key to be deleted. This set of rules is located whether those child keys exist or not (step 905). If this set of rules applicable to immediate child keys is not empty, then the virtual name of each of these rules is extracted. An attempt is made to do a full virtualized open of each of the virtual child key names extracted, in turn (step 906). If any of the virtual keys corresponding to any of these virtual names can be opened successfully, then this means that a virtual sub-key exists. This means that the virtual key cannot be deleted, as it has a virtual child that exists, and an error is returned (step 907). If after examining all of the set of rules applicable to immediate children of the virtual key (step 905), no virtual sub-keys are found to exist, the deletion can continue. For example, a key with virtual name "key_1" may have child rules applicable to "key1\subkey_1" and "key1\subkey_2". In this step, an attempt is made to do a virtualized open of "key1\subkey_1" and "key1\subkey_2". If either of these virtual sub-keys can be opened successfully, then the deletion fails, and an error is returned (step 907). Only if neither of these virtual sub-keys exists can the deletion continue.

If the rule action is not "isolate", but is "redirect", or is "ignore" (step 908), a request to delete the literal registry key using the literal key handle is passed to the operating system 210 and the result from the operating system is returned to the requestor (step 911). This request fails if the literal key contains literal sub-keys. In one embodiment, the request to delete the literal registry key is accomplished by calling the original version of the hooked function and passing the literal key handle to the function as an argument. In embodiments that make use of a registry filter driver, this is accomplished by responding to the request with a completion status that signals the operating system to perform normal processing on the request. In some embodiments, operating system permissions associated with the literal registry key may prevent its deletion. In these embodiments, an error message is returned that the virtual registry key could not be deleted.

If the rule action determined in step 908 is "isolate", then the aggregated virtualized registry key is consulted to determine if it contains any virtual sub-keys (step 914). If the requested virtual registry key contains virtual sub-keys, then the virtual key cannot be deleted, and an error is returned to the caller (step 920).

If the requested virtual registry key does not contain virtual sub-keys, then the virtual key can be deleted. The action taken next depends on the scope that contains the literal key to be deleted. For example, a request to delete a virtual registry key may result in the deletion of an application-scoped literal key. The scope containing the literal key can be determined by consulting the rules engine with the full path to the literal key.

If the literal key to be deleted is found in a particular scope, and that literal key masks another key of the same virtual name in another scope, then the literal key to be deleted is marked as deleted, and a result returned to the requestor (step 924). For example, a virtual key that corresponds to a user-scoped literal key is considered to mask a differently-scoped key if a corresponding application-scoped key with the same virtual name or a corresponding system-scoped key with the same virtual name has "positive existence", that is, exists in the scope, and is not marked as a placeholder, and is not considered to be deleted. Similarly, an application-scoped key is considered to mask a system-scoped key corresponding to the same virtual name if that system-scoped key exists and is not considered to be deleted.

If the literal key to be deleted is found not to mask another key of the same virtual name in another scope, then the literal key to be deleted is actually deleted and a result returned (step 926).

In some embodiments, operating system permissions associated with the literal registry key may prevent deletion of the literal registry key. In these embodiments, an error message is returned that the virtual registry key could not be deleted.

In some embodiments, the literal registry key may be associated with metadata indicating that the virtualized registry key has already been deleted. In some embodiments, metadata about a registry key may be stored in a distinguished value held by that key, with the existence of that value hidden from ordinary application usage of registry APIs. In some embodiments, small amounts of metadata about a registry key may be stored directly in the literal key name, such as by suffixing the virtual name with a metadata indicator, where a metadata indicator is a string uniquely associated with a particular metadata state. The metadata indicator may indicate or encode one or several bits of metadata. Requests to access the key by virtual name check for possible variations of the literal key name due to the presence of a metadata indicator, and requests to retrieve the name of the key itself are hooked or intercepted in order to respond with the literal name. In other embodiments, the metadata indicator may be encoded in a sub-key name or a registry value name instead of the key name itself. In still other embodiments, a registry key system may directly provide the ability to store some 3rd party metadata for each key. In some embodiments, metadata could be stored in a database or other repository separate from the registry database. In some embodiments, a separate sub-scope may be used to store keys that are marked as deleted. The existence of a key in the sub-scope indicates that the key is marked as deleted.

In specific ones of these embodiments, a list of deleted keys or key system elements may be maintained and consulted to optimize this check for deleted keys. In these embodiments, if a deleted key is recreated then the key name may be removed from the list of deleted keys. In others of these embodiments, a key name may be removed from the list if the list grows beyond a certain size.

In some embodiments, an ancestor of the literal registry key in the same scope is associated with metadata indicating that it is deleted, or is otherwise indicated to be deleted. In these embodiments, an error message may be returned indicating that the virtualized registry key does not exist. In specific ones of these embodiments, a list of deleted registry keys or registry key system elements may be maintained and consulted to optimize this check for deleted registry keys.

Figure 16:
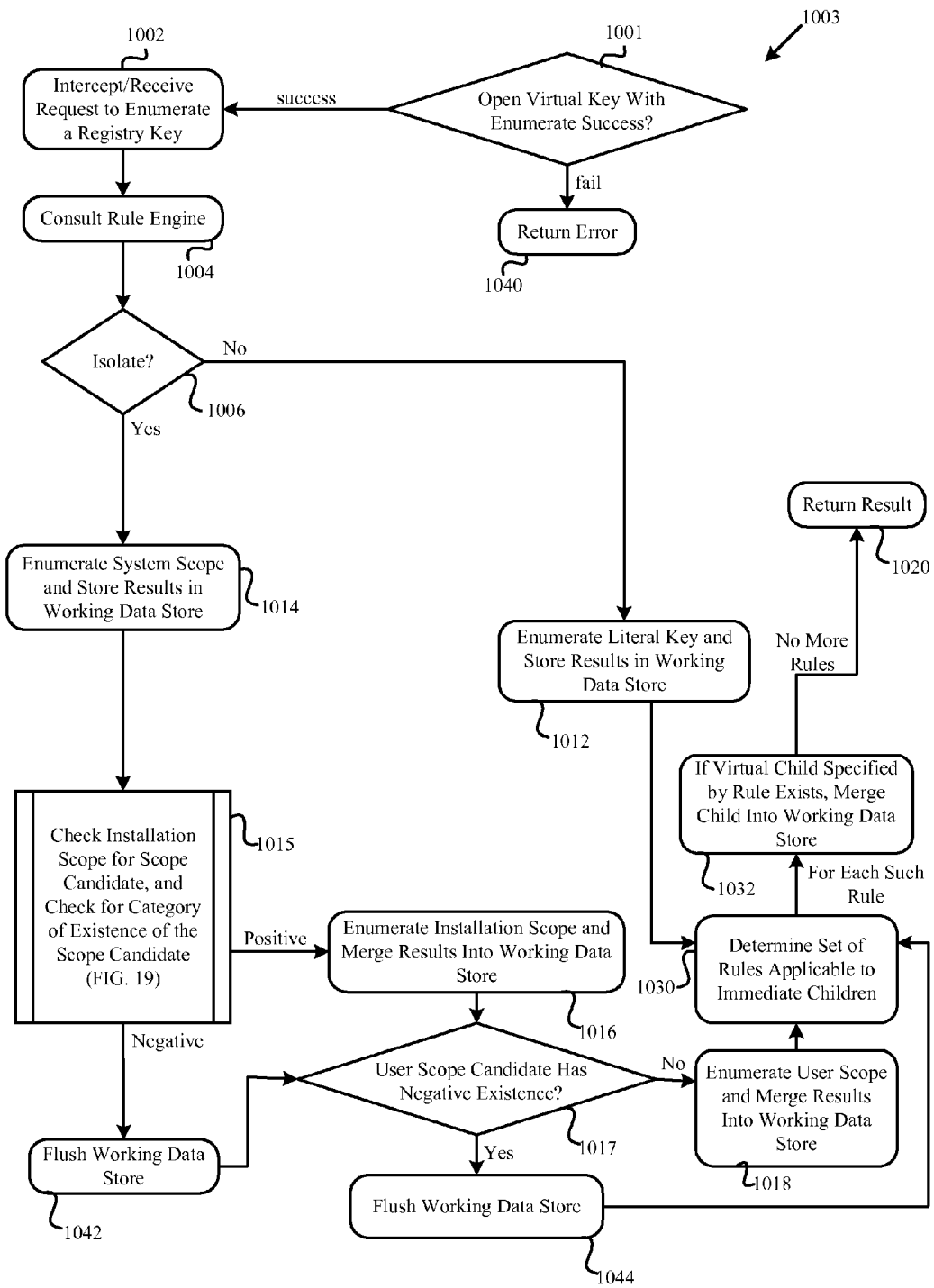
FIG. 16 is a flowchart depicting an embodiment of a method for enumerating sub-keys of a key in a registry database within the described virtualized environment.

Referring now to FIG. 16, and in brief overview, one embodiment of a process 1003 for enumerating a key in the described virtualized environment is shown. Before a key can be enumerated, the key is first opened with enumerate access (step 1001). If the key is not opened successfully, an error is returned (step 1040). If the virtual key is opened successfully, a request to enumerate is received or intercepted, the request including the handle to the literal key corresponding to the virtual key (step 1002).

The virtual key name corresponding to the handle is determined, and the rules engine is consulted to determine the rule for the key specified in the enumerate request (step 1004). If the rule doesn't specify an action of "isolate", but instead specifies "ignore" or specifies "redirect" (step 1006), the literal key identified by the literal key handle is enumerated, and the enumeration results stored in a working data store (step 1012), followed by step 1030 as described later.

If, however, the rule action specifies "isolate," firstly the system scope is enumerated; that is, the candidate key name is exactly the virtual key name, and if the candidate key exists it is enumerated. The enumeration results are stored in a working data store. If the candidate key does not exist, the working data store remains empty at this stage (step 1014). Next a subroutine is called to cycle through the installation scopes to identify a candidate key and verify the category of existence of the candidate key (step 1015). In some embodiments, the subroutine called is the subroutine illustrated in FIG. 19. In other embodiments, the subroutine returns a value indicative of the category of existence of the candidate key (step 1015). If the candidate key has "negative existence", i.e. it or one of its ancestors in the scope is marked as deleted, then within this scope it is known to be deleted, and this is indicated by flushing the working data store (step 1042). If instead the candidate key does not have negative existence, the candidate key is enumerated and any enumeration results obtained are merged into the working data store. In particular, for each sub-key in the enumeration, its category of existence is determined. Sub-keys with negative existence are removed from the working data store, and sub-keys with positive existence, i.e. those that exist and are not marked as placeholders and are not marked as deleted, are added to the working data store, replacing the corresponding sub-key if one is already present in the working data store (step 1016).

In either case, the candidate key is identified as the user-scope instance of the virtual key, and the category of existence of the candidate key is determined (step 1017). If the candidate key has "negative existence", i.e. it or one of its ancestors in the scope is marked as deleted, then within this scope it is known to be deleted, and this is indicated by flushing the working data store (step 1044). If instead the candidate key does not have negative existence, the candidate key is enumerated and any enumeration results obtained are merged into the working data store. In particular, for each sub-key in the enumeration, its category of existence is determined. Sub-keys with negative existence are removed from the working data store, and sub-keys with positive existence, i.e. those that exist and are not marked as placeholders and are not marked as deleted, are added to the working data store, replacing the corresponding sub-key if one is already present in the working data store (step 1018), followed by step 1030 as described below.

Then, for all three types of rules, step 1030 is executed. The rules engine is queried to find the set of rules whose filters match immediate children of the requested virtual key name, but do not match the requested virtual key name itself (step 1030). For each rule in the set, the existence of the virtual child whose name matches the name in the rule is determined. If the child has positive existence, it is added to the working data store, replacing any child of the same name already there. If the child has negative existence, the entry in the working data store corresponding to the child, if any, is removed. (Step 1032). Finally, the constructed enumeration is then returned from the working data store to the requestor (step 1020).

Still referring to FIG. 16, and in more detail, in order to enumerate a key, it is first opened with enumerate access (step 1001). The request to open the key with enumerate access includes the name of the key which is treated as a virtual name by the isolation environment 260. A full virtualized key open is performed as described above. If the virtualized open operation fails, an error is returned to the requestor (step 1040). If the virtualized open operation succeeds, the handle of the literal key corresponding to the virtual key is returned to the requestor. Subsequently a request to enumerate the registry key which was opened in step 1001 is received or intercepted (step 1002). The opened literal registry key may be of user scope, installation scope, system scope, or some applicable sub-scope. In some embodiments, the enumerate request is hooked by a function that replaces the operating system 210 function or functions for enumerating a registry key. In another embodiment a hooking dynamically-linked library is used to intercept the enumerate request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system 210 resource that is used in dispatching requests for native registry keys. In other embodiments, a registry filter driver facility conceptually similar to a file system filter driver facility may be provided by the operating system 210. A practitioner skilled in the art may create a registry filter driver, to which the operating system 210 passes requests to perform registry operations, thus providing a mechanism to intercept registry operation requests. For embodiments in which a separate operating system 210 function is provided for each type of registry key function, each function may be hooked separately. Alternatively, a single hooking function may be provided which intercepts create or open calls for several types of registry key functions.

The enumerate request contains a literal key handle. The virtual key name associated with the handle is determined by querying the operating system 210 for the literal name associated with the handle. The rules engine is consulted to determine the virtual name associated with the literal name, if any.

A rule determining how the registry key operation is processed (step 1004) is obtained by consulting the rules engine. In some embodiments, the virtual key name of the virtual registry key to be enumerated is used to locate in the rule engine a rule that applies to the request. In particular ones of these embodiments, multiple rules may exist in the rules engine for a particular virtual registry key and, in some of these embodiments, the rule having the longest prefix match with the virtual key name is the rule applied to the request. In some embodiments, the rules engine may be provided as a relational database. In other embodiments, the rules engine may be a tree-structured database, a hash table, or a flat registry key database. In some embodiments, the virtual key name corresponding to the virtual key handle in the request is used as an index into a rules engine to locate one or more rules that apply to the request. In some embodiments, a process identifier is used to locate in the rule engine a rule that applies to the request, if one exists. The rule associated with a request may be to ignore the request, redirect the request, or isolate the request. The rule lookup may occur as a series of decisions, or the rule lookup may occur as a single database transaction.

If the rule action is not "isolate" (step 1006), but is "ignore" or is "redirect", then a request to enumerate the literal key is passed to the operating system 210 using the literal key handle, and the enumeration results, if any, are stored in the working data store (step 1012), and step 1030 is executed as described later.

In one embodiment, this is accomplished by calling the original version of the hooked function and passing the formed literal name to the function as an argument. In other embodiments, a registry filter driver facility conceptually similar to a file system filter driver facility may be provided by the operating system 210. In these embodiments, enumerating the literal registry key may be achieved by responding to the original request to enumerate the key by signaling to the registry filter manager to process the unmodified request in the normal fashion.

If the rule action determined in step 1010 is "isolate", then the system scope is enumerated. To achieve this, the candidate key is identified as the system-scope key corresponding to the virtual key to be enumerated. The candidate key is enumerated, and the results of the enumeration are stored in a working data store (step 1014). In some embodiments, the working data store is comprised of a memory element. In other embodiments, the working data store comprises a database or a key or a solid-state memory element or a persistent data store.

Next, a subroutine is called to cycle through the installation scopes the candidate key is identified as the installation-scope instance of the virtual key, and the category of existence of the candidate key is determined (step 1015). If the candidate key has "negative existence", i.e. it or one of its ancestors in the scope is marked as deleted, then within this scope it is known to be deleted, and this is indicated by flushing the working data store (step 1042).

In some embodiments, the candidate registry key may be associated with metadata indicating that the candidate registry key has been deleted. In some embodiments, metadata about a registry key may be stored in a distinguished value held by that key, with the existence of that value hidden from ordinary application usage of registry APIs. In some embodiments, small amounts of metadata about a registry key may be stored directly in the literal key name, such as by suffixing the virtual name with a metadata indicator, where a metadata indicator is a string uniquely associated with a particular metadata state. The metadata indicator may indicate or encode one or several bits of metadata. Requests to access the key by virtual name check for possible variations of the literal key name due to the presence of a metadata indicator, and requests to retrieve the name of the key itself are hooked or intercepted in order to respond with the literal name. In other embodiments, the metadata indicator may be encoded in a sub-key name or a registry value name instead of the key name itself. In still other embodiments, a registry key system may directly provide the ability to store some 3rd party metadata for each key. In some embodiments, metadata is stored in a database or other repository separate from the registry database. In some embodiments, a separate sub-scope may be used to store keys that are marked as deleted. The existence of a key in the sub-scope indicates that the key is marked as deleted.

If instead, in step 1015, the candidate key does not have negative existence, the candidate key is enumerated and any enumeration results obtained are merged into the working data store. In particular, for each sub-key in the enumeration, its category of existence is determined. Sub-keys with negative existence are removed from the working data store, and sub-keys with positive existence, i.e. those that exist and are not marked as placeholders and are not marked as deleted, are added to the working data store, replacing the corresponding sub-key if one is already present in the working data store (step 1016).

In either case, the candidate key is identified as the user-scope instance of the virtual key, and the category of existence of the candidate key is determined (step 1017). If the candidate key has "negative existence", i.e. it or one of its ancestors in the scope is marked as deleted, then within this scope it is known to be deleted, and this is indicated by flushing the working data store (step 1044). If instead the candidate key does not have negative existence, the candidate key is enumerated and any enumeration results obtained are merged into the working data store. In particular, for each sub-key in the enumeration, its category of existence is determined. Sub-keys with negative existence are removed from the working data store, and sub-keys with positive existence, i.e. those that exist and are not marked as placeholders and are not marked as deleted, are added to the working data store, replacing the corresponding sub-key if one is already present in the working data store (step 1018), followed by step 1030 as described below.

Then, for all three types of rules, step 1030 is executed. The rules engine is queried to find the set of rules whose filters match immediate children of the requested key, but do not match the requested key itself (step 1030). For each rule in the set, the existence of the virtual child whose name matches the name in the rule is determined. In some embodiments, this is determined by examining the appropriate scope and the metadata associated with the virtual child. In other embodiments, this is determined by attempting to open the key. If the open request succeeds, the virtual child has positive existence. If the open request fails with an indication that the virtual child does not exist, the virtual child has negative existence.

If the child has positive existence, it is added to the working data store, replacing any child of the same name already there. If the child has negative existence, the child in the working data store corresponding to the virtual child, if any, is removed. (Step 1032). Finally, the constructed enumeration is then returned from the working data store to the requestor (step 1020).

A practitioner of ordinary skill in the art realizes that the layered enumeration process described above can be applied with minor modification to the operation of enumerating a single scope which comprises a plurality of sub-scopes. A working data store is created, successive sub-scopes are enumerated and the results are merged into the working data store to form the aggregated enumeration of the scope.

Figure 17:
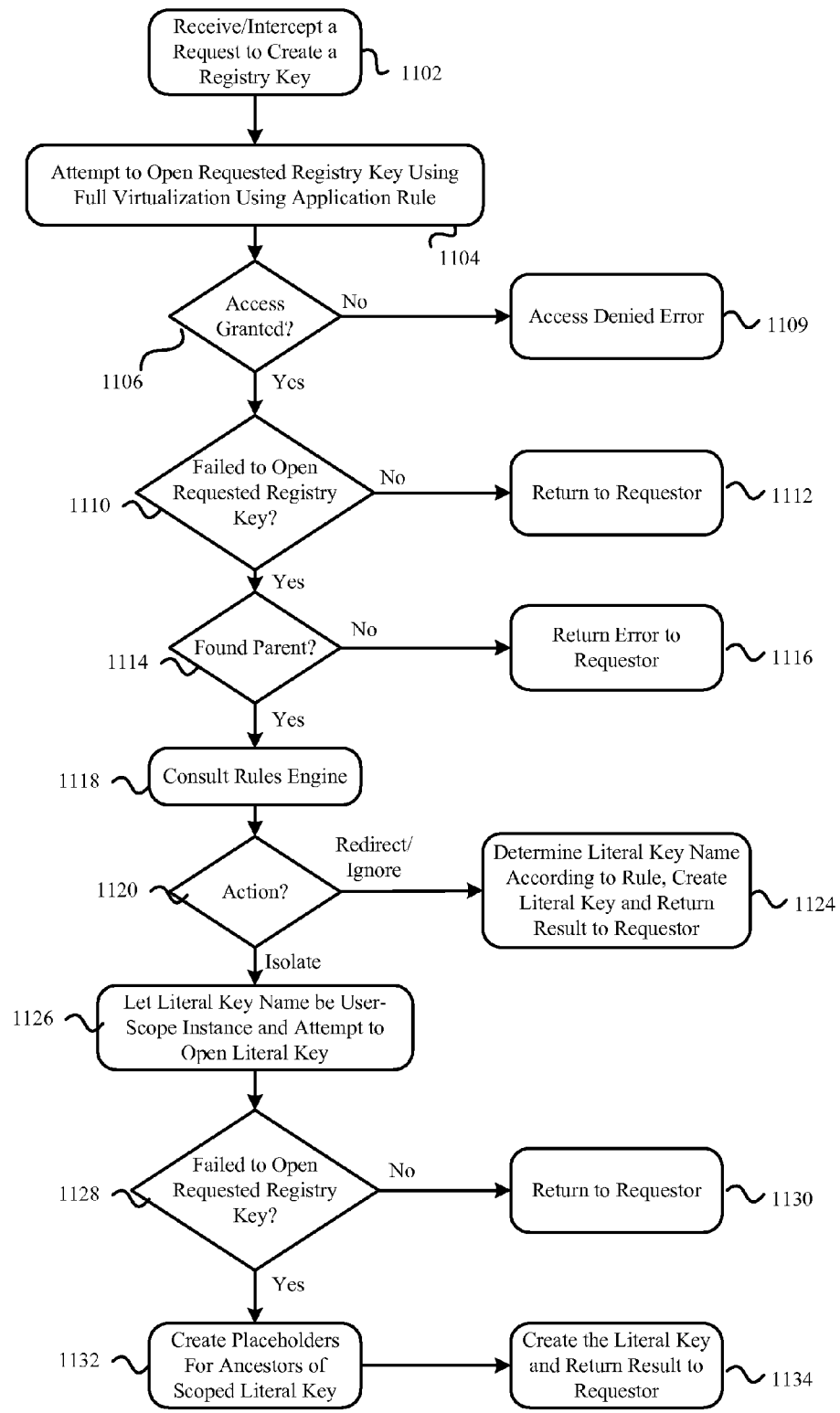
FIG. 17 is a flowchart depicting an embodiment of a method for creating a registry key in the described virtualized environment.

Referring now to FIG. 17, and in brief overview, one embodiment of the steps taken to create a key in the isolation environment 260 is shown. A request to create a key is received or intercepted (step 1102). The request contains a key name, which is treated as a virtual key name by the isolation environment 260. An attempt is made to open the requested key using full virtualization using applicable rules, i.e. using appropriate user and installation scope, as described above (step 1104). If access is denied (step 1106), an access denied error is returned to the requestor (step 1109). If access is granted (step 1106), and the requested key is successfully opened (step 1110), the requested key is returned to the requestor (step 1112). However, if access is granted (step 1106), but the requested key is not opened successfully (step 1110) then if the parent of the requested key also does not exist (step 1114), an error appropriate to the request semantics is issued to the requestor (step 1116). If on the other hand, the parent of the requested key is found in full virtualized view using the appropriate user and installation scope (step 1114), a rule then determines how the key operation is processed (step 1118). If the rule action is "redirect" or "ignore" (step 1120), then the virtual key name is mapped directly to a literal key name according to the rule. Specifically, if the rule action is "ignore", the literal key name is identified as exactly the virtual key name. If instead, the rule action is "redirect", the literal key name is determined from the virtual key name as specified by the rule. Then a request to create the literal key is passed to the operating system 210, and the result is returned to the requestor (step 1124). If on the other hand, the rule action determined in step 1120 is "isolate", then the literal key name is identified as the instance of the virtual key name in the user scope. If the literal key already exists, but is associated with metadata indicating that it is a placeholder or that it is deleted, then the associated metadata is modified to remove those indications, and it is ensured that the key is empty. In either case, a request to open the literal key is passed to the operating system 210 (step 1126). If the literal key was opened successfully (step 1128), the literal key is returned to the requestor (step 1130). If on the other hand, in step 1128, the requested key fails to open, placeholders for each ancestor of the literal key that does not currently exist in the user scope (step 1132) and a request to create the literal key using the literal name is passed to the operating system 210 and the result is returned to the requestor (step 1134).

Still referring to FIG. 17, and in more detail, a request to create a key is received or intercepted (step 1102). In some embodiments, the request is hooked by a function that replaces the operating system 210 function or functions for creating the key. In another embodiment, a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system 210 resource that is used in dispatching requests for key operations. For embodiments in which a separate operating system 210 function is provided for each type of key operation, each function may be hooked separately. Alternatively, a single hooking function may be provided which intercepts create or open calls for several types of key operations.

The request contains a key name, which is treated as a virtual key name by the isolation environment 260. In some embodiments, the virtual key name may be expressed as a combination of a handle to a parent key, and the relative path name to the descendant key. The parent key handle is associated with a literal key name, which is itself associated with a virtual key name. The requestor attempts to open the virtual key using full virtualization using applicable rules, i.e. using appropriate user and installation scope, as above described (step 1104). If access is denied during the full virtualized open operation (step 1106), an access denied error is returned to the requestor (step 1109). If access is granted (step 1106), and the requested virtual key is successfully opened (step 1110), the corresponding literal key is returned to the requestor (step 1112). However, if access is granted (step 1106), but the virtual key is not opened successfully (step 1110) then the virtual key has been determined not to exist. If the virtual parent of the requested virtual key also does not exist, as determined above (step 1114), an error appropriate to the request semantics is issued to the requestor (step 1116). If on the other hand, the virtual parent of the requested virtual key is found in full virtualized view using the appropriate user and installation scope (step 1114), then a rule that determines how the create operation is processed is located (step 1118) by consulting the rules engine. In some embodiments, the rules engine may be provided as a relational database. In other embodiments, the rules engine may be a tree-structured database, a hash table, or a flat key database. In some embodiments, the virtual key name provided for the requested key is used to locate in the rule engine a rule that applies to the request. In particular ones of these embodiments, multiple rules may exist in the rules engine for a particular key and, in some of these embodiments, the rule having the longest prefix match with the virtual key name is the rule applied to the request. In some embodiments, a process identifier is used to locate in the rule engine a rule that applies to the request, if one exists. The rule associated with a request may be to ignore the request, redirect the request, or isolate the request. Although shown in FIG. 17 as a single database transaction or single lookup into a key, the rule lookup may be performed as a series of rule lookups.

If the rule action is "redirect" or "ignore" (step 1120), the virtual key name is mapped directly to a literal key name according to the rule (step 1124). If the rule action is "redirect" (step 1120), the literal key name is determined from the virtual key name as specified by the rule (step 1124). If the rule action is "ignore" (step 1120), the literal key name is determined to be exactly the virtual key name (step 1124). If the rule action is "ignore" or the rule action is "redirect", a request to create the literal key using the determined literal key name is passed to the operating system 210 and the result from the operating system 210 is returned to the requestor (step 1124). For example, a request to create a virtual key named "key_1" may result in the creation of a literal key named "Different_key_1." In one embodiment, this is accomplished by calling the original version of the hooked function and passing the formed literal name to the function as an argument (step 1124). In other embodiments, a registry filter driver facility conceptually similar to a file system filter driver facility may be provided by the operating system 210. In these embodiments, creating the literal registry key may be achieved by responding to the original request to create the virtual key by signaling to the registry filter manager to reparse the request using the determined literal key name.

If the rule action determined in step 1120 is not "ignore" or "redirect" but is "isolate," then the literal key name is identified as the instance of the virtual key name in the user scope. If the literal key already exists, but is associated with metadata indicating that it is a placeholder or that it is deleted, then the associated metadata is modified to remove those indications, and it is ensured that the key is empty.

In some embodiments, metadata about a registry key may be stored in a distinguished value held by that key, with the existence of that value hidden from ordinary application usage of registry APIs. In some embodiments, small amounts of metadata about a registry key may be stored directly in the literal key name, such as by suffixing the virtual name with a metadata indicator, where a metadata indicator is a string uniquely associated with a particular metadata state. The metadata indicator may indicate or encode one or several bits of metadata. Requests to access the key by virtual name check for possible variations of the literal key name due to the presence of a metadata indicator, and requests to retrieve the name of the key itself are hooked or intercepted in order to respond with the literal name. In other embodiments, the metadata indicator may be encoded in a sub-key name or a registry value name instead of the key name itself. In still other embodiments, a registry key system may directly provide the ability to store some 3rd party metadata for each key. In some embodiments, metadata could be stored in a database or other repository separate from the registry database. In some embodiments, a separate sub-scope may be used to store keys that are marked as deleted. The existence of a key in the sub-scope indicates that the key is marked as deleted.

In specific ones of these embodiments, a list of deleted keys or key system elements may be maintained and consulted to optimize this check for deleted keys. In these embodiments, if a deleted key is recreated then the key name may be removed from the list of deleted keys. In others of these embodiments, a key name may be removed from the list if the list grows beyond a certain size.

In either case, a request to open the user-scope literal key is passed to the operating system 210 (step 1126). In some embodiments, rules may specify that the literal key corresponding to the virtual key should be created in a scope other than the user scope, such as the installation scope, the system scope, a user sub-scope or an installation sub-scope.

If the literal key was opened successfully (step 1128), the literal key is returned to the requestor (step 1130). If on the other hand, in step 1128, the requested key fails to open, placeholders are created for each ancestor of the literal key that does not currently exist in the user scope (step 1132) and a request to create the literal key using the literal name is passed to the operating system 210 and the result is returned to the requestor (step 1134).

This embodiment is for operating systems 210 with APIs or facilities that only support creation of one level per call/invocation. Extension to multi-levels per call/invocation should be obvious to one skilled in the art.

Figure 18:
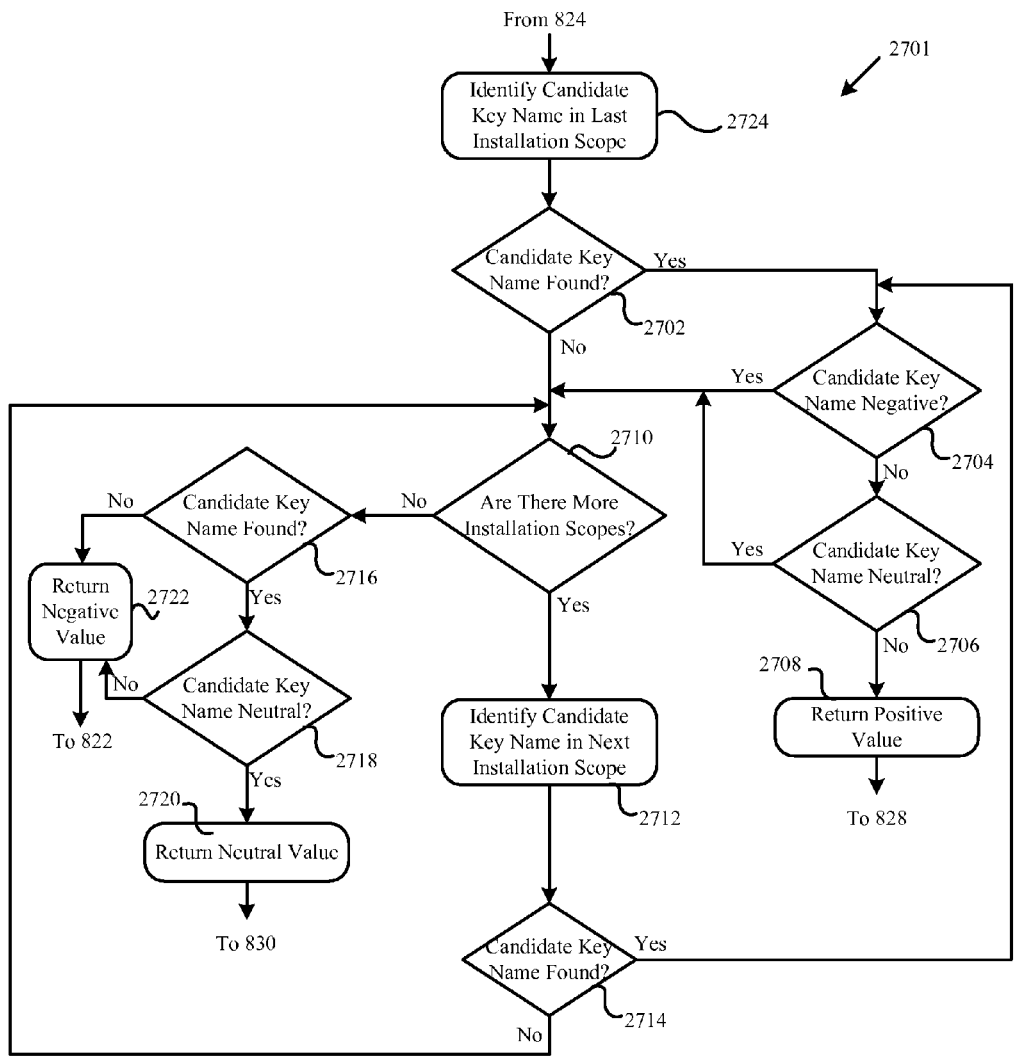
FIG. 18 is a flowchart depicting an embodiment of a method for cycling through more than one installation scope.

Illustrated in FIG. 18 is one embodiment of the subroutine 2701 called in the process illustrated in FIG. 14. This subroutine is a method, executed within the method 811 depicted in FIG. 14, to cycle through the one or more installation scopes included in the isolation environment 260. When the existence of a user-scope candidate key is determined in step 816 of the method 811 in FIG. 14 to have a neutral existence, the subroutine 2701 is called and a candidate key name is identified in the first installation scope (step 2724). It is then determined whether or not a candidate key name was in fact found in the first installation scope (step 2702). If a candidate key name is found then a check is done as to whether or not this found candidate key name has a negative existence indicating that that found file has been marked for deletion or is otherwise no longer present in the installation scope (step 2704). When the candidate key name has a negative existence, a check is the done to determine if there are more installation scopes within the isolation environment 260 (step 2710), however if the candidate key name does not have a negative existence, then a check is done to determine if the candidate key name has a neutral existence (step 2706). When the candidate key name has a neutral existence this indicates that the key may be a placeholder or that the key may not exist, and so the isolation scope 260 is further analyzed to determine if there are additional installation scopes present in the isolation environment 260 (step 2710). If the candidate key name does not have a neutral existence, then a value is returned to the main method 811 indicating that the candidate key name has a positive existence (step 2708). If after step 2724, it is determined that a candidate key name was not found (step 2702), then the isolation environment 260 is analyzed to determine if there are additional installation scopes in the isolation environment 260 (step 2710). When it is determined that there are additional installation scopes present, a second candidate key name is identified in the next installation scope (step 2712). Once the next installation scope is analyzed, it is determined whether or not a candidate key name was found in that installation scope (step 2714). When a candidate key name is found, that key is then checked to determine whether or not is has a negative existence (step 2704), or a neutral existence (step 2706). If a second candidate key name is not found, then a check is done as to whether or not there are additional installation scopes (step 2710). When no more additional installation scopes are identified (step 2710), a check is done as to whether a candidate key name was found during the last check (step 2724, step 2712), and if no key name is found, a negative value is returned to the main method 811 (step 2722). If a candidate key name is found (step 2716), then it is determined whether or not the found candidate key name has a neutral existence (step 2718). When the candidate key name has a neutral existence, a neutral value is returned to the main method 811 (step 2720), and when the candidate key name does not have a neutral existence, a negative value is returned to the main method 811 (step 2722).

Further referring to FIG. 18 in more detail, in one embodiment of the subroutine 2701, a candidate key name is identified in the first installation scope (step 2724). Other embodiments may include a subroutine 2701 that checks for the candidate key name in the last installation scope or in another installation scope where the location of the installation scope is either a user-defined value or a pre-determined value. Still further embodiments include a subroutine 2701 where the first installation scope is the installation scope is the highest priority installation scope within the isolation environment 260. Embodiments of the subroutine 2701 may include a first installation scope that is the lowest priority installation scope within the isolation environment 260, a first installation scope that has the highest priority within a sub-scope of installation scopes, or a first installation scope that has the lowest priority within a sub-scope of installation scopes. It is then determined whether or not a candidate key name was found in the first installation scope (step 2702). In one embodiment of the process 2701, when a candidate key is found in the first installation scope, determinations are made as to whether the key name has a negative existence (step 2704), a neutral existence (step 2706), or a positive existence (step 2708). When a key name has a negative existence, further determinations are made as to whether or not there are additional installation scopes (step 2710), if there are no other installation scopes then a verification is made that a candidate key name was found (step 2716) and a determination is made as to whether or not the candidate key name is neutral (step 2718) or negative (step 2722). When a key name does not have a negative existence, a determination is made as to whether the key name has a neutral existence (step 2706), and if the candidate key does not have a neutral existence (step 2706), then a positive value indicating a candidate key name with a positive existence is returned to the main process 811 (step 2708). If a key name has a neutral existence then a check is done as to whether or not additional installation scopes are included in the isolation environment 260 (step 2710), if there are no other installation scopes then a verification is made that a candidate key name was found (step 2716) and a determination is made as to whether or not the candidate key name is neutral (step 2718) or negative (step 2722).

In one embodiment, when a candidate key name is not found in the first installation scope, a determination is made as to whether or not there exist additional installation scopes within the isolation environment 260 (step 2710). Other embodiments may be configured to search through a pre-determined number of installation scopes. When additional installation scopes exist, a next installation scope is searched to identify a candidate key name (step 2712). In one embodiment, the next installation scope is the installation scope that is one priority level less than the priority level of the previously checked installation scope. For example, in this embodiment if the previously check installation scope was the first installation scope with the highest priority, then the next installation scope would be the installation scope with the second highest priority. When additional installation scopes do not exist, a determination is made as to whether or not a candidate key name was previously identified (step 2716). In one embodiment, a previously identified candidate key name would include keys identified by the method 811 before a check was made as to the existence of additional installation scopes.

When additional installation scopes are included within the isolation environment 260, the method attempts to identify a candidate key in each installation scope (2712). In one embodiment, a determination is made as to whether or not a candidate key was found (step 2714), and if a candidate key was found, the file is then analyzed to determine if the key has a negative existence (step 2704), a neutral existence (step 2706), or a positive existence (step 2708). When a candidate key name is not found (2714), then a check is made for more installation scopes (step 2710), and if there are no additional installation scopes, it is verified that a candidate key was found (step 2716). If a candidate key was not found, a negative value is returned (step 2722), and if a candidate key is found, then a determination is made as to whether the candidate key is neutral (step 2718).

Figure 19:
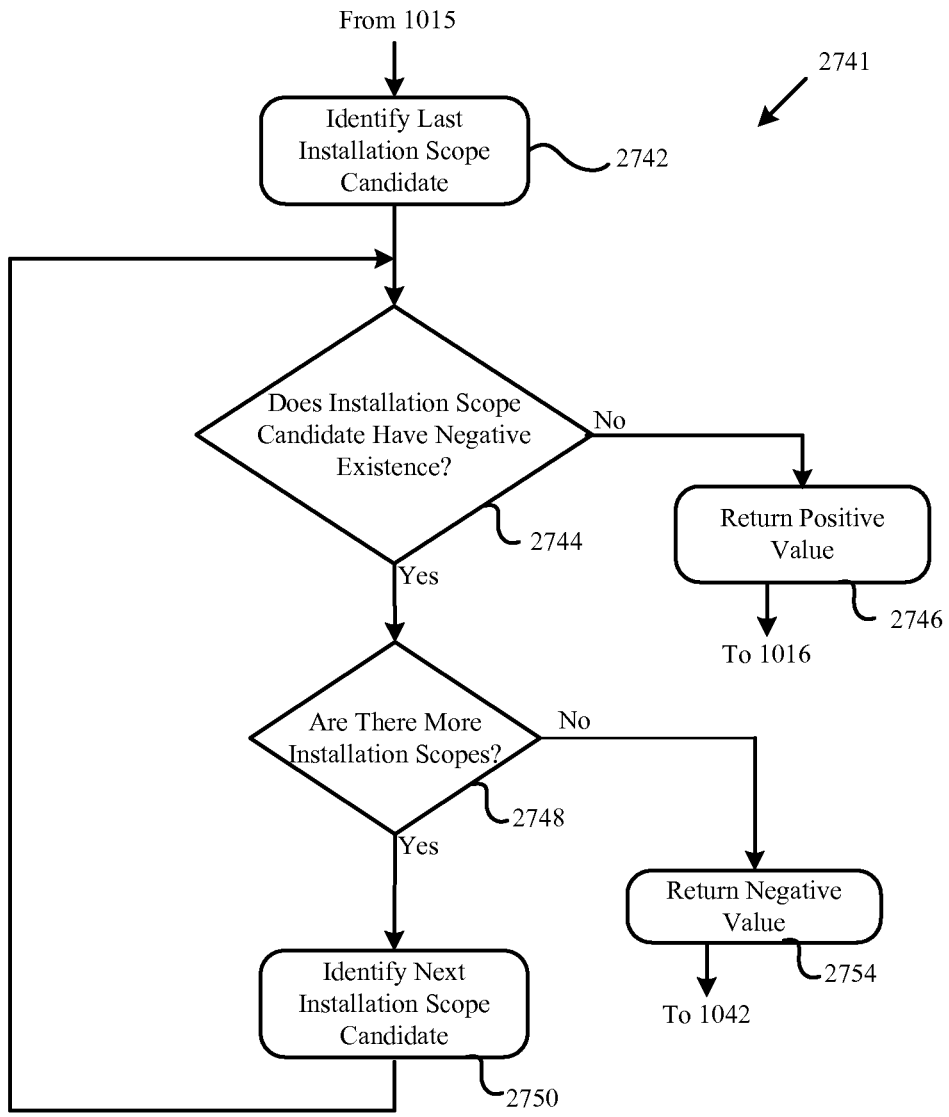
FIG. 19 is a flowchart depicting an embodiment of a method for cycling through more than one installation scope.

Illustrated in FIG. 19 is one embodiment of a subroutine 2741 called by the method 1003 in FIG. 16. In one embodiment, a subroutine 2741 is called by the process 1003 in FIG. 16 to cycle through all installation scopes included in the isolation environment 260, and identify an installation scope with a positive existence. After storing the enumerated system scope results in a working data store (step 1014), a first installation scope candidate is identified (2742). A determination is made as to whether or not the first installation scope candidate has a negative existence (2744). When the first installation scope has a positive existence, a positive value is returned to the main process 1003 (step 2746), and the installation scope is enumerated into the working data store (step 1016). When the first installation scope has a negative existence, a check is made for the existence of additional installation scopes within the isolation environment 260 (step 2748). If there are no additional installation scopes, then a negative value is returned to the main process 1003 (step 2754). If there are additional installation scopes, then a next candidate installation scope is identified (step 2750) and a determination is made as to whether or not the next installation scope has a negative existence (step 2744). A verification is made as to whether or not the next candidate installation scope Referring to FIG. 19 in more detail, when the subroutine 2741 is called from the main process 1003, an embodiment of which is illustrated in FIG. 16, a first installation scope candidate is identified (step 2742). In one embodiment, the first installation scope candidate is the installation scope that has a higher priority than all other installation scopes included in the isolation environment 260. Other embodiments may include a first installation scope candidate that is the installation scope that has a lower priority than all other installation scopes included in the isolation environment 260. Still other embodiments may include a first installation sub-scope that has a higher priority than the other installation sub-scopes, or a first installation scope that has a higher priority than the other installation scopes included in a sub-isolation environment 260.

An embodiment of the process 2741 makes a determination as to whether or not the installation scope has a negative existence (step 2744). In one embodiment, when the installation scope does have a negative existence (step 2744), a check is made to determine whether or not the isolation environment 260 includes additional installation scopes (step 2748). In another embodiment, when the installation scope does not have a negative existence (step 2744), a positive value is returned to the main process 1003 (step 2746).

One embodiment of the method 2741 determines whether or not there exist additional installation scopes within the isolation environment 260 (step 2748). In one embodiment, when there exist no additional installation scopes, a negative value is returned to the main process 1003 (step 2746), while in another embodiment a next installation scope candidate is identified (step 2750) when there exist additional installation scopes within the isolation environment 260.

Named Object Virtualization

Another class of system-scope resources that may be virtualized using the techniques described above are named objects, which can include semaphores, mutexes, mutants, waitable timers, events, job objects, sections, named pipes, mailslots, or any other object that can be a resource for an application. These objects are characterized in that they typically exist only for the duration of the process which creates them. The name space for these objects may be valid over an entire computer (global in scope) or only in an individual user session (session scope).

Figure 20:
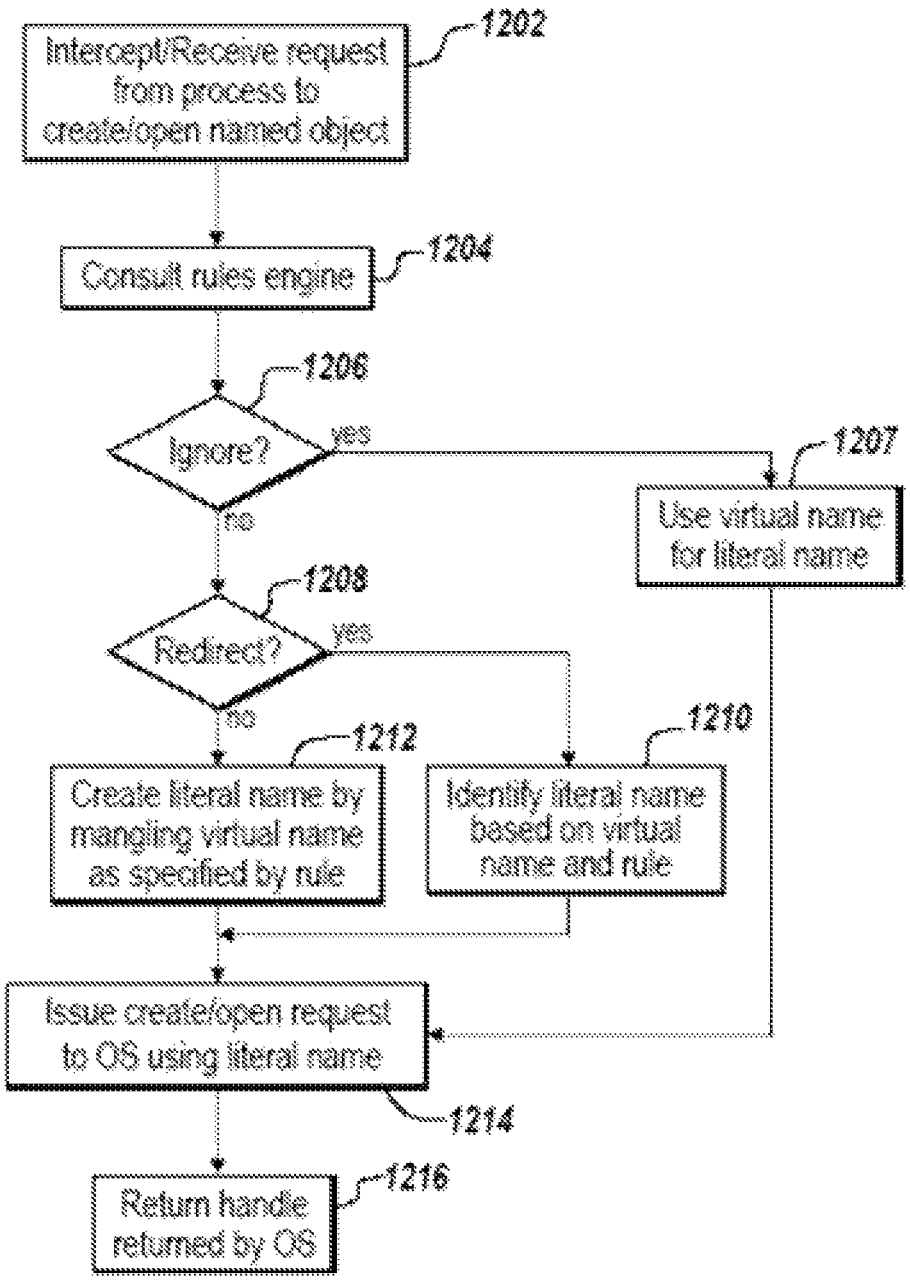
FIG. 20 is a flowchart depicting an embodiment of a method for virtualizing access to named objects.

Referring now to FIG. 20, and in brief overview, a request to create or open a named object is received or intercepted (step 1202). That request contains an object name which is treated as a virtual name by the isolation environment 260. A rule determining how to treat the request is determined (step 1204). If the rule indicates that the request should be ignored (step 1206), the literal object name is determined to be the virtual name (step 1207), and a request to create or open the literal object is issued to the operating system 210 (step 1214). If the determined rule is not to ignore the request, but indicates instead that the request should be redirected (step 1208), the literal object name is determined from the virtual name as specified by the redirection rule (step 1210) and a create or open request for the literal object is issued to the operating system (step 1214). If the rule does not indicate that the request should be redirected (step 1208), but instead indicates that the request should be isolated, then the literal object name is determined from the virtual name as specified by the isolation rule (step 1212) and a create or open command for the literal object is issued to the operating system 210 (step 1214). The handle of the literal object returned by the operating system 210 in response to the issued create or open command is returned to the program requesting creation or opening of the virtual object (step 1216).

Still referring to FIG. 20, and in more detail, a request from a process to create or open a named object is intercepted (step 1202). The named object may be of session scope or it may be of global scope. In some embodiments, the request is hooked by a function that replaces the operating system function or functions for creating or opening the named object. In another embodiment a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system 210 resource that is used in dispatching requests for system objects. The request to create or open the named object may refer to any one of a wide variety of system-scope resources that are used for inter-process communication and synchronization and that are identified by a unique identifier including semaphores, mutexes, mutants, waitable timers, file-mapping objects, events, job objects, sections, named pipes, and mailslots. For embodiments in which a separate operating system function is provided for each type of object, each function may be hooked separately. Alternatively, a single hooking function may be provided which intercepts create or open calls for several types of objects.

The intercepted request contains an object name which is treated as a virtual name by the isolation environment 260. A rule determining how to treat the request for the object is determined (step 1204) by consulting the rules engine. In some embodiments, the rules engine may be provided as a relational database. In other embodiments, the rules engine may be a tree-structured database, a hash table, or a flat file database. In some embodiments, the virtual name provided for the requested object is used to locate in the rule engine a rule that applies to the request. In particular ones of these embodiments, multiple rules may exist in the rules engine for a particular object and, in these embodiments, the rule having the longest prefix match with the virtual name is the rule applied to the request. In some embodiments, a process identifier is used to locate in the rule engine a rule that applies to the request, if one exists. The rule associated with a request may be to ignore the request, redirect the request, or isolate the request. Although shown in FIG. 18 as a series of decisions, the rule lookup may occur as a single database transaction.

If the rule indicates that the request should be ignored (step 1206), the literal object name is determined to be the virtual name, and a request to create or open the literal object is issued to the operating system 210 (step 1214). For example, a request to create or open a named object named "Object_1" results in the creation of an actual object named "Object_1". In one embodiment, this is accomplished by calling the original version of the hooked function and passing the formed literal name to the function as an argument.

If the rule determined by accessing the rules engine is not to ignore the request, but indicates instead that the request should be redirected (step 1208), the literal object name is determined from the virtual name as specified by the redirection rule (step 1210) and a create or open request for the literal object is issued to the operating system 210 (step 1214). For example, a request to create or open a named object named "Object_1" may result in the creation of an actual object named "Different Object_1". In one embodiment, this is accomplished by calling the original version of the hooked function and passing the formed literal name to the function as an argument.

If the rule does not indicate that the request should be redirected (step 1208), but instead indicates that the request is isolated, then the literal object name is determined from the virtual name as specified by the isolation rule (step 1212) and a create or open command for the literal object is issued to the operating system 210 (step 1214). For example, a request to create or open a named object named "Object_1" may result in the creation of an actual object named "Isolated Object_1". In one embodiment, this is accomplished by calling the original version of the hooked function and passing the formed literal name to the function as an argument.

The literal name formed in order to isolate a requested system object may be based on the virtual name received and a scope-specific identifier. The scope-specific identifier may be an identifier associated with an installation scope, a user scope, a session scope, or some combination of the three. The scope-specific identifier is used to "mangle" the virtual name received in the request. For example, if the request for the named object "Object_1" is isolated for the installation scope whose associated identifier is "SA1", the literal name may be "Isolated_AppScope_SA1_Object_1". The following table identifies the effect of mangling the name of an object with session scope, or user scope, and an installation scope. Mangling with combinations of scopes combines the restrictions listed in the table.

|  | Session-specific identifier | User-specific identifier | Installation-specific identifier |
| --- | --- | --- | --- |
| Global object | Object available to all isolated applications executing in the context of the user session | Object available to all isolated applications executing on behalf of the user | Object available to all isolated applications executing in an installation scope |
| Session object | Object available to all isolated applications executing in the context of the user session | Object available to all isolated applications executing in the session on behalf of the user | Object available to all isolated applications executing in an installation scope within the session |

For embodiments in which the operating system 210 is one of the WINDOWS family of operating systems, object scope may be modified by toggling the global/local name prefix associated with the object, which, for isolated applications, has the same effect as mangling the object name with a session-specific identifier. However, toggling the global/local name prefix also affects the object scope for non-isolated applications.

The handle of the literal object returned by the operating system 210 in response to the command issued in step 1214 to create or open the named object is returned to the program requesting creation or opening of the virtual object (step 1216).

Application-Specific User Root

Figure 21A:
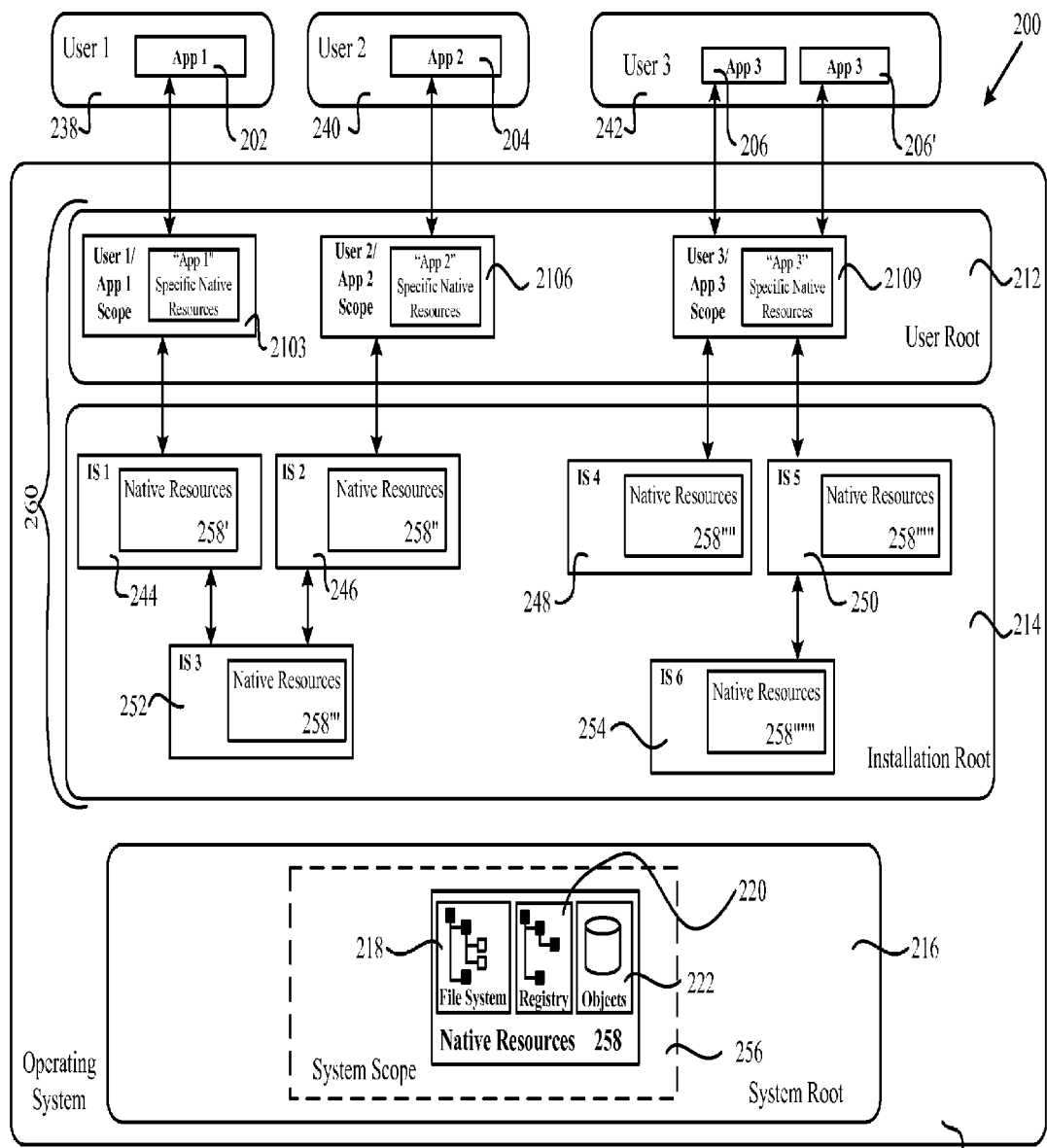
FIG. 21A is a block diagram of an embodiment of a multi-user computing machine with an isolation environment.

Illustrated in FIG. 21A is one embodiment of the computing machine 200 configured to provide access to more than one user 238, 240, 242 and having user scopes configured to provide application-specific, user-specific native resources. The illustrated computing machine 200 includes the following components: an operating system 210 installed thereon; user sessions 238, 240, 242 indicative of user actions; and applications 202, 204, 206, 206' executing within the user sessions 238, 240, 242. The operating system 210 has a system root 216, an installation root 214, and a user root 211. Included within the system root 216 is a system scope 256 that further includes native resources 258 such as: a file system 218; a registry 220; and objects 222. The installation root 214 includes more than one installation scope 244, 246, 252, 248, 250, 254, where each installation scope is connected to another scope. Included within each installation scope are instances of native resources 258', 258'', 258''', 258'''', 258''''', 258''''''. The user root 212 includes more than one user scope 2103, 2106, 2109, where each scope is associated with a user session 238, 240, 242 and each scope includes an instance of native resources. An isolation environment 260 is included within the operating system 210 that groups together the user root 212 and the installation root 214.

Referring to FIG. 21A and in more detail, the elements included within FIG. 21A are substantially similar to those included in FIG. 2B with the exception of a user root 212 that includes user scopes 2103, 2106, 2109 dedicated to storing application-specific, user-specified settings. A further exception is the applications executed by the third user within the third user session. In this user session, the third user executes two instances of a third application 206, 206'. In one embodiment, the user scopes 2103, 2106, 2109 include native resources that correspond to an application profile. Each application profile includes application-specific setting information. In one embodiment of the computing machine 200, a user, executing an application within a user session, alters the settings of the executing application. The altered settings are stored in an application profile which is further represented by a set of native resources included within the user scope. When a user executes that application, the application executes according to the altered application settings. An example of this includes a first user executing a first application 202 within a first user session 238. In this example, the user scope 2103 corresponding to the first application stores all of the first user-specified application settings for the first application, and makes those settings available to the first application each time the first application is executed by the first user. Further referring to this example, if the first user were to execute the first application in more than one isolation environment, the instance of the first application appearing in each isolation environment would have the same application-specific and user-specified application settings.

In one embodiment of the computing machine 200, a third user executing two instances of a third application 206, 206' within a third user session 242 is included. A user scope 2109 that includes native resources specific to the third application is also included within this embodiment. Each instance of the third application 206, 206', in this embodiment, is configured to execute within the third user session 242 according to those application-specific and user-specified resources included within the user scope 2109. Other embodiments may include a user scope 2109 that has sub-scopes configured to store setting information for more than one application.

One example of the computing machine depicted in FIG. 21A includes a first installation scope within a first isolation environment and associated with a first application. Included within the first installation scope is an executable component that is configured to execute the first application. Further included within a second isolation environment is a second installation scope associated with the first application. Included within the second installation scope is an executable component that is configured to execute the first application. A user scope is included in each of the first isolation environment and the second isolation environment, where the user scope stores an application profile with user setting information specific to the execution of the first application. The choice of which application-specific user scope to include in an isolation environment, is based on which installation scope includes the an executable component. In this example, each of the first isolation environment and the second isolation environment had an installation scope with an executable component, where that installation scope corresponded to the first application. Based on the location of the first executable component, the user scope included in both the first isolation environment and the second isolation environment is a user scope that corresponds to the first application. In this example, as well as other examples, the choice of which user scope to include is referred to a defining the user scope. To define a user scope based on an association between the executable component and an application; is to determine which application the user scope corresponds to, based on which installation profile includes an executable component. Other embodiments include defining the user scope based on the first found executable component.

Figure 21B:
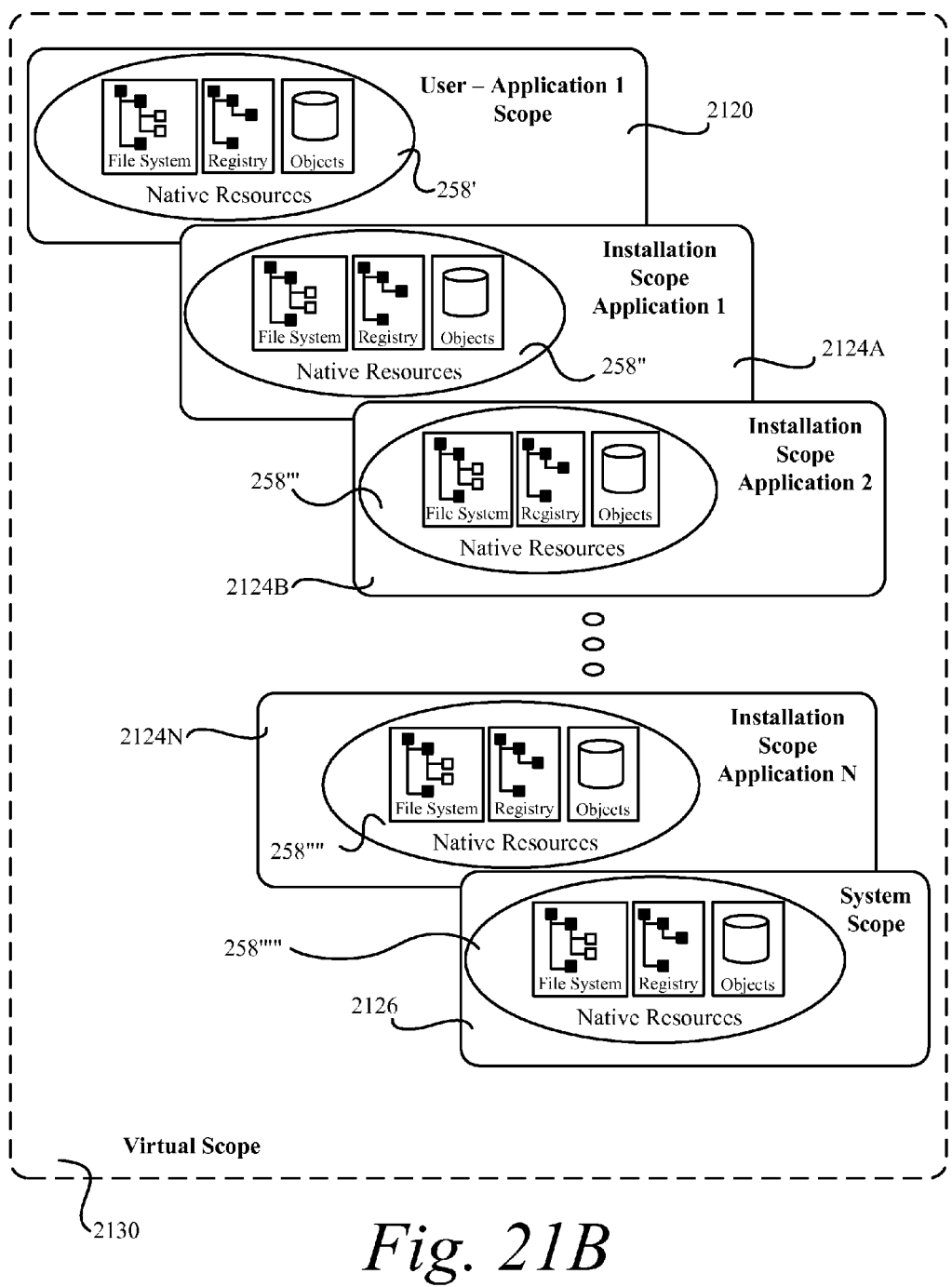
FIG. 21B is a block diagram of an embodiment of a virtual scope.

Illustrated in FIG. 21B is an embodiment of a block diagram of a virtual scope 2130 configured to aggregate more than one isolation scope to create a virtualized native resource view included within the virtual scope 2130. Within the virtual scope 2130 is an aggregation of the following isolation scopes: a user-application 1 scope 2120 corresponding to a first application; an installation scope corresponding to a first application 2124A; an installation scope corresponding to a second application 2124B; an installation scope corresponding to an N application 2124N; and a system scope 2126.

Further referring to FIG. 21B in more detail, in one embodiment of the virtual scope 2130, a user scope is included that contains native resources used by a first application to execute. In one embodiment, the native resources contained within the virtual scope 2130 are user-specified application settings that direct the application to execute according to user-specified settings. In another embodiment, the native resources contained within the virtual scope 2130 are application settings that correspond to an application profile for the first application. This application profile is generated based on user-specified setting information, and the profile dictates the manner in which the first setting should execute. The virtual scope 2130 can include, in some embodiments, a user scope 2120 that has a sub-scope dedicated to first application setting information, and additional sub-scopes dedicated to other application setting information. Still other embodiments of the virtual scope 2130 include a user scope with sub-scopes where at least one of the sub-scopes is dedicated to providing first application-specific setting information.

The installation scopes 2124A-2124N illustrated in FIG. 21B are substantially similar to those installation scopes 284A-284N included within the virtual scope 262 depicted in FIG. 4. Furthermore, the system scope 2126 illustrated in FIG. 21B is substantially similar to the system scope 286 within the virtual scope 262 depicted in FIG. 4. Differences between FIG. 4 and FIG. 21B include installation scopes 2124A-2124N representative of applications such that a first installation scope 2124A is representative of a first application, a second installation scope 2124B is representative of a second application, and an N installation scope 2124N is representative of an N application.

Figure 21C:
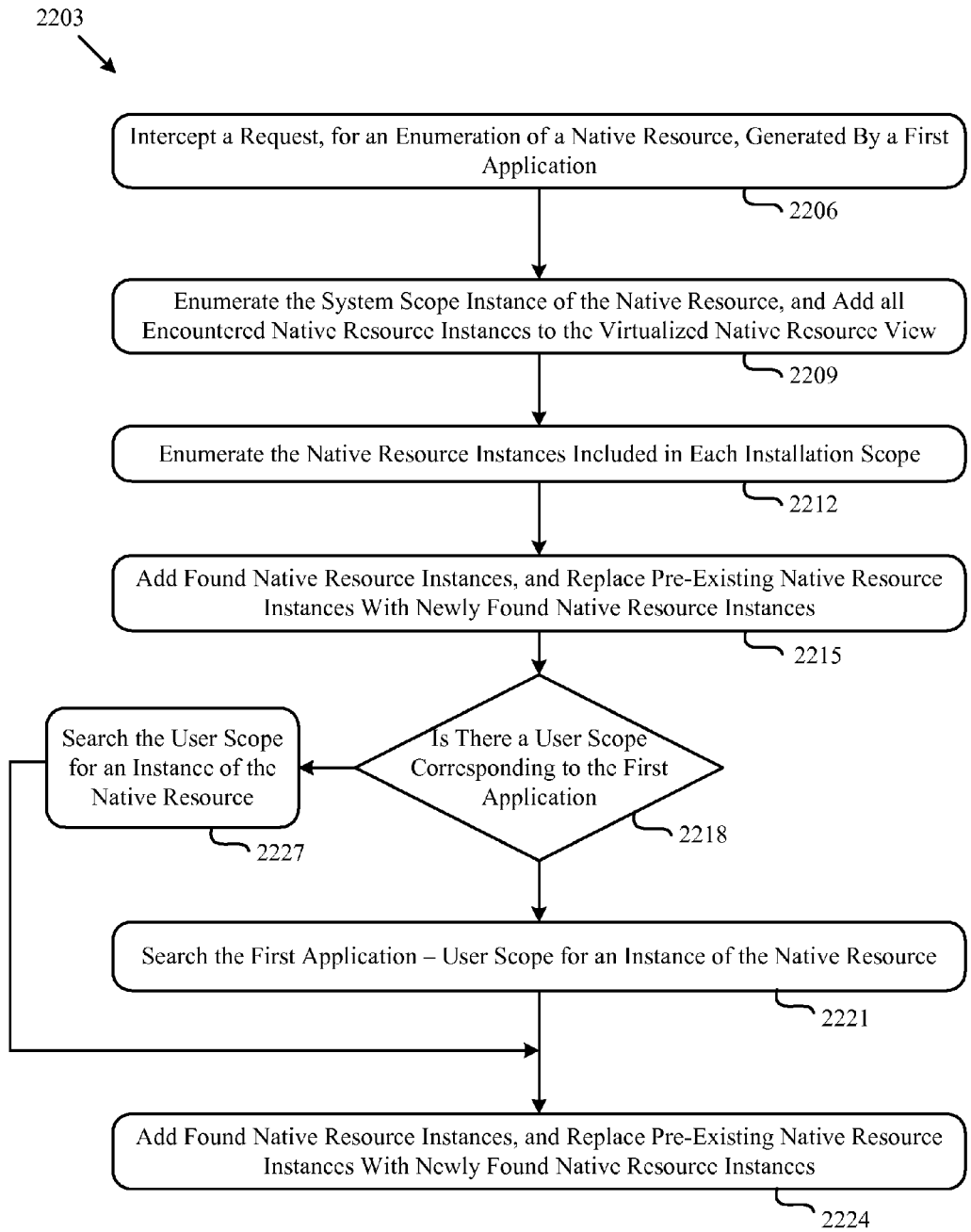
FIG. 21C is a flowchart of an embodiment of a method of aggregating instances of native resources into a single native resource instance.

Illustrated in FIG. 21C is a flowchart depicting a method 2203 for aggregating native resources found within isolation scopes. The method 2203 includes intercepting a request generated by a first application (step 2206), where the request is for an enumeration of a native resource (step 2206). An enumeration of system scope instances of the native resource is performed, and all encountered instances of the requested native resource are added to a virtualized native resource view (step 2209). The method 2203 further includes enumerating the native resource instances included in each installation scope (step 2212); and adding those resource instances found, and replacing those native resources that already exist within the virtualized native resource view with newly found native resource instances (step 2215). A determination is then made as to whether or not there exists a user scope that corresponds to the first application (step 2218). If a user scope exists that is configured to include first application-specific settings, then the first application/user scope is searched for an instance of the requested native resource (step 2221). When no user scope, corresponding to the first application, is found; a search is performed within the existing user scope for an instance of the requested native resource (step 2227). Once a search is performed either within a non-specific user scope, or a user scope that is specific to the first application; each of the found native resource instances are added to the virtualized native resource view and those resources already within the virtualized view are replaced with substantially similar resources found within one of the user scopes (step 2224).

Further referring to FIG. 21C and in more detail, aspects of the method 2203 that substantially correspond to those aspects of the method 401 illustrated in FIG. 3A may be embodied according to any of the embodiments or configurations in the above described method 401. Aspects of the method 2203 that differs from the method 401 illustrated in FIG. 3A are those that refer to determining a first application-specific user scope (step 2218), and further searching that application-specific user scope (step 2221). In one embodiment of the method 2203, a filter driver is used to determine whether or not an application-specific user scope exists, and to further search a known application-specific user scope. Other embodiments of the method 2203 include an application-specific user scope that includes first application setting information generated by a user and stored within the first application-specific user scope. Still other embodiments include a user scope with a sub-scope dedicated to providing an instance of native resources that are defined by a user and that are used by the first application to execute according to user-specified parameters. Further embodiments include a method 2203 that searches a first application-specific scope while the first application is executing within the same user session and in a different isolation environment.

What is claimed is:

1. A method for retrieving user setting information from a user scope containing an application profile, the method comprising:
   initializing a first isolation environment with a first installation scope associated with a first application, the first isolation environment including a user scope containing a first application profile corresponding to the first application;
   retrieving, from the first application profile, user setting information associated with configuring the first application;

executing, within the first isolation environment, the first application according to the retrieved user setting information;

initializing a second isolation environment with a second installation scope associated with the first application, the second isolation environment including the user scope containing the first application profile;

retrieving, from the first application profile, the user setting information associated with configuring the first application; and executing, within the second isolation environment, the first application according to the retrieved user setting information.

2. The method of claim 1, wherein the user scope contains an instance of a native resource that corresponds to a user-specific setting or configuration.

3. The method of claim 1, wherein the user scope is associated with a user session.

4. The method of claim 3, wherein the user scope is destroyed when the user session ends.

5. The method of claim 3, where the user session corresponds to a user such that any user-input or user-output generated by the user is confined to the user session.

6. The method of claim 1, wherein the application profile contains application-specific setting information.

7. A system for retrieving user setting information from a user scope containing an application profile, the system comprising:

means for initializing a first isolation environment with a first installation scope associated with a first application, the first isolation environment including a user scope containing a first application profile corresponding to the first application;

means for retrieving, from the first application profile, user setting information associated with configuring the first application;

means for executing, within the first isolation environment, the first application according to the retrieved user setting information;

means for initializing a second isolation environment with a second installation scope associated with the first application, the second isolation environment including the user scope containing the first application profile;

means for retrieving, from the first application profile, the user setting information associated with configuring the first application; and means for executing, within the second isolation environment, the first application according to the retrieved user setting information.

8. The system of claim 7, wherein the user scope contains an instance of a native resource that corresponds to a user-specific setting or configuration.

9. The system of claim 7, wherein the user scope is associated with a user session.

10. The system of claim 9, wherein the user scope is destroyed when the user session ends.

11. The system of claim 9, where the user session corresponds to a user such that any user-input or user-output generated by the user is confined to the user session.

12. The system of claim 7, wherein the application profile contains application-specific setting information.

* * * * *